(12) United States Patent
Nishida et al.

(10) Patent No.: US 9,081,219 B2
(45) Date of Patent: Jul. 14, 2015

(54) LATERAL ELECTRIC FIELD LIQUID CRYSTAL DISPLAY DEVICE AND MANUFACTURING METHOD THEREOF

(71) Applicant: NLT TECHNOLOGIES, LTD., Kanagawa (JP)

(72) Inventors: Shinichi Nishida, Kanagawa (JP); Ken Sumiyoshi, Kanagawa (JP); Hideki Ito, Kanagawa (JP); Mitsuhiro Sugimoto, Kanagawa (JP); Hidenori Ikeno, Kanagawa (JP)

(73) Assignee: NLT TECHNOLOGIES, LTD., Kanagawa (JP)

(*) Notice: Subject to any disclaimer, the term of this patent is extended or adjusted under 35 U.S.C. 154(b) by 0 days.

(21) Appl. No.: 14/465,318

(22) Filed: Aug. 21, 2014

(65) Prior Publication Data

US 2014/0362316 A1    Dec. 11, 2014

Related U.S. Application Data

(63) Continuation of application No. 13/689,334, filed on Nov. 29, 2012.

(30) Foreign Application Priority Data

Nov. 30, 2011  (JP) ................................. 2011-261631
Mar. 21, 2012  (JP) ................................. 2012-064318

(51) Int. Cl.
*G02F 1/133* (2006.01)
*G02F 1/1335* (2006.01)
(Continued)

(52) U.S. Cl.
CPC ...... *G02F 1/13306* (2013.01); *G02F 1/133512* (2013.01); *G02F 1/133707* (2013.01); *G02F 1/134336* (2013.01); *G02F 1/136209* (2013.01); *G02F 2001/133567* (2013.01);
(Continued)

(58) Field of Classification Search
CPC ......... G02F 2001/134372; G02F 2001/133757
USPC ....................................................... 349/141
See application file for complete search history.

(56) References Cited

U.S. PATENT DOCUMENTS

| 6,266,118 B1 | 7/2001 | Lee et al. |
| 2001/0028414 A1 | 10/2001 | Lyu et al. |

(Continued)

FOREIGN PATENT DOCUMENTS

JP   3120751 B2   12/2000

OTHER PUBLICATIONS

Communication dated Jan. 23, 2015 from the United States Patent and Trademark Office in counterpart U.S. Appl. No. 14/568,244.

*Primary Examiner* — Dennis Y Kim
(74) *Attorney, Agent, or Firm* — Sughrue Mion, PLLC

(57) ABSTRACT

The liquid crystal display device includes a transparent electrode formed in a plan form and a strip or strips transparent electrode disposed thereon via an insulating film, and controls display by rotating the liquid crystal aligned substantially in parallel to a substrate within a plane that is substantially in parallel to the substrate by an electric field between the both electrodes. Each pixel constituting the display is divided into two regions, the extending directions of the strip electrode in each of the regions are orthogonal, the alignment azimuths of the liquid crystal of each of the regions are orthogonal, and the angles formed between the extending directions of the strip electrode and the alignment azimuth of the liquid crystal are the same.

9 Claims, 50 Drawing Sheets

(51) Int. Cl.
  *G02F 1/1337* (2006.01)
  *G02F 1/1343* (2006.01)
  *G02F 1/1362* (2006.01)

(52) U.S. Cl.
  CPC .............. *G02F2001/133757* (2013.01); *G02F 2001/134372* (2013.01)

(56) References Cited

U.S. PATENT DOCUMENTS

2005/0151912 A1\* 7/2005 Miyachi et al. ............... 349/141
2005/0264743 A1   12/2005 Suzuki et al.
2011/0001914 A1    1/2011 Tanaka \* cited by examiner (a)          (b)

LATERAL ELECTRIC FIELD LIQUID CRYSTAL DISPLAY DEVICE AND MANUFACTURING METHOD THEREOF

CROSS-REFERENCE TO RELATED APPLICATIONS

This application is a continuation of U.S. patent application Ser. No. 13/689,334, filed Nov. 29, 2012, is based upon and claims the benefit of priority from Japanese patent application Nos. 2011-261631, filed on Nov. 30, 2011, and No. 2012-064318, filed on Mar. 21, 2012 the disclosures of which are incorporated herein in its entirety by reference.

BACKGROUND OF THE INVENTION

1. Field of the Invention

The present invention relates to a lateral electric field liquid crystal display device which implements an active matrix type liquid crystal display device and the like excellent in the viewing angle characteristics.

2. Description of the Related Art

The widely used TN (Twisted Nematic) mode is of high contrast. On the other hand, the molecule axes of the liquid crystal of that mode rise by the vertical electric field, so that the viewing angle dependency is tremendous. Recently, it is desired to acquire the same picture quality when viewed from any directions regarding display device for large-scaled monitors such as TVs and regarding portable information terminals. In order to satisfy such demands, employed more and more are the modes with which the liquid crystal is rotated on a plane substantially in parallel to the substrate by applying an electric field substantially parallel to the substrate, such as an IPS (In-plane Switching) mode and an FFS (Fringe Field Switching) mode. With such lateral electric field modes, the axes of molecules of the nematic liquid crystal aligned horizontally are rotated within a plane that is in parallel to the substrate by the lateral electric field. This makes it possible to suppress changes in the picture quality caused by the viewing angle directions according to the rise of the axes of the molecules, so that the viewing angle characteristics can be improved.

However, the viewing angle characteristics are not perfect even in the case of the lateral electric field mode. In particular, the nematic liquid crystal used for the lateral electric field mode exhibits the uniaxial optical anisotropy. Thus, there is acquired prescribed retardation when viewed from the normal direction of the substrate. However, as shown in FIG. 16, when viewed from an oblique viewing direction by tilting the viewing angle from the normal of the substrate, there are different changes in the retardation caused by the liquid crystal layer for the case where the viewing angle is tilted to the major-axis direction of the liquid crystal and for the case where the viewing angle is tilted to the minor-axis direction of the liquid crystal. In the case where the viewing angle is tilted to the minor-axis direction, the refractive index anisotropy of the liquid crystal on the appearance does not change. Thus, the optical path length transmitting the liquid crystal layer becomes greater, so that the retardation $\Delta n \cdot d$ becomes greater. Meanwhile, in the case where the viewing angle is tilted to the major-axis direction, the refractive index anisotropy of the liquid crystal on the appearance becomes smaller. Thus, the retardation $\Delta n \cdot d$ becomes smaller, even though the optical path length transmitting the liquid crystal layer becomes longer. Normally, with the lateral electric field mode, black display is acquired by making the alignment direction of the liquid crystal aligned with one of absorption axes 28 and 29 (FIG. 16) of the crossed Nichol polarization plate by applying no voltage and white display is acquired through rotating the liquid crystal from the polarization axis direction by applying a lateral electric field. In that state, the effective retardation becomes smaller when viewed from the oblique viewing angle of the azimuth of the rotated liquid crystal due to the reasons described above, so that the chromaticity is shifted to the direction of blue. When viewed from the oblique direction perpendicular to the azimuth of the rotated liquid crystal, the effective retardation becomes greater. Thus, the chromaticity is shifted to the direction of red. Therefore, both cases are to be colored.

Further, as shown in FIG. 17, polarization axes 60 and 61 are orthogonal to each other from the front direction, and the liquid crystal rotates therebetween to control the transmission light. However, when viewed from the oblique viewing angle direction at the azimuth of 45 degrees from the polarization axis, the transmission axes of the polarization plate do not become orthogonal to each other as shown in FIG. 17B and FIG. 17C, so that an azimuth 62 of ordinary light axis of the liquid crystal comes to rotate between the non-orthogonal polarization axes. Therefore, in the oblique viewing direction in a state where the azimuth 62 of the ordinary light axis of the liquid crystal is facing towards the polarizer absorption axis (black display from the front), light is leaked so that the black display state becomes brighter. Further, when viewed from the viewing direction in a layout as shown in FIG. 17B, the luminance is decreased at the point where the liquid crystal is slightly rotated from the black display state. This results in generating inversion of gradation.

In the technique depicted in JP No. 3120751 (Patent Document 1), as shown in FIG. 20A, disclosed is a method with which the directions of an electric field 70 applied to the liquid crystal are set to two mutually opposite directions which make a specific angle with respect to an initial alignment direction 69 of the liquid crystal. Through setting the electric field 70 to be applied from the two directions as described above, the liquid crystal rotates in different directions from each other in a region 1 and a region 2 provided that each of the regions where the electric fields are generated is defined as the region 1 (65) and the region 2 (66).

When viewed from the oblique viewing angle at an azimuth 71 of the viewing angle making 45 degrees with respect to the absorption axes 28 and 29 of the both polarization plates, the liquid crystal is to be rotated to the two directions making at about 45 degrees from the direction of the polarization axes for white display. Thus, as shown in FIG. 20B, the major-axis direction and the minor-axis direction from the oblique direction of the liquid crystal in the both regions compensate with each other. Therefore, it is possible to suppress coloring observed from the oblique directions as described in FIG. 16.

Further, as shown in FIG. 20C, among four quadrants formed by the non-orthogonal polarization axes 60 and 61, liquid crystal directors in the region 1 are rotated in a quadrant where the angle formed by the polarization angles is an obtuse angle while the liquid crystal directors in the region 2 are rotated in a quadrant where the angle formed by the polarization angles is an acute angle. Thus, the both regions compensate with each other, so that the inversion of gradation viewed from the oblique direction at 45 degrees can also be suppressed.

The technique of Patent Document 1 described above is designed to rotate the liquid crystal by applying the voltage between two kinds of strip electrodes 63 and 64 by the lateral electric field 70 generated therebetween. In the meantime, recently, widely used is the so-called FFS-mode lateral electric field liquid crystal display device in which, as shown in FIG. 28A and FIG. 28B, a plan electrode 82 is formed on a substrate 81, a strip electrode 84 is disposed thereon via an insulating film 83, a voltage is applied therebetween, and a fringe electric field substantially in parallel to the substrate 81 generated at the edges of the strip electrode 84 is used to rotate a liquid crystal 85.

Through the use of such lateral electric field liquid crystal display device that utilizes the fringe electric field, the liquid crystal on the electrodes can also be rotated. Therefore, the light use efficiency can be increased even more. Further, with the FFS mode, the rotation of the liquid crystal becomes dominant on the substrate side where the fringe electric field is formed. Thus, compared to the rotation of the liquid crystal by the pure lateral electric field, the dependency of the electro-optical property on the thickness of the liquid crystal layer becomes smaller and the margin of the liquid crystal cell gap becomes greater. Therefore, the difficulties of manufacturing can be eased.

However, in the case of the FFS mode, the voltage-transmittance characteristics is largely shifted towards the low-voltage side as shown in FIG. 29 when the viewing angle is tilted towards the initial alignment direction of the liquid crystal in particular. Thus, the delicate coloring using the half gray tone level becomes whiter in the oblique viewing angle direction.

As a result of analyzing such phenomenon, it is found that there are two following reasons. As shown in FIG. 18A, a case where the viewing angle is tilted by $\eta$ from the normal of the substrate towards the azimuth of the polarization axis of the incident-side polarization plate, is considered. The unit vectors in the absorption axis direction of the orthogonal polarization plates when viewed from the front are defined as the p for the polarizer and a for the analyzer. Considering the state where the liquid crystal director is rotated by $\theta$ from the initial state, the director n of the liquid crystal can be expressed as follows.

$$n = \cos\theta \cdot p + \sin\theta \cdot a$$

Provided that the unit vector in the direction of a light propagation is s and that the transmission axis directions of the polarization plates perpendicular to the light propagation are p', a' and the axis direction of the ordinary light of the liquid crystal orthogonal to the light propagation is n', following relations can be acquired.

$$p' = p \times s$$

$$a' = a \times s$$

$$n' = n \times s = \cos\theta \cdot p' + \sin\theta \cdot a'$$

While p' and a' are orthogonal to each other, the lengths thereof are different as shown in the following expressions.

$$|p'| = \cos\eta$$

$$|a'| = 1$$

Therefore, as shown in FIG. 18B, the angle $\phi$ formed between n' and p' becomes larger than $\theta$. In this case, the transmission can be acquired by a following expression.

$$T \propto \cos^2(\pi/2 - 2\phi) = \sin^2(2\phi) > \sin^2(2\theta)$$

Therefore, the transmittance of the oblique viewing angle becomes relatively larger in the region where $\theta$ is small compared to "$\theta$–T" characteristics from the front when $\theta$ changes. Thus, the peak is at the point where $\phi$ corresponds to 45 degrees. When $\phi$ becomes equal to or larger than that, the transmittance is decreased inversely and deviated from the ideal characteristics. In the case of FFS, the rotation angle becomes larger because a strong lateral electric field is generated in the vicinity of the edges of the strip electrodes while the electric field is weak and the rotation angle is small on the strip electrodes as well as in the part corresponding to the slits between the strip electrodes. Thus, a high transmittance can be acquired by rotating the liquid crystal on the average in those regions. Therefore, in the vicinity of the edges of the strip electrodes with high light use efficiency, the liquid crystal is largely rotated from the region where the voltage is relatively low. Thus, the rotation angle $\phi$ when viewed from the oblique viewing angle becomes still larger. As a result, the rotation angle $\phi$ of the liquid crystal when viewed from the oblique viewing angle exceeds 45 degrees with a voltage that is considerably lower than the voltage with which the highest transmittance can be acquired from the front view, which eminently causes a phenomenon of transmittance saturation.

In a case where the lateral electric field 70 is applied between the two kinds of strip electrodes 63 and 64 as shown in FIG. 20A, the liquid crystal is mainly rotated by the lateral electric field 70 generated between the electrodes 63 and 64. Thus, the liquid crystal is not rotated so much on the strip electrodes 63, 64 and transmittance nearby is low. However, it is not necessary to increase the rotation of the liquid crystal between the electrodes 63 and 64 so much. Therefore, while the shift as described above is generated slightly, the level of the shift is so small that it is not an issue.

As shown in FIG. 21A, considered is a case where there are two directions of the electric field 70 for the initial alignment 69 of the liquid crystal in a case of the FFS mode. In this case, it is possible to improve the viewing angle regarding the coloring and the inversion of gradation in a case of viewing from the azimuth of 45 degrees from the polarization plates due to the same reason for which the electric field is applied from two directions in the mode where the lateral electric field is applied between the strip electrodes shown in FIG. 20A. However, as shown in FIG. 21A, it is not possible to suppress the low-voltage shift of the voltage-transmittance characteristics when viewed from the oblique direction of the azimuth of p. This can be described as follows. The ordinary light directions n1' and n2' of the liquid crystal perpendicular to the light propagation lay can be expressed as in following expressions.

$$n1' = n1 \times s = \cos\theta \cdot p' + \sin\theta \cdot a'$$

$$n2' = n2 \times s = \cos\theta \cdot p' - \sin\theta \cdot a'$$

As shown in FIG. 21B, the angle $\phi$ formed between n' and p' is equivalent in the both regions. Thus, the liquid crystal is rotated faster than the case of the rotation angle $\theta$ of the front view, so that it is not possible to compensate with each other even when the electric field 70 is applied to two directions. Therefore, it is not possible to overcome such issue that the voltage-transmittance characteristics is shifted to the low-voltage side, and the display thereby appears whiter in a bright halftone and that a delicate coloration cannot be displayed correctly in the oblique viewing angle.

Further, liquid crystal molecules generally have pretilt. When an electric field is applied, the liquid crystal molecules tend to rise in the rising direction of the pretilt. When the liquid crystal rises as in this case, the ordinary light direction n' of the liquid crystal viewed from the oblique viewing angle shifts to the direction of z' given by a following expression provided that z is the unit vector of the direction perpendicular to the substrate as shown in FIG. 19.

$$z' = z \times s$$

Therefore, the rotation angle θ of the liquid crystal becomes still larger, so that the shift of the voltage-transmittance characteristics towards the low-voltage direction becomes still greater when viewed from the oblique viewing angle of the direction of the rise of the pretilt. As a result, white-tinged display with a light halftone becomes dominant.

In view of the above-described factors, it is an exemplary object of the present invention to provide a fine display device with which the delicate coloration of a halftone does not appear as white-tinged when viewed from any viewing angles by suppressing the shift of the voltage-transmittance characteristics to the low-voltage side when viewed from the oblique viewing angle of the azimuth of the initial alignment of the liquid crystal in an FFS mode that is capable of more easily increasing the transmittance.

SUMMARY OF THE INVENTION

The lateral electric field liquid crystal display device according to an exemplary aspect of the invention is characterized as a lateral electric field liquid crystal display device which includes: a substrate; a plan electrode formed in a plan form on the substrate; a strip electrode or strip electrodes formed in a strip form on the plan electrode via an insulating film; and a liquid crystal aligned substantially in parallel to the substrate, the liquid crystal display device controlling a display by rotating the liquid crystal within a plane substantially in parallel to the substrate by an electric field between the plan electrode and the strip electrode, wherein: each pixel constituting the display is divided into a first region and a second region; an extending direction of the strip electrode of the first region and an extending direction of the strip electrode of the second region are orthogonal; an alignment azimuth of the liquid crystal of the first region and an alignment azimuth of the liquid crystal of the second region are orthogonal; and an angle formed between the extending direction of the strip electrode in the first region and the alignment azimuth of the liquid crystal and an angle formed between the extending direction of the strip electrode in the second region and the alignment azimuth of the liquid crystal are same.

The lateral electric field liquid crystal display device manufacturing method according to another exemplary aspect of the invention is a method for manufacturing the lateral electric field liquid crystal display device, wherein alignment processing of the liquid crystal is performed by photo-alignment.

DETAILED DESCRIPTION OF THE PREFERRED EMBODIMENTS

Figure 1:
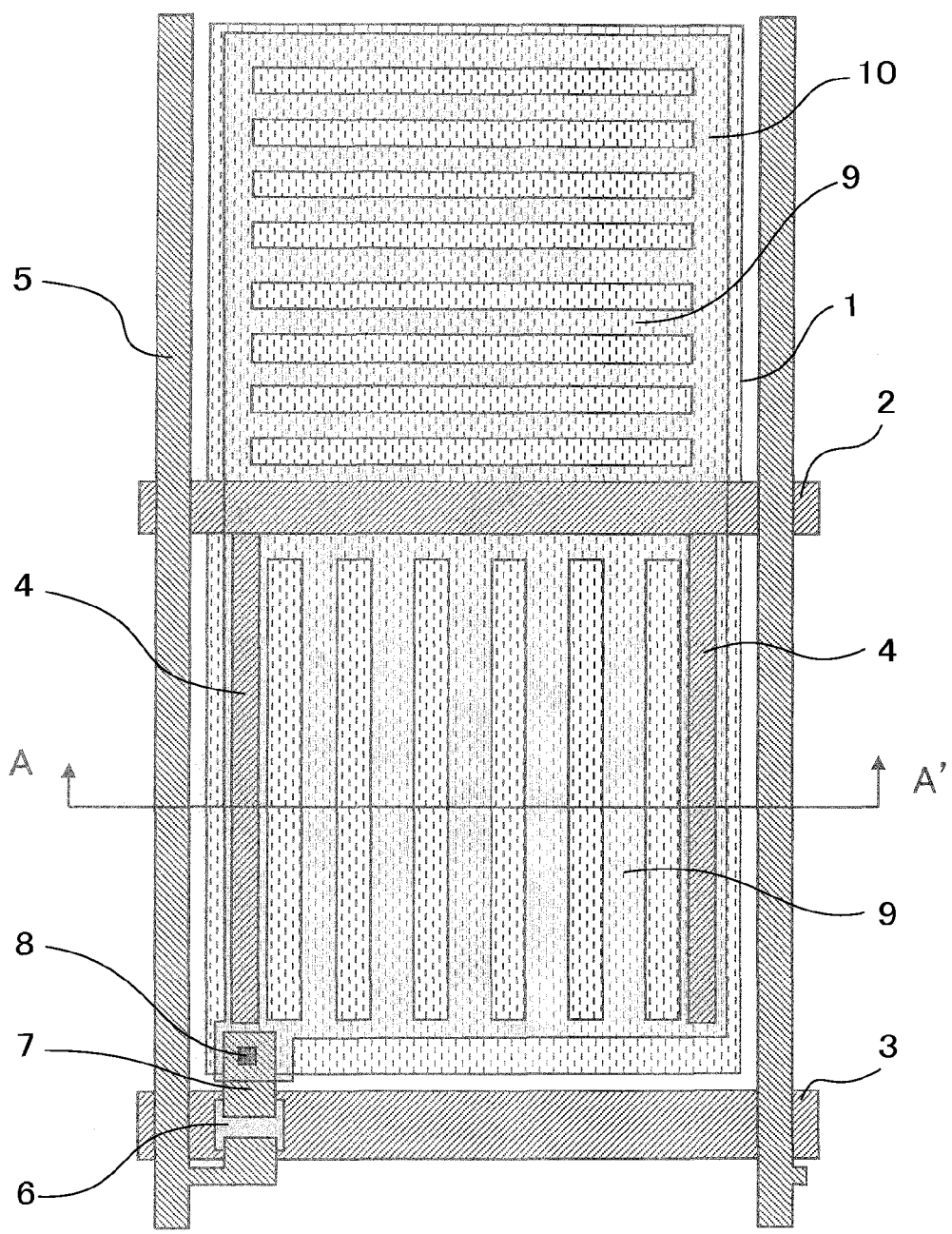
FIG. 1 is a plan view showing the structure of one pixel of a liquid crystal display device according to a first exemplary embodiment.

In the drawings, disclosed are: a plan common electrode (plan electrode) 1; a common signal wiring 2; a scanning line 3; a light-shielding layer 4 constituted with a first metal layer; a data line 5; a thin film semiconductor layer 6; a pixel electrode part 7 constituted with a second metal layer; a pixel electrode through hole 8; a strip pixel electrode (strip electrode) 9; a part 10 for connecting the strip pixel electrodes; a strip electrode 11; a liquid crystal 12; a gate insulating film 13; a passivation film 14; alignment films 15, 16; a black matrix 17; a color layer 18; an overcoat 19; transparent insulating substrates (substrate, counter substrate) 20, 21; an incident-side polarization plate 22; an exit-side polarization plate 23; a region 1 (first region, 24) of a first exemplary embodiment; an initial alignment direction 25 of the region 1 of the first exemplary embodiment; a region 2 (second region, 26) of the first exemplary embodiment; an initial alignment direction 27 of the region 2 of the first exemplary embodiment; an incident-side polarization plate absorption axis 28; an exit-side polarization plate absorption axis 29; a region 1 (first region, 30) of a second exemplary embodiment; an initial alignment direction 31 of the region 1 of the second exemplary embodiment; a region 2 (second region, 32) of the second exemplary embodiment; an initial alignment direction 33 of the region 2 of the second exemplary embodiment; a region 1 (third region within the first region, 34) of a third exemplary embodiment; an initial alignment direction 35 of the region 1 of the third exemplary embodiment; a region 2 (fourth region within the first region, 36) of the third exemplary embodiment; an initial alignment direction 37 of the region 2 of the third exemplary embodiment; a region 3 (fifth region within the second region, 38) of the third exemplary embodiment; an initial alignment direction 39 of the region 3 of the third exemplary embodiment; a region 4 (sixth region within the second region, 40) of the third exemplary embodiment; an initial alignment direction 41 of the region 4 of the third exemplary embodiment; an electric field 42; a rise direction 43 of the liquid crystal; a region 1 (third region within the first region, 44) of a fourth exemplary embodiment; an initial alignment direction 45 of the region 1 of the fourth exemplary embodiment; a region 2 (fourth region within the first region, 46) of the fourth exemplary embodiment; an initial alignment direction 47 of the region 2 of the fourth exemplary embodiment; a region 3 (fifth region within the second region, 48) of the fourth exemplary embodiment; an initial alignment direction 49 of the region 3 of the fourth exemplary embodiment; a region 4 (sixth region within the second region, 50) of the fourth exemplary embodiment; an initial alignment direction 51 of the region 4 of the fourth exemplary embodiment; strip common electrode (strip electrode) 52; a plan pixel electrode (plan electrode) 53; a common electrode through hole 54; a common electrode 55 for shielding a bus line; a region 1 (first region, 56) of a fifth exemplary embodiment; an initial alignment direction 57 of the region 1 of the fifth exemplary embodiment; a region 2 (second region, 58) of the fifth exemplary embodiment; an initial alignment direction 59 of the region 2 of the fifth exemplary embodiment; an incident-side polarization plate absorption axis 60; an exit-side polarization plate absorption axis 61; a liquid crystal ordinary light azimuth 62; a strip pixel electrode 63; a strip common electrode 64; a region 1 (65); a region 2 (66); a liquid crystal ordinary light azimuth 67 of the region 1; a liquid crystal ordinary light azimuth 68 of the region 2; a liquid crystal alignment azimuth 69; an electric field 70; a viewing angle azimuth 71; a liquid crystal ordinary light azimuth 72 of the region 1; a liquid crystal ordinary light azimuth 73 of the region 2; a substrate 81; a plan electrode 82; an insulating film 83; a strip electrode 84; a liquid crystal 85; alignment azimuths 86, 87 when the alignment is divided between pixels; liquid crystal pretilt directions 88, 89; a TFT array substrate 90; a color filter substrate 91; pixels 92, 93, 94, 95; one unit 96 of display; pixels 96R, 96G, 96B; one unit 97 of display; pixels 97R, 97G, 97B, and the like.

Figure 22A:
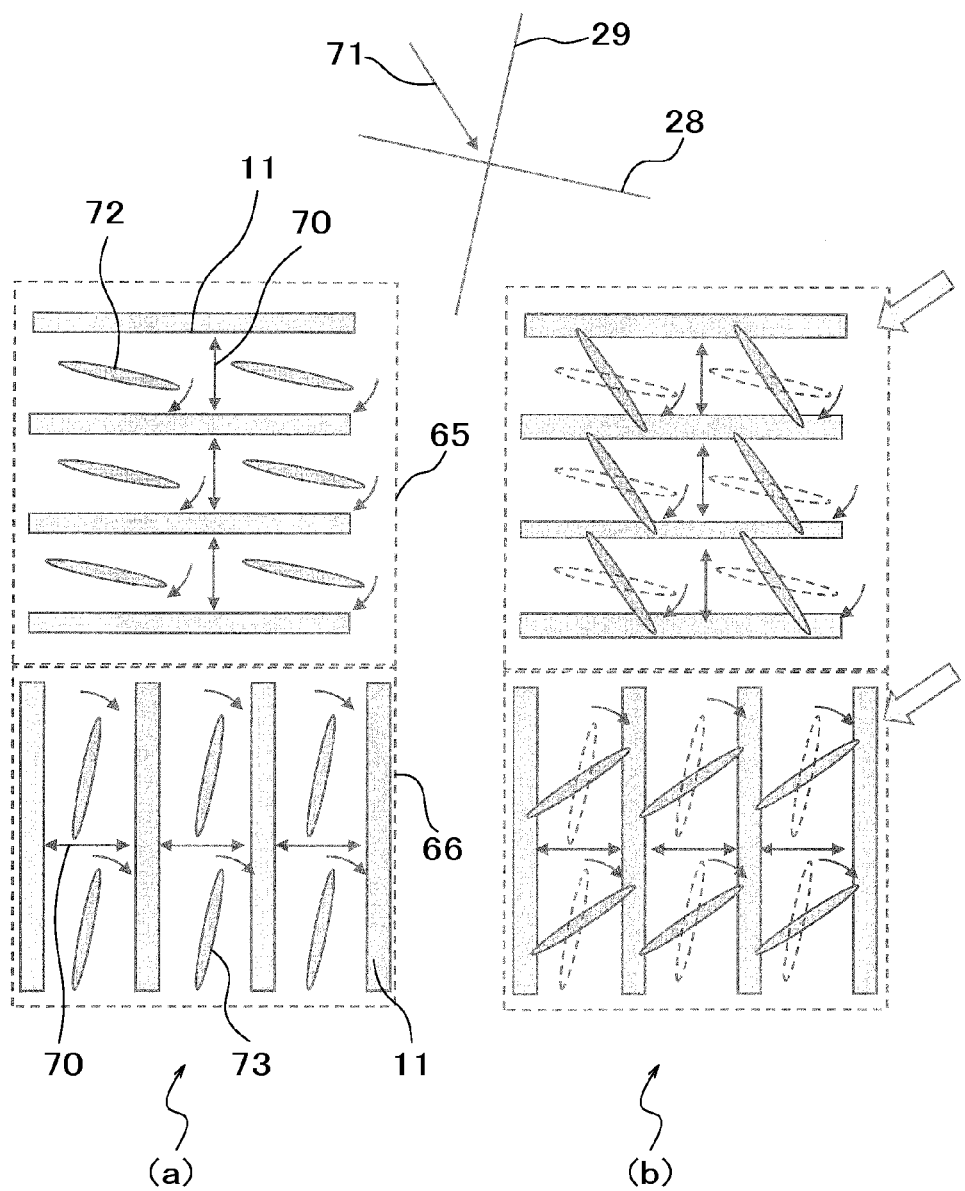
FIGS. 22A and 22B show charts of the theory for improving the viewing angle according to the present invention.

In order to overcome the above-described issues, the liquid crystal display device of the present invention 1 is a lateral electric field liquid crystal display device which includes a transparent electrode formed in a plan form and a strip transparent electrode formed and disposed thereon via an insulating film, the liquid crystal display device controlling a display by rotating the liquid crystal aligned on the substrate substantially in parallel within a plane substantially in parallel to the substrate by an electric field between the both electrodes, wherein: each pixel constituting the display is divided into two regions and the extending direction of the strip electrode in each region are set to be orthogonal so that the directions of the lateral electric fields formed in each of the regions become orthogonal to each other; alignment directions of liquid crystal molecules in each of the regions are orthogonal to each other; and the angles formed between the extending directions of the strip electrode and the alignment directions of the liquid crystals are the same. FIG. 22 shows charts for describing the theory of the present invention 1. As in the charts, the pixel is divided into two regions, alignment of the liquid crystal is set to be two orthogonal directions (72, 73), the directions of the lateral electric fields 70 formed by the strip electrode 11 in each region are set to be orthogonal to each other by setting the direction of the electric fields formed by the strip electrode in each of the regions to make a specific angle with the alignment directions of each of the regions. Each of the regions is defined as the region 1 (65) and the region 2 (66).

Figure 22B:
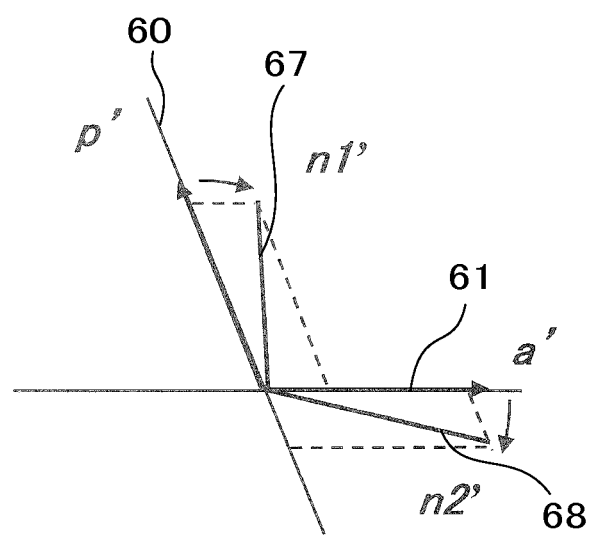
Figure 23A:
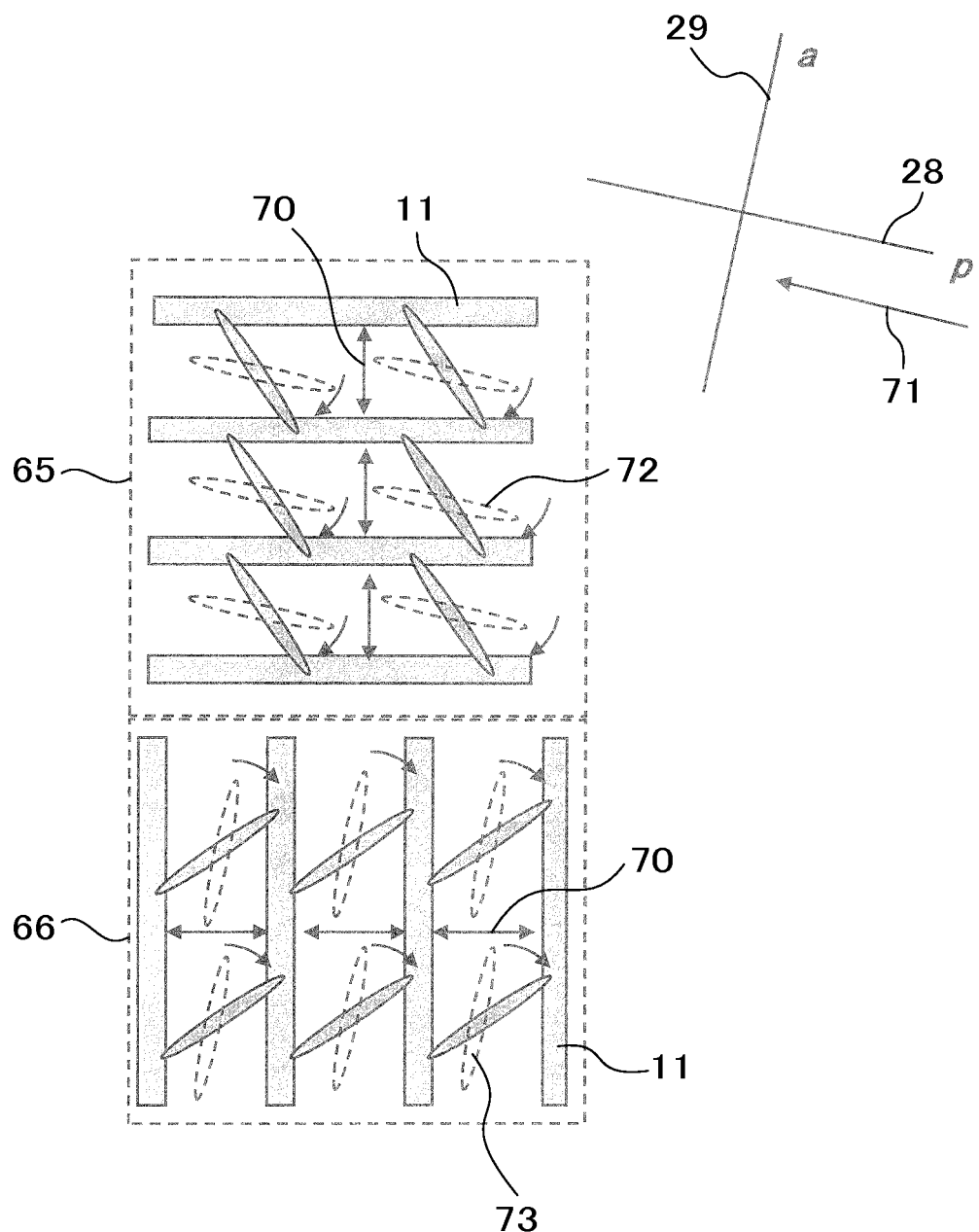
FIGS. 23A and 23B show charts regarding the effects of the improvements in the viewing angle according to the present invention.

In this case, as shown in FIG. 22B, the liquid crystal molecules are always facing with each other by 90 degrees at all the voltages so that coloring is compensated from all the directions. Further, when viewed obliquely from 45-degree directions as shown in FIG. 22C, the liquid crystal directors are to move different quadrants of the non-orthogonal polarization axes 60 and 61. Thus, those are to compensate with each other. Therefore, inversion of gradation viewed from the oblique viewing angle of 45-degree directions as the second issue can be suppressed as well. Further, when viewed from the oblique viewing angle of the azimuth of p as shown in FIG. 23A, ordinary light directions n1' and n2' of the liquid crystal orthogonal to the light propagation in the region 1 (65) and the region 2 (66) can be expressed as in following expressions.

$$n1'=n1 \times s = \cos\theta \cdot p' + \sin\theta \cdot a'$$

$$n2'=n2 \times s = -\sin\theta \cdot p' + \cos\theta \cdot a'$$

Figure 23B:
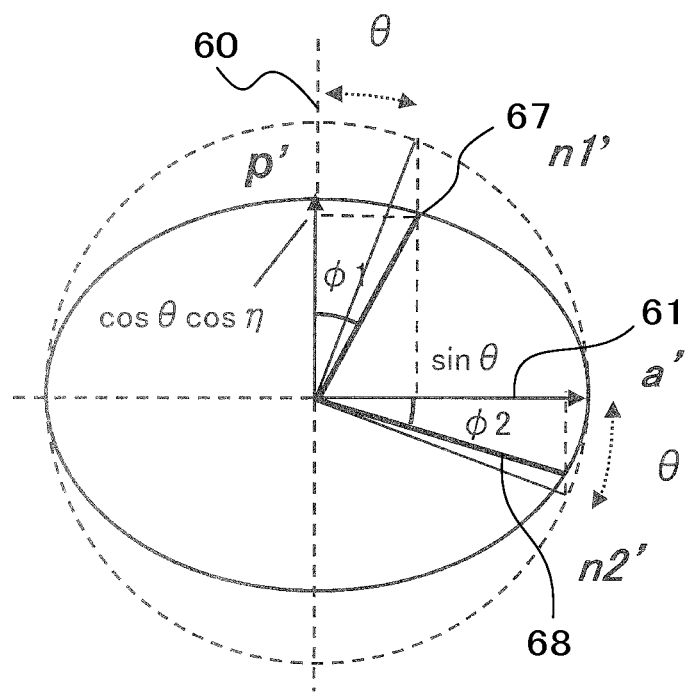

As shown in FIG. 23B, angle φ1 formed between the azimuth n1' of the ordinary light of the liquid crystal of the region 1 (65) and p' and angle φ2 formed between the azimuth n2' of the ordinary light of the liquid crystal of the region 2 (66) and a' are different, and the relation thereof can be expressed as follows.

$$\phi 1 > \theta > \phi 2$$

Transmittance T1 of the region 1 (65) and transmittance T2 of the region 2 (66) compensate with each other.

Figure 24A:
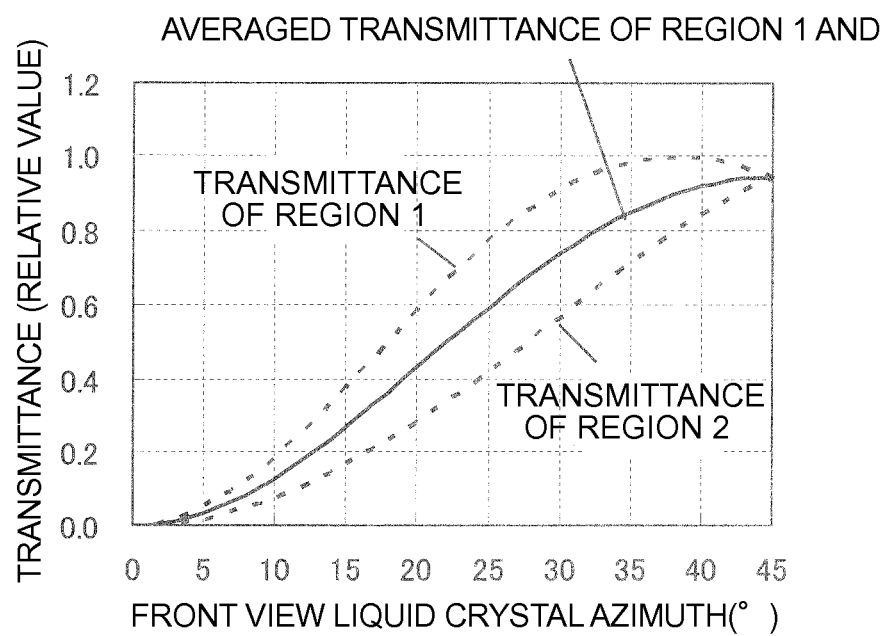
FIGS. 24A and 24B show charts regarding the effects of the improvements in the viewing angle according to the present invention 1.
Figure 24B:
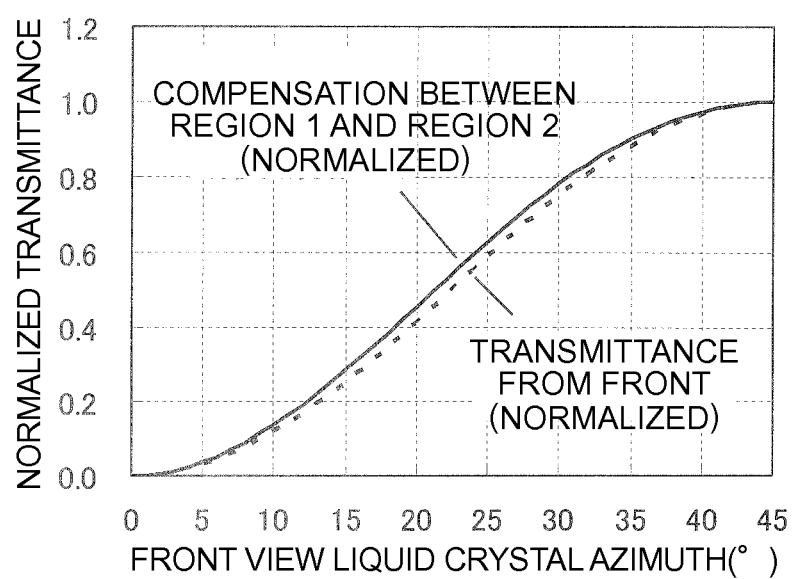

FIG. 24A shows the transmittance of each of the regions 1 and 2 when viewed from the viewing angle in the azimuth of p at a polar angle of 60 degrees. It is quite shifted from the front viewing angle in both the region 1 and region 2. However, it can be brought closer to the transmittance curve of the front viewing angle by compensating in the both regions. As shown in FIG. 24B, comparing them by the graphs which is normalized by the peak transmittance, it can be found that the transmittance curve becomes close to the curve for the front view due to the compensation of the region 1 and region 2.

In a case of the lateral electric field liquid crystal display device which includes a transparent electrode formed in a plan form and a strip transparent electrode formed and disposed thereon via an insulating film and controls display by rotating the liquid crystal molecules aligned on a substrate substantially in parallel within a plane substantially in parallel to the substrate by an electric field between the both electrodes, a strong lateral electric field (fringe field) is formed in the vicinity of the strip transparent electrode. Thus, the liquid crystal is greatly rotated by relatively a low voltage, so that the voltage-transmittance curve is largely shifted to the low-voltage side, if it is used with the region 1 alone. Therefore, by providing, within one pixel, the two regions where the alignment of the liquid crystal and the applying direction of the electric field are set to be orthogonal, it is possible to acquire the fine lateral electric field liquid crystal display device having less shift in the voltage-transmittance characteristics even when viewed from the oblique viewing angle from the direction of the polarization axis.

The present invention 2 is an active matrix type liquid crystal display device which is characterized that the two regions having the orthogonal alignment directions in the lateral electric field crystal display device according to the present invention 1 are formed to have substantially a same-size area.

As described above, by making the two regions of the orthogonal alignment directions constituting the pixel have the same-size area, the compensation between the both regions becomes perfect. This makes it possible to acquire still finer viewing angle characteristics. The present invention 3 is a lateral electric field liquid crystal display device according to the present invention 1 or 2, which is characterized that the pretilt angle of the liquid crystal is substantially 0 degree and the voltage-transmittance properties when viewed from the oblique viewing angles that are in 180 degree different azimuths are almost equivalent.

Figure 25:
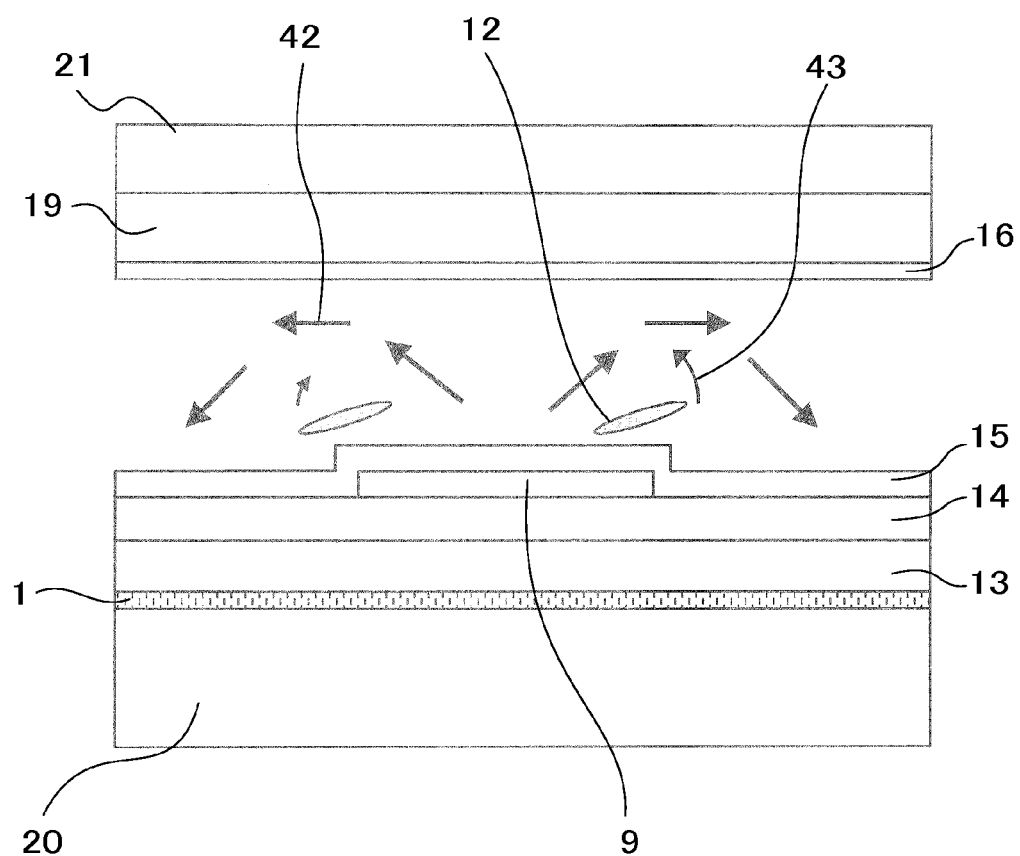
FIG. 25 is a chart for describing the relation between the direction of the pretilt of the liquid crystal and the extent of the rise of the liquid crystal when an electric field is applied.

In general, the directors of the liquid crystal have pretilt with respect to the substrate face since the liquid crystal molecules are aligned to rise in the direction of rubbing when alignment processing by the rubbing is performed. When such pretilt angle exists, rise of the liquid crystal directors by the fringe electric field becomes larger in the direction of the pretilt as shown in FIG. 25 when the electric field is applied.

Figure 19:
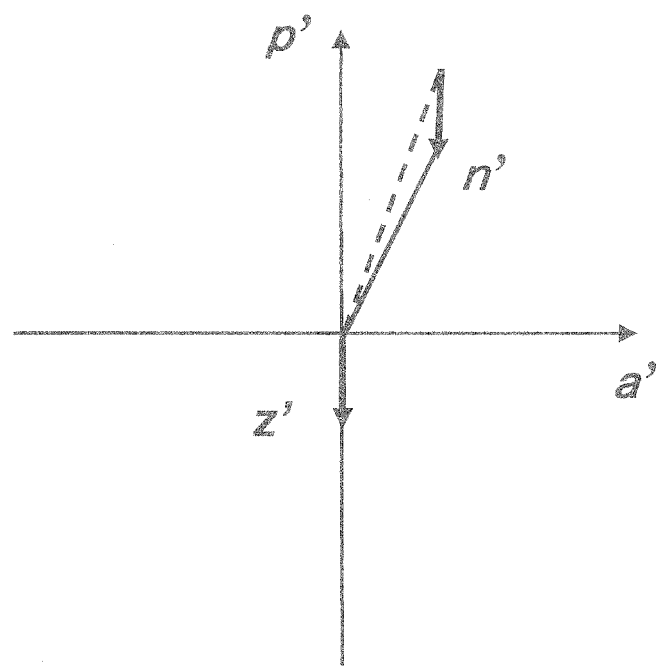
FIG. 19 is a chart for describing the theory of causing the shift of the voltage-transmittance characteristics in accordance with the rise of the liquid crystal in a lateral electric field type of an FFS mode according to the related technique.
Figure 20A:
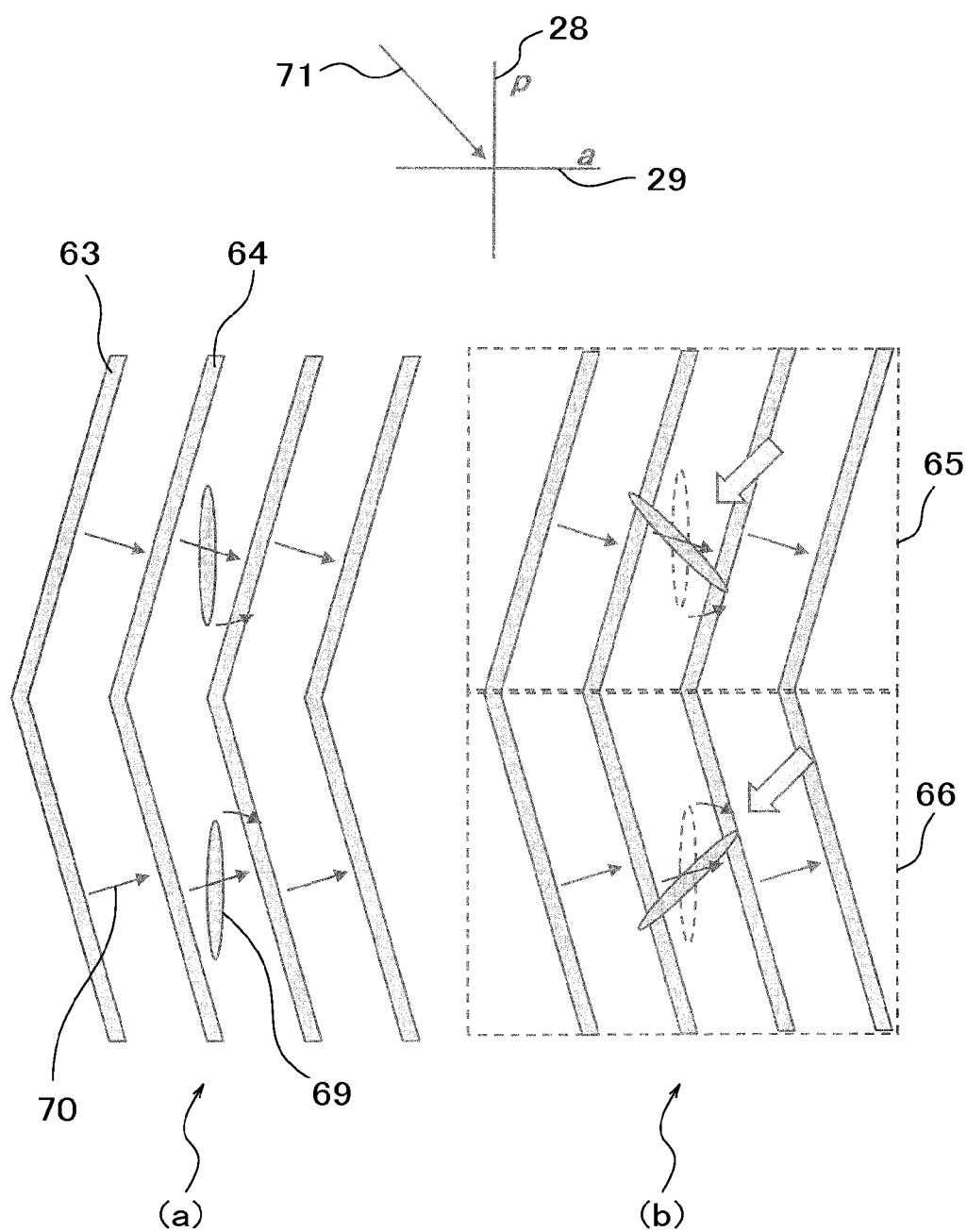
FIGS. 20A and 20B shows chart regarding the effects of the improvements in the viewing angle according to the related technique.
Figure 20B:
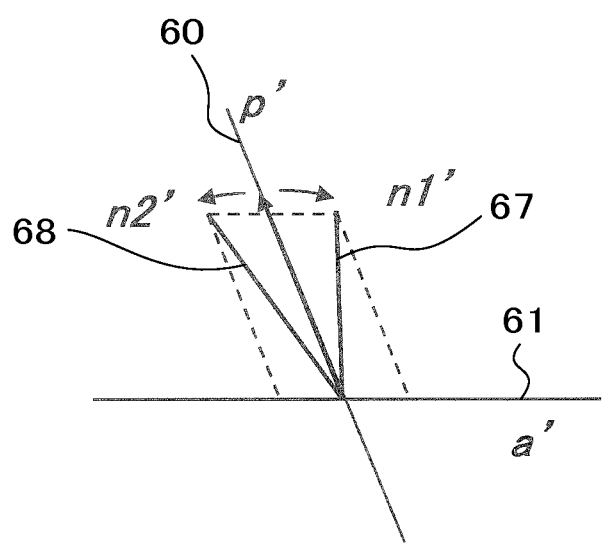
Figure 21A:
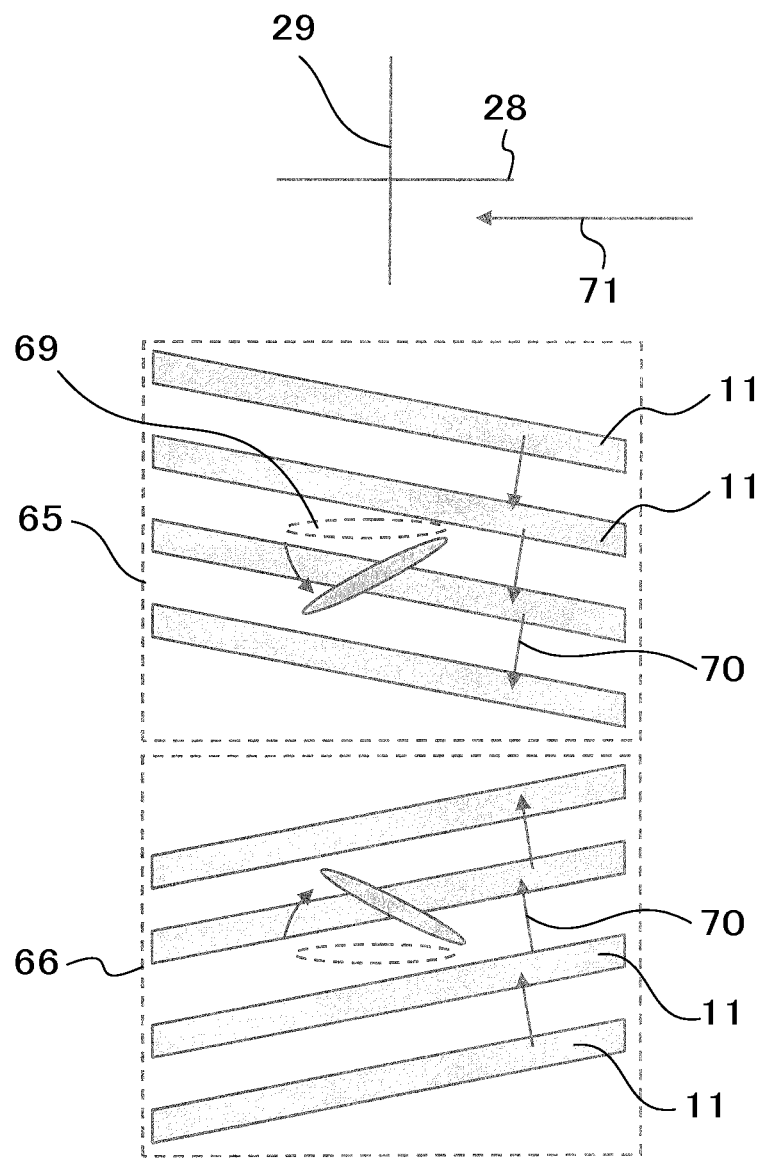
FIGS. 21A and 21B show charts regarding issues of the viewing angle characteristics which cannot be overcome by the related technique.
Figure 21B:
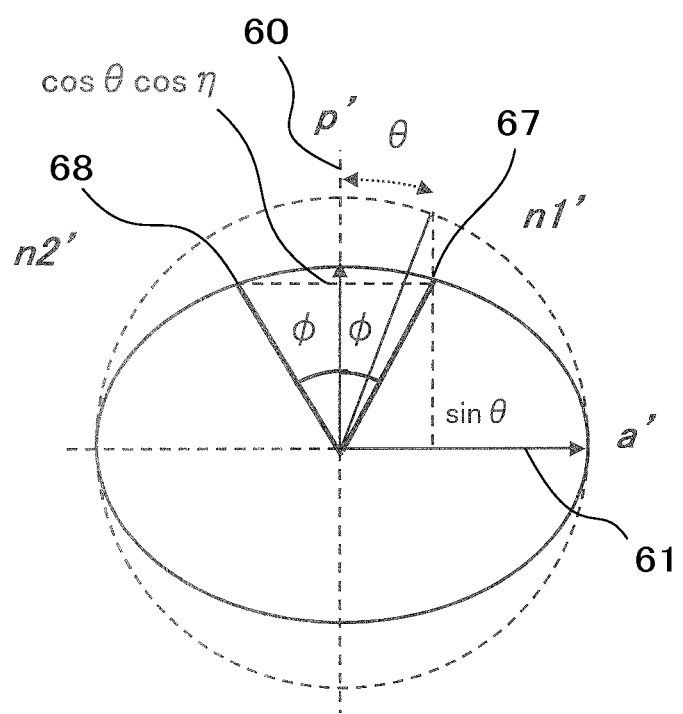

When the liquid crystal directors shift and rise from the plane in parallel to the substrate, as has been described by referring to FIG. 19, the ordinary light axis direction of the liquid crystal is shifted towards the direction of z', the rotation angle of n' within p'–a' plane becomes large, and the voltage-transmittance characteristics is shifted to the low-voltage side.

Figure 26:
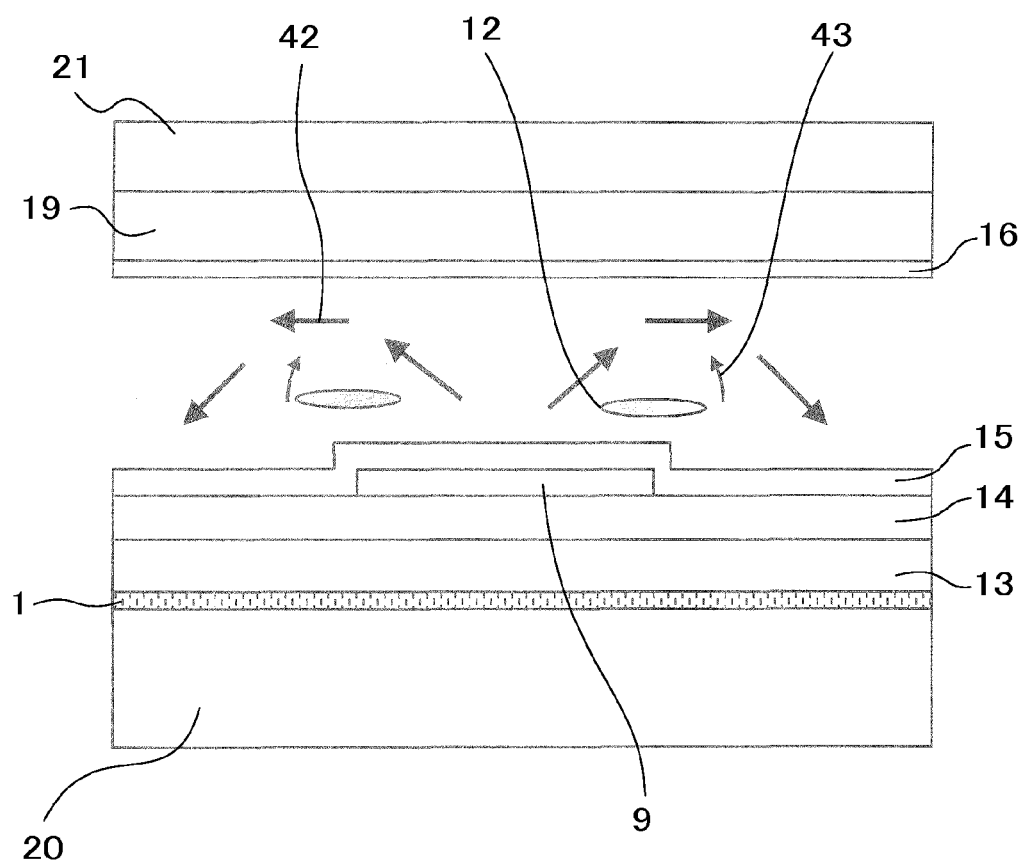
FIG. 26 is a chart for describing that the extent of the rise of the liquid crystal when an electric field is applied becomes symmetric by effectively setting the direction of the pretilt of the liquid crystal to 0 degree.
Figure 27:
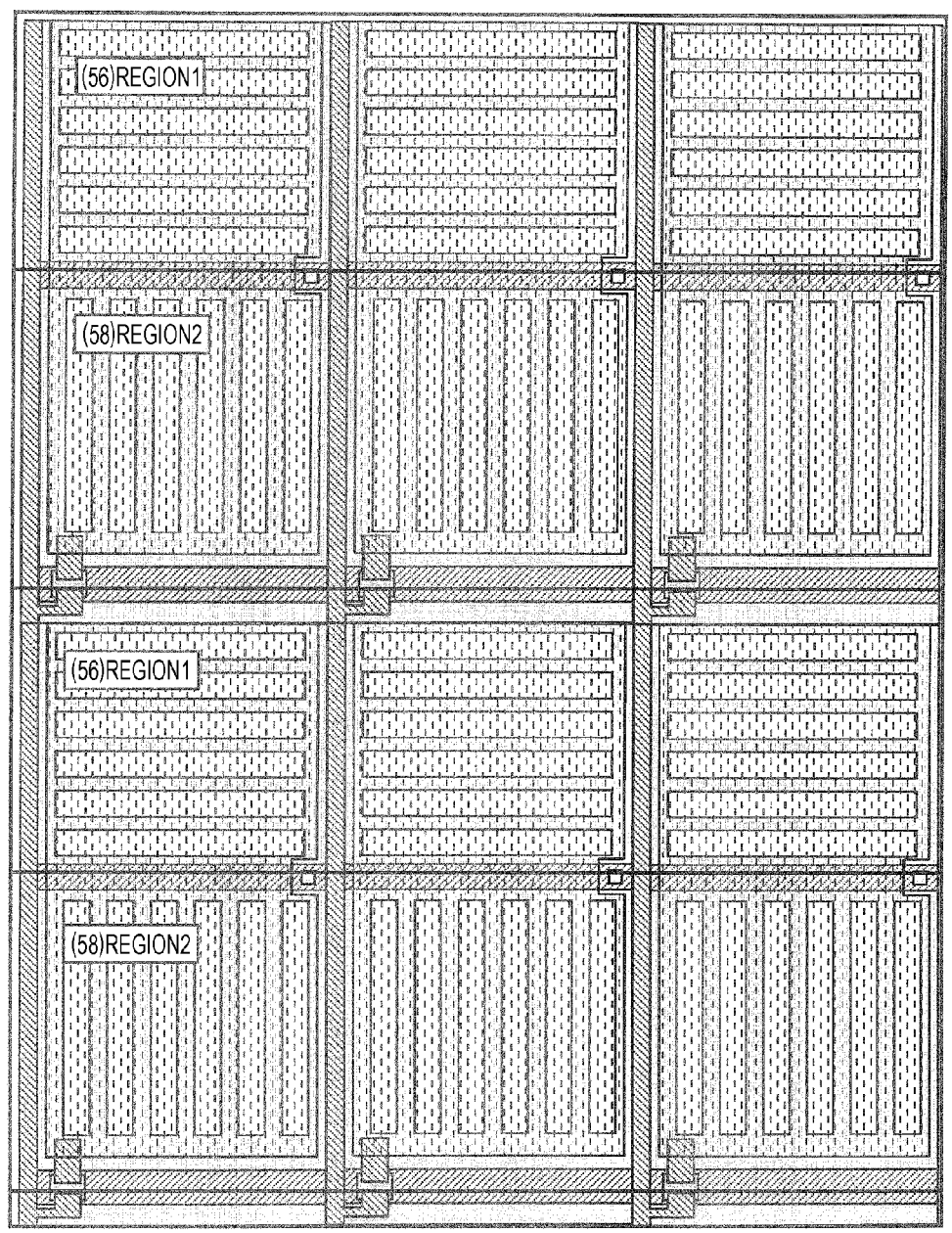
FIG. 27 is a plan view showing the state of division of the alignment over a plurality of pixels according to the fifth exemplary embodiment.
Figure 28A:
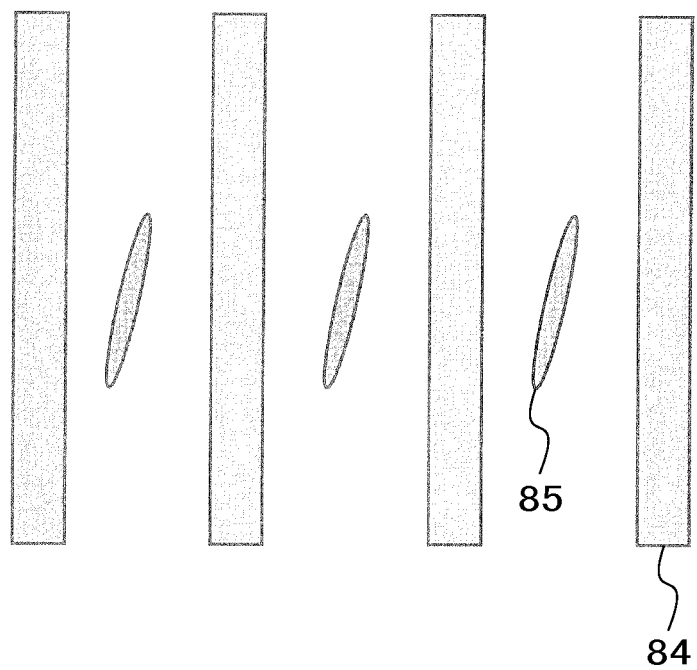
FIGS. 28A and 28B show charts showing the structure of the FFS mode according to the related technique.
Figure 28B:
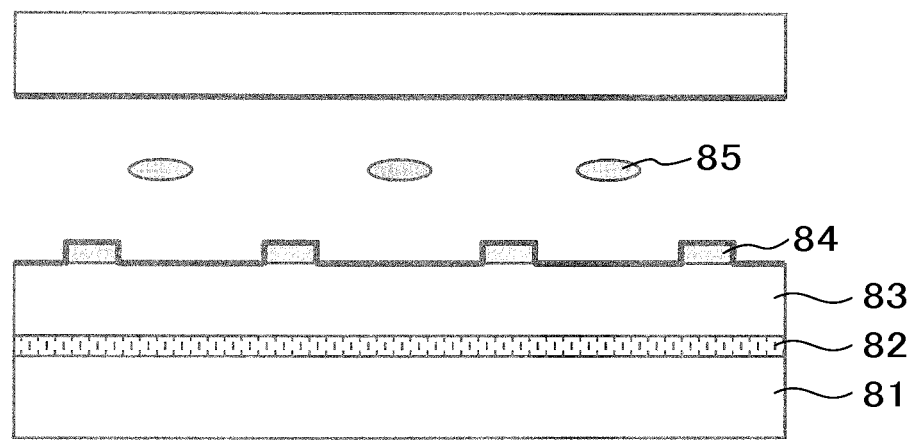
Figure 29:
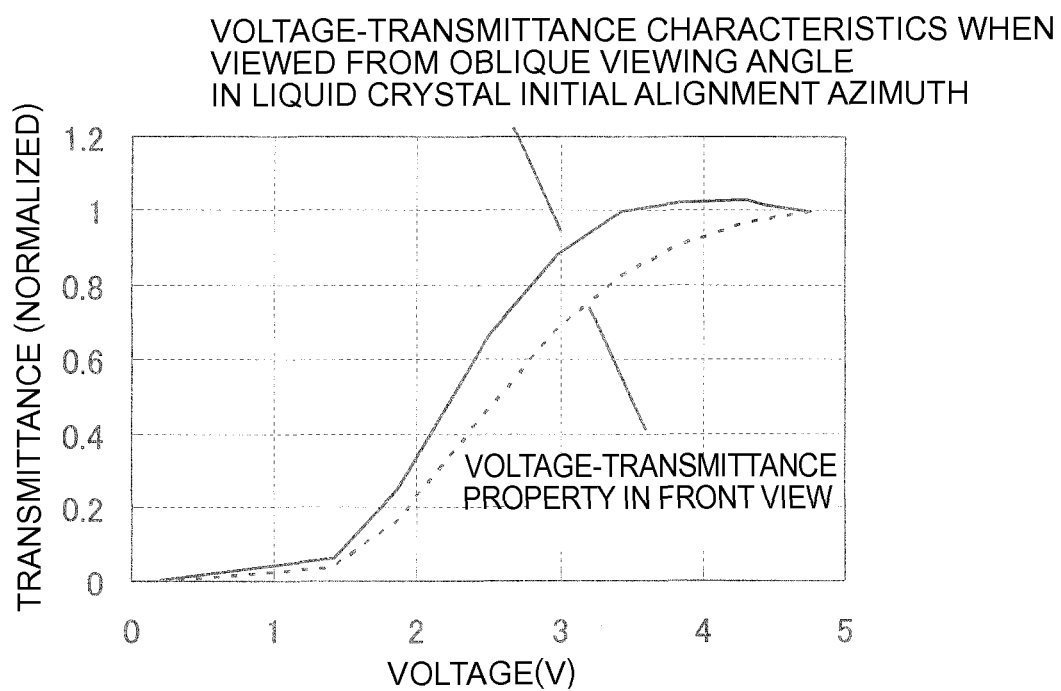
FIG. 29 shows a chart of a case where the voltage-transmittance characteristics when viewed from the oblique viewing angle of the azimuth of the absorption axis of the incident-side polarization plate and the voltage-transmittance characteristics when viewed from the front are compared in the FFS mode of the related technique.

In the meantime, when photo-alignment and the like are employed, the pretilt angle can be set to substantially 0 degree. As shown in FIG. 26, the rise of the liquid crystal directors by the fringe electric field becomes symmetric, so that the voltage-transmittance properties when viewed from the oblique viewing angles that are in 180 degree different azimuths become almost equivalent. This makes it possible to suppress increase in the deterioration of the voltage-transmittance characteristics when viewed from the oblique viewing angle of one azimuth, so that it is possible to acquire a fine display property in all the azimuths.

The present invention 4 is a lateral electric field liquid crystal display device which is characterized that the liquid crystal in the lateral electric field liquid crystal display device according to the present invention 1 has a pretilt angle larger than 0 degree and two regions having opposite pretilt directions from each other exist in each of the two regions having the orthogonal alignment directions.

There are cases where it is not possible to avoid incidence of pretilt depending on the conditions and the like of the alignment film or the alignment process. In that case, through providing the two regions having the opposite pretilt directions from each other in the two regions having the orthogonal alignment azimuths, the directions where the rise of the liquid crystal becomes dominant becomes opposite from each other in the regions where the directions of the pretilt are opposite from each other. Thus, the viewing angle characteristics when viewed from the oblique viewing angles of each of the rise directions are averaged. Thereby, it is possible to acquire the lateral electric field liquid crystal display device of extremely excellent viewing angle characteristics, which exhibits only small shift in the voltage-luminance characteristics even when viewed from the oblique viewing angles of all the azimuths.

The present invention 5 is a lateral electric field liquid crystal display device which is characterized that the two regions having the pretilt of opposite directions existing on each of the regions of the two alignment azimuths of the lateral electric field liquid crystal display device according to the present invention 4 are formed to have almost a same-size area.

Because the two regions having the same alignment azimuth and the pretilt of opposite directions are formed to have substantially the same-size area, the optical compensation works perfectly between the both regions. Thus, the voltage-transmittance properties when viewed from the oblique viewing angles that are in 180 degree different azimuths become almost equivalent.

This makes it possible to suppress increase in the deterioration of the voltage-transmittance characteristics when viewed from the oblique viewing angle of one azimuth, so that it is possible to acquire a fine display property in all the azimuths.

The present invention 6 is a lateral electric field liquid crystal display device which is characterized that the boundaries between the two regions having the pretilt of opposite directions existing on each of the regions of the two alignment azimuths of the lateral electric field liquid crystal display device according to the present invention 4 or 5 are formed along the strip transparent electrode.

Figure 10:
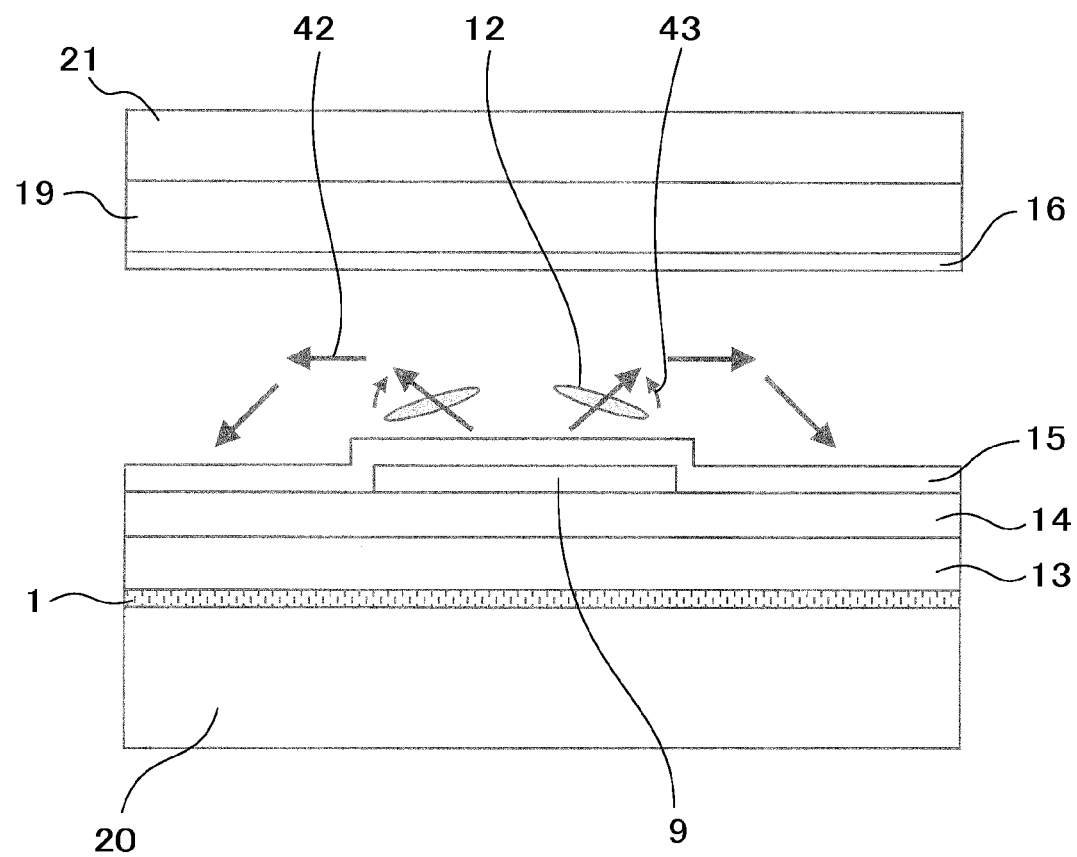
FIG. 10 is a sectional view showing an alignment in the boundary between regions where only the pretilt angles are different in the liquid crystal display device according to the third exemplary embodiment.

As shown in FIG. 10, the boundary between the two regions having the pretilt of opposite directions is formed along the strip transparent electrode, and the boundary between the region of different pretilt is taken as the vicinity of the center of the electrode, and the direction towards which the pretilt rises is set towards the boundary. This provides the rise of the pretilt opposite from the direction of the liquid crystal to be risen by the electric field. Thus, the rise of the liquid crystal is suppressed and the alignment is stabilized between the regions of different alignment, so that the uniformity of display can be improved.

The present invention 7 is a lateral electric field liquid crystal display device which is characterized that at least one of substrates includes a light shielding layer in the boundary between the regions where the alignment azimuths are orthogonal to each other in the lateral electric field liquid crystal display device according to any one of the present inventions 1 to 6. In the boundary between the regions where the alignment azimuths are orthogonal to each other, the alignment azimuth changes continuously by 90 degrees. In the boundary part, the rise of direction of liquid crystal becomes different from the polarization axis of the polarization plate when displaying black. Therefore, it is desirable to have the light shielding layer at least in one of the substrates.

The present invention 8 is a lateral electric field liquid crystal display device which is characterized that the light shielding layer for shielding the boundary of the regions having the orthogonal alignment directions from each other of the lateral electric field liquid crystal display device according to the present invention 7 exists on the substrate where the electrode forming the lateral electric field is formed, and the light shielding layer is formed with a nontransparent metal layer having a potential equivalent to that of the common electrode or the pixel electrode. Because the light shielding layer exists on the substrate where the electrode forming the lateral electric field is formed and the light shielding layer is formed with the nontransparent metal layer having the potential equivalent to that of the common electrode or the pixel electrode, it is possible to shield only the required region with high precision. This makes it possible to shield the light sufficiently without deteriorating the aperture ratio of the pixel. Further, no extra electric field is to be generated, so that it is possible to acquire stable display.

The present invention 9 is a lateral electric field liquid crystal display device manufacturing method for manufacturing the lateral electric field liquid crystal display device according to any one of the present inventions 1 to 8, which is characterized to perform alignment processing by photo-alignment.

By using the photo-alignment when forming the regions having the different alignment azimuths or the regions having the different alignment azimuths and the different pretilt within the pixel required for constituting one of the present inventions 1 to 8, it is possible to achieve the divided alignment highly efficiently with high precision and in a stable manner.

The present invention 10 is a lateral electric field liquid crystal display device which includes: a substrate; a plan electrode formed in a plan form on the substrate; a strip electrode formed in a strip form on the plan electrode via an insulating film; and a liquid crystal aligned substantially in parallel to the substrate, the liquid crystal display device controlling a display by rotating the liquid crystal within a plane substantially in parallel to the substrate by an electric field between the plan electrode and the strip electrode, wherein: a plurality of pixels constituting the display are arranged in matrix in x direction and y direction; within one of the pixels, an alignment azimuth of the liquid crystal is one direction and an extending direction of the strip electrode is one direction; and between the pixels neighboring to each other at least in one of the x direction and the y direction, extending directions of the strip electrodes are orthogonal to each other, alignment azimuths of the liquid crystal are orthogonal to each other, and angles formed between the extending direction of the strip electrode and the alignment azimuth of the liquid crystal are same.

Within one pixel, the alignment azimuth of the liquid crystal is set as one direction, and the extending direction of the strip electrode is set as one direction. Between the neighboring pixels, the alignment azimuths of the liquid crystal are set to be orthogonal to each other, and the extending directions of the strip electrodes are set to be orthogonal to each other. Thereby, even with the highly minute pixels with which the alignment within one pixel is difficult to be divided, the voltage-luminance properties from the oblique viewing angle compensate with each other between the neighboring pixels. This makes it possible to acquire fine viewing angle characteristics.

The present invention 11 is the lateral electric field crystal display device according to the present invention 10, which is characterized that a pretilt angle of the liquid crystal is substantially 0 degree and voltage-transmittance characteristics when viewed from oblique viewing angles which are in 180 degree different azimuths are almost equivalent.

Through setting the pretilt angle to be substantially 0 degree, the rise of the liquid crystal directors by the fringe electric field becomes symmetric. Thus, the voltage-transmittance characteristics viewed from the oblique viewing angle in 180 degree different azimuths become almost equivalent. Thereby, increase in the deterioration of the voltage-transmittance characteristics from the oblique viewing angle of one azimuth can be suppressed, so that a fine display property can be acquired in all the azimuths.

The present invention 12 is the lateral electric field liquid crystal display device according to the present invention 10, which is characterized that: the liquid crystal has a pretilt angle larger than 0 degree; and four of the pixels having a same color layer neighboring to each other in the x direction and the y direction are four kinds of pixels constituted with a combination of two kinds of the liquid crystal alignment azimuths orthogonal to each other and two kinds of the liquid crystal pretilt directions reversed from each other.

Within one pixel, the alignment azimuth of the liquid crystal, the direction of the pretilt of the liquid crystal, and the extending direction of the strip electrode are set as one direction. Between the neighboring pixels, the alignment azimuths of the liquid crystal become orthogonal to each other, the extending directions of the strip electrodes become orthogonal to each other, and the directions of the pretilt become opposite from each other. Through having four kinds of pixels in which those characteristics are combined, the voltage-luminance characteristics from the oblique viewing angle compensate with each other between the neighboring pixels even with the highly minute pixels with which the alignment within one pixel is difficult to be divided. This makes it possible to acquire fine viewing angle characteristics.

According to the present invention, in the FFS mode liquid crystal display device with which the transmittance can be easily improved and the manufacturing margin such as the control and the like of the liquid crystal layer thickness can be taken wide, shift of the voltage-transmittance characteristics particularly when viewed from the oblique viewing angle of the initial alignment azimuth of the liquid crystal towards the low-voltage side from the voltage-transmittance characteristics of the front viewing angle can be suppressed. Thus, it is possible to acquire the liquid crystal display device of an extremely excellent viewing angle property with which there is only a small shift of the voltage-luminance characteristics and only small coloring even when viewed from any azimuth.

DETAILED DESCRIPTION OF THE PREFERRED EMBODIMENTS

Hereinafter, modes for embodying the present invention (referred to as "exemplary embodiments" hereinafter) will be described by referring to the accompanying drawings. In this Description and the Drawings, same reference numerals are applied to substantially the same structural elements. Shapes in the drawings are illustrated to be easily understood by those skilled in the art, so that dimensions and the ratios thereof do not necessarily match with those of the actual ones.

First Exemplary Embodiment

Figure 2:
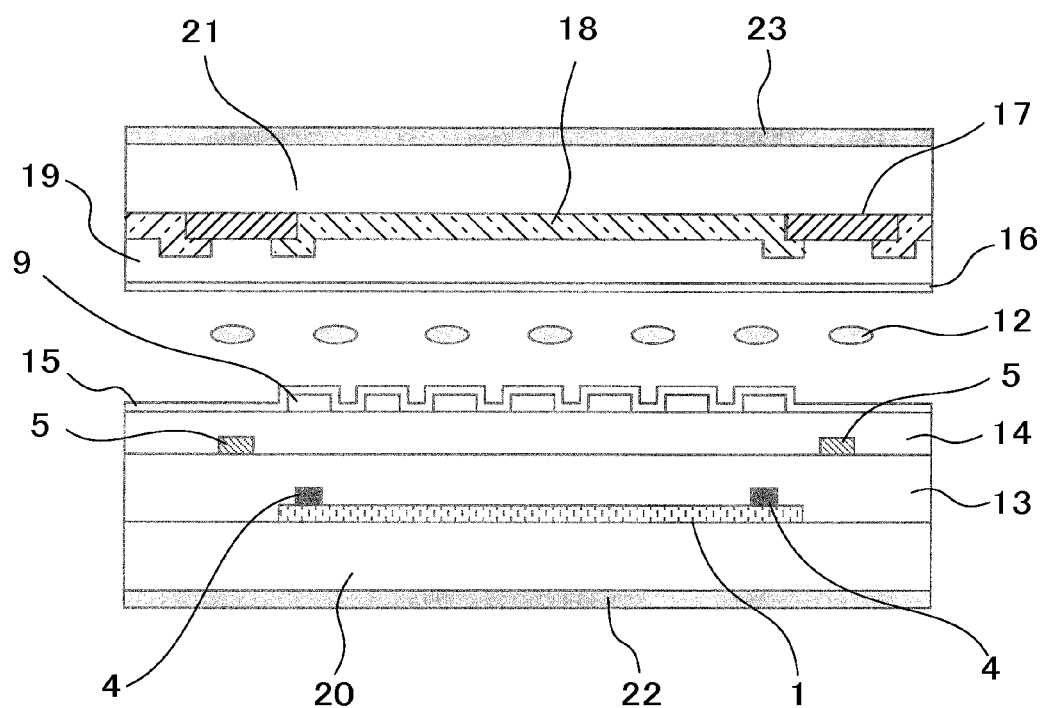
FIG. 2 is a sectional view taken along A-A' of FIG. 1.
Figure 3:
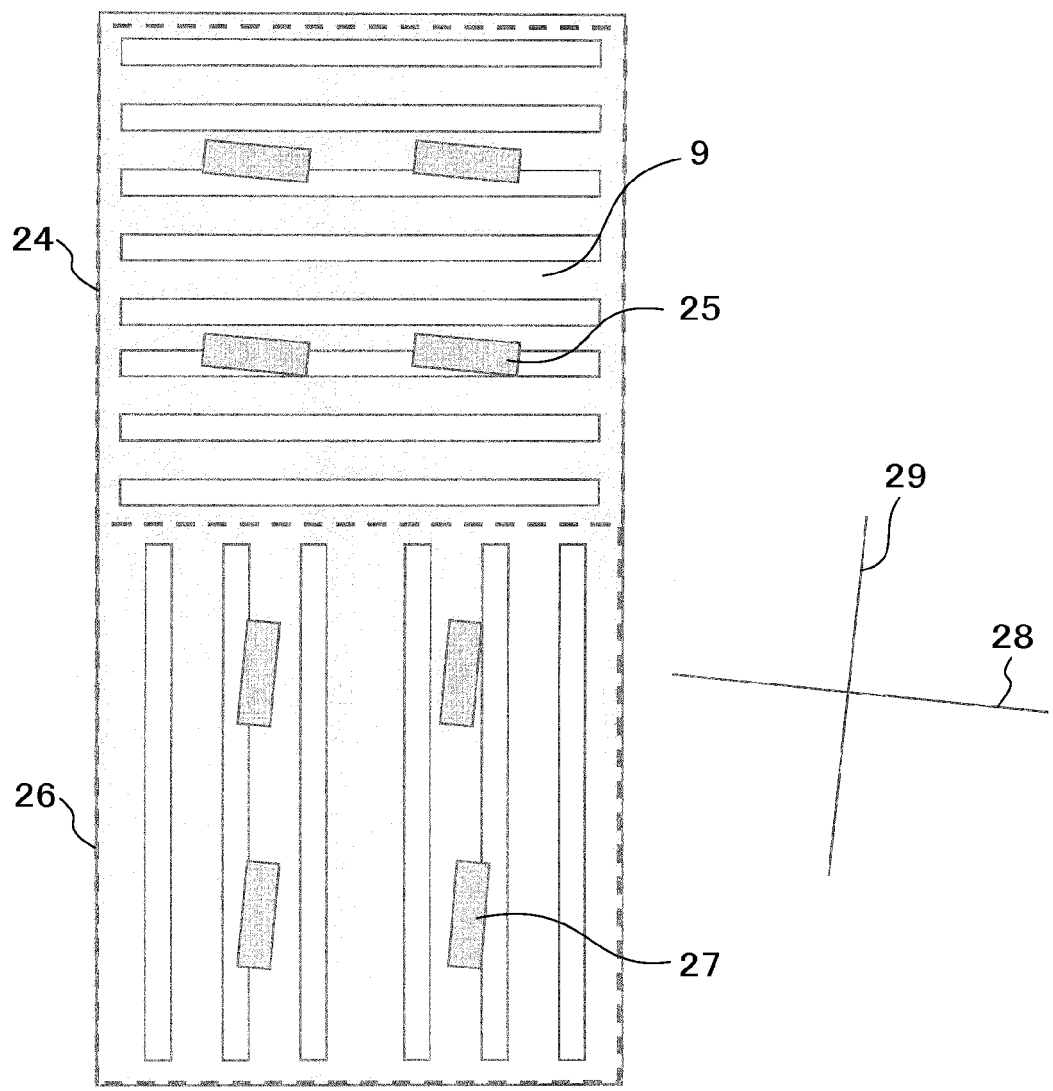
FIG. 3 is a plan view showing an alignment state of one pixel of the liquid crystal display device according to the first exemplary embodiment.

A first exemplary embodiment of the present invention will be described by referring to FIG. 1, FIG. 2, and FIG. 3. FIG. 1 is a plan view showing the structure of one pixel of a liquid crystal display device according to the first exemplary embodiment. FIG. 2 is a sectional view taken along A-A' of FIG. 1. FIG. 3 is a plan view showing regions for dividing the alignment directions in the display regions within the pixel.

The first exemplary embodiment shown in FIG. 1 will be described hereinafter in details by following the fabricating procedure. First, ITO (Indium Tin Oxide) of 50 nm as a first transparent electrode is deposited on a glass substrate as a first transparent insulating film 20, and a pattern of the common electrode 1 is formed in a plan form. Further, Cr (chrome) of 250 nm as a first metal layer is deposited thereon, and patterns of the scanning line 3 and the common signal wiring 2 are formed from the Cr film.

Then, SiNx (silicon nitride) of 400 nm as the gate insulating film 13, a-Si:H (amorphous silicon hydride) of 200 nm as the thin film semiconductor layer 6, and n-a-Si:H (n-type amorphous silicon hydride) of 50 nm are stacked, and the thin film semiconductor layer 6 is patterned in such a manner that only a TFT part provided as a switching element of the pixel remains. Further, Cr of 250 nm as a second metal layer is deposited, and patterns of a data line, a source-drain electrode of the TFT, and the pixel electrode part 7 constituted with the second metal layer are formed from the Cr film.

Then, n-a-Si of the TFT part is removed by having the source-drain electrode of the TFT as a mask. Thereafter, SiNx of 150 nm as the protection insulating film 14 is formed, and the through-hole 8 for connecting the pixel electrode is formed in the protection insulating film 14. Further, ITO of 40 nm as a second transparent electrode is formed thereon, and a pattern of a pixel electrode is formed from the ITO film. The pixel electrode is formed to connect the both ends of the pattern of the strip electrodes 9 with the connecting part 10. The width of the strip electrode 9 is set to 3 μm, and the width of the slit between the strip electrodes 9 is set to 6 μm.

The strip electrode 9 is extended in the horizontal direction (direction in parallel to the scanning line) in the upper half part of the pixel while it is extended in the perpendicular direction (direction perpendicular to the scanning line) in the lower half part, so that the both are orthogonal to each other. The TFT array is formed by the method described above.

Further, the black matrix 17 is formed on a glass substrate as the second transparent insulating substrate 21 by using a resin black. The color layer 18 of RGB (Red, Green, Blue) is formed thereon in a prescribed pattern, the overcoat 19 is formed thereon, and a columnar spacer (not shown) is formed thereon further to fabricate a color filter substrate.

The alignment films 15 and 16 which can be aligned by light irradiation are formed both on the TFT array substrate and the color filter substrate fabricated in the manner described above, and photo-alignment processing is performed to form the two regions 24 and 26 as shown in FIG. 3. In the region 24 where the strip electrode 9 is extended in the lateral direction shown in the upper half part of FIG. 3, the alignment azimuth 25 is set to have an angle of 8 degrees with respect to the extending direction of the strip. At this time, the pretilt angles are set to be 0 degree in both the TFT array substrate and the color filter substrate. This region 24 is defined as the region 1.

Meanwhile, in the region 26 where the strip electrode 9 is extended in the longitudinal direction shown in the lower half part of FIG. 3, the alignment azimuth 27 is set to have an angle of 8 degrees with respect to the extending direction of the strip. At this time, the pretilt angles are set to be 0 degree in both the TFT array substrate and the color filter substrate. This region 26 is defined as the region 2.

Note here that the alignment azimuth 25 of the region 24 of the upper half part of FIG. 3 and the alignment azimuth 27 of the region 26 of the lower half part are set to be orthogonal. Further, the sizes of the areas of the region 1 and the region 2 are set to be almost equivalent. This makes it possible to perform compensation easily between the two regions mutually, so that it is possible to acquire fine viewing angle characteristics with which change of the voltage-luminance characteristics in the viewing angles and coloring depending on the viewing angles are small and the symmetry is fine.

Further, a seal member is applied to the both substrates to be laminated, and the liquid crystal material 12 having a positive dielectric constant is inserted and sealed therein. Note that the physical property values of the liquid crystal material are set as $\Delta\epsilon=5.5$, $\Delta n=0.100$, and the height of the columnar spacer is controlled so that the liquid crystal layer thickness becomes 4.0 μm.

Further, polarization plates 22 and 23 are laminated on the outer side of the glass substrates on both sides in such a manner that the polarization axes are orthogonal to each other. Note here that the absorption axis direction 28 of the incident-side polarization plate 22 on the TFT array substrate side is set to be the same with the initial alignment direction 25 of the region 1. Through loading a backlight and a driving circuit to the liquid crystal display panel fabricated in the manner described above, the active matrix type liquid crystal display device according to the first exemplary embodiment is completed.

In the liquid crystal display device acquired in the manner described above, the liquid crystal 12 rotates clockwise both in the region 1 and the region 2 when an electric field is applied between the strip pixel electrode 9 and the plan common electrode 1.

The alignment azimuths of the region 1 and the region 2 are orthogonal to each other. As shown in FIG. 22A to FIG. 24B, shift of the voltage-transmittance characteristics when viewed from the oblique viewing angle of the initial alignment azimuth of the liquid crystal is an issue with the region 1 or the region 2 alone. In the meantime, with the first exemplary embodiment, the both regions 1 and 2 are arranged to have a same-size area. Thus, the viewing angle characteristics of the both regions 1 and 2 compensate with each other, so that the shift of the voltage-transmittance can be remarkably suppressed.

Figure 4A:
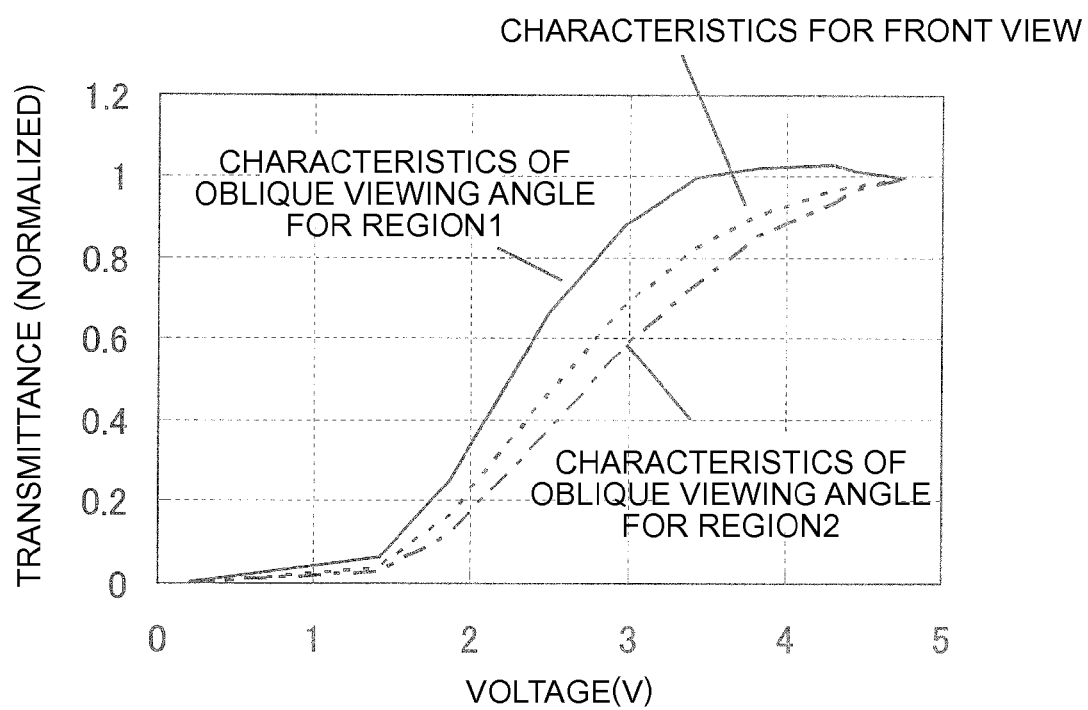
FIG. 4A is a chart showing the viewing angle characteristics of the related technique.
Figure 18A:
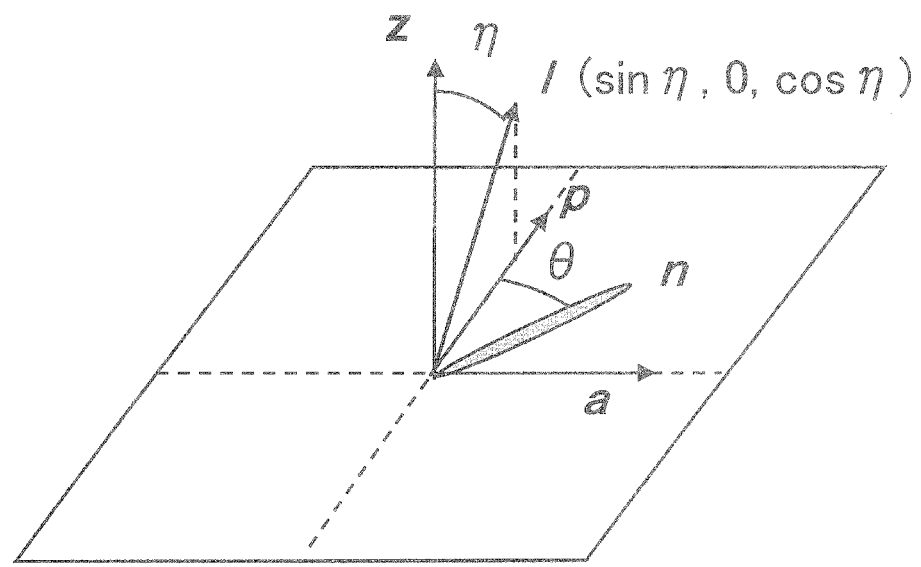
FIGS. 18A and 18B show charts showing the reason for the shift of the voltage transmittance characteristics when viewed from the azimuth of the absorption axis of an incident-side polarization plate in a lateral electric field type of an FFS mode according to the related technique.
Figure 18B:
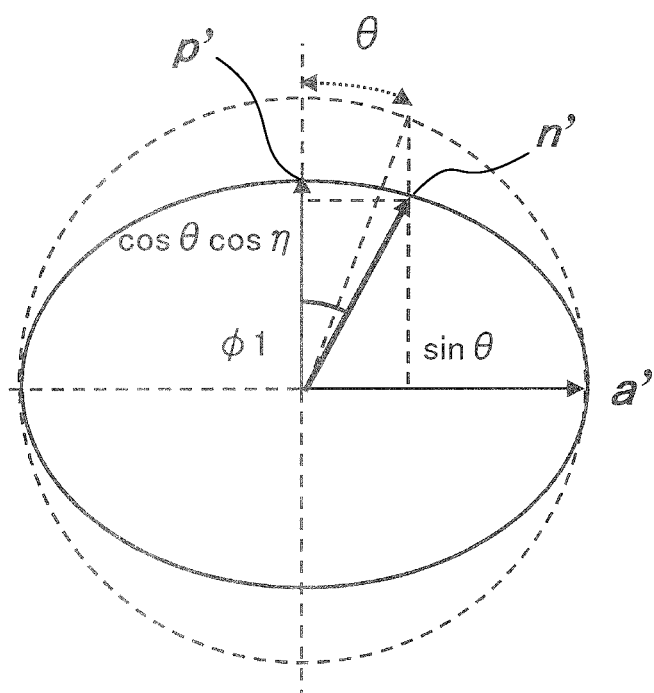

FIG. 4A shows the voltage-transmittance characteristics in each of the region 1 and the region 2 alone when viewed from the viewing angle of the polar angle of 60 degree formed between the azimuth of the absorption axis 28 of the incident-side polarization plate and a perpendicular of the substrate and the voltage-transmittance characteristics when viewed from the front view described above. In the front view, the voltage-transmittance characteristics of the region 1 and the voltage-transmittance characteristics of the region 2 are the same. However, when viewed from the oblique viewing angle, the voltage-transmittance characteristics of the region 1 is shifted towards the low-voltage side from the property of the front view due to the theory described in FIG. 18B, and the voltage-transmittance characteristics of the region 2 is shifted towards the high-voltage side due to the same theory.

Figure 4B:
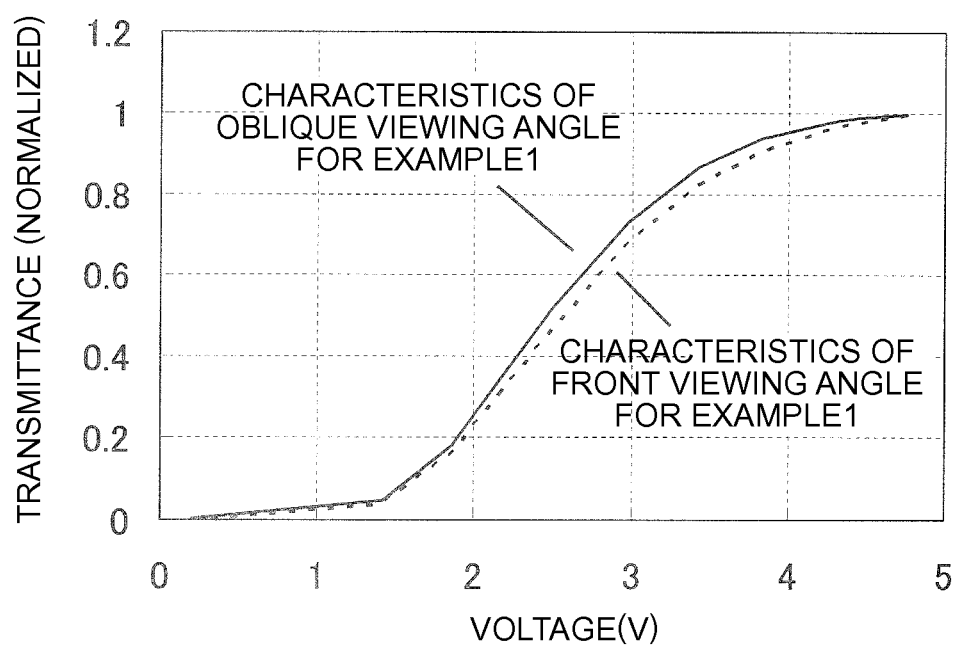
FIG. 4B is a chart showing the viewing angle characteristics of the first exemplary embodiment.

In the meantime, in the case of the first exemplary embodiment, the region 1 and the region 2 are formed to have almost a same-size area within one pixel. Thus, the both compensate with each other optically. Therefore, as shown in FIG. 4B, it is possible to suppress shift of the voltage-transmittance characteristics when viewed from the oblique viewing angle to be remarkably small. This makes it possible to acquire a liquid crystal display device of extremely excellent viewing angle characteristics with which the shift of the voltage-luminance characteristics as well as coloring is small even when viewed from the oblique viewing angles of all the azimuths.

Further, since the alignment directions of the region 1 and the region 2 are orthogonal, there is a part in the boundary thereof where the alignment azimuth changes by 90 degrees. In this part, the liquid crystal directors face towards the azimuth different from the polarization axis of the polarization plate at the time of black display state. Thus, light is transmitted, which may cause light leakage, so that it is desirable to shield the light. In this case, light is shielded by disposing the common signal wiring 2 constituted with the first metal layer in that region. Thereby, it is possible to shield only the required region with high precision, so that light can be shielded sufficiently without deteriorating the numerical aperture.

Further, the potential of the nontransparent metal layer is of potential equivalent to that of the common electrode, so that fine display can be acquired without giving an electric disturbance. In the above-described case, light leakage is suppressed by disposing the common electrode and the nontransparent metal layer having the potential equivalent to that of the common electrode on the TFT array substrate side. However, the same effects can also be acquired by making the potential of the nontransparent metal layer be equivalent to the potential of the pixel. Further, it is also possible to shield the light in the boundary part between the region 1 and the region 2 by providing a black matrix on the counter substrate side.

Figure 5:
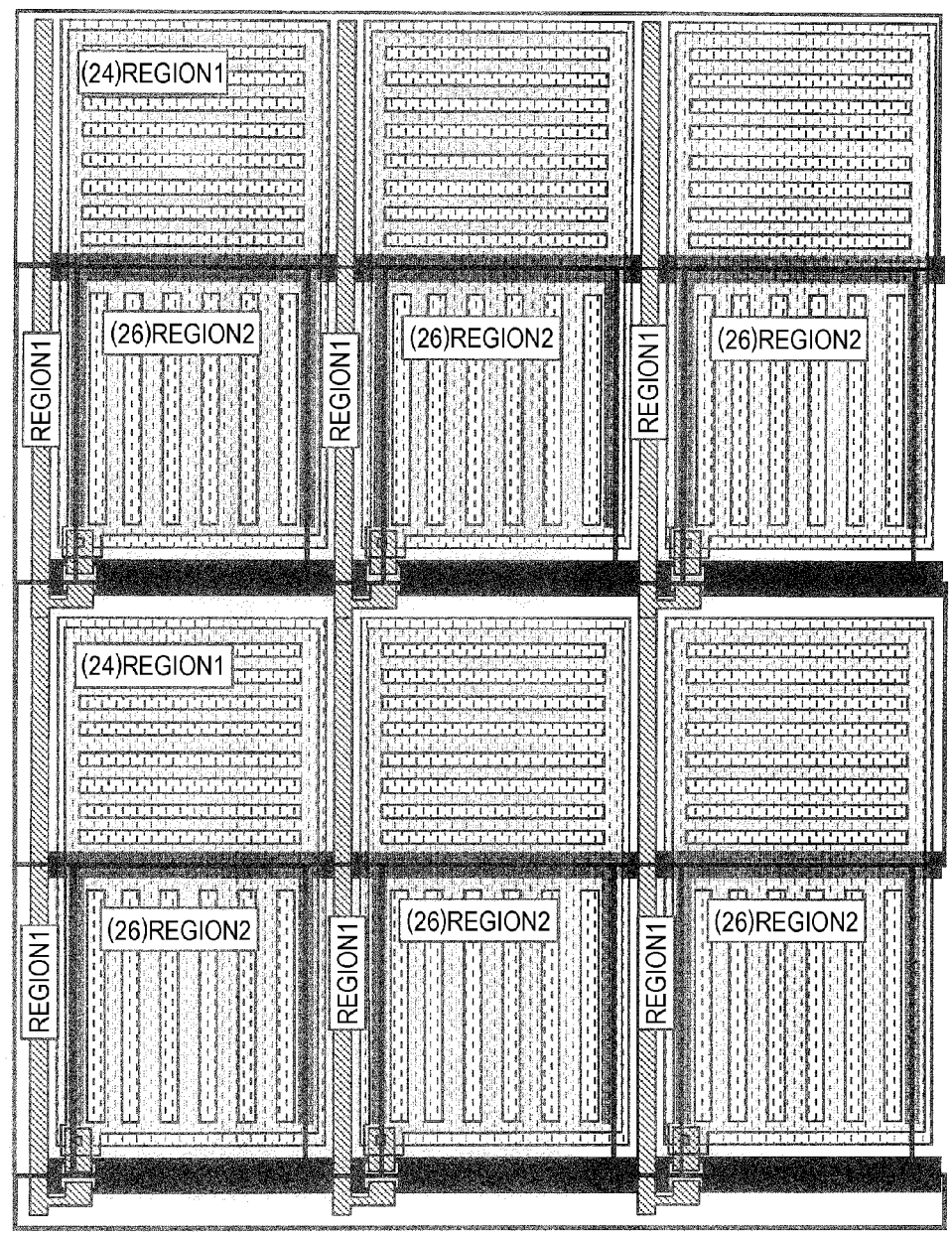
FIG. 5 is a plan view showing the state of division of the alignment over a plurality of pixels according to the first exemplary embodiment.

Further, FIG. 5 shows a plan view of the expanded region to the part between the neighboring pixels. As shown in FIG. 5, in the vicinity of data line 5, alignment is done in the azimuth same as the region 1, i.e., in the azimuth that forms 82 degrees with respect to the extending direction of the data line 5. With this, motion of the liquid crystal can be made small by the electric field between the data line 5 and the pixel electrode 10 generated in the lateral direction of the drawing. Thereby, as shown in FIG. 2, it is possible to reduce the width of the black matrix 17 that shields the vicinity of the data line 5 on the counter substrate side, so that a wide aperture ratio can be secured.

In this case, as shown in FIG. 5, there are regions aligned in the same azimuth as that of the region 1 existing on both sides of the region 2 of each pixel. Thus, as shown in FIG. 2, the light shielding layer 4 constituted with the first metal layer is disposed by connecting to the common electrode 1. This makes it possible to acquire display of a fine contrast with a high numerical aperture.

With the first exemplary embodiment, it is difficult to divide the light irradiating region completely with a line when performing dividing alignment by irradiation of light. Thus, light is irradiated by having an overlapped part of about 2 to 3 μm between the regions so that there is no region where the light is not irradiated within the pixel, i.e., no region where alignment is not done. Thereby, the part with incomplete alignment is not generated within the pixel, and a fine two-divided alignment can be acquired.

Further, while the angles between the strip pixel electrode 9 and the alignment azimuths 25, 27 are set to be 8 degrees in each of the region 1 and the region 2 in the first exemplary embodiment, almost equivalent and fine display can be acquired when that angle is within the range of 5 to 10 degrees. Further, in some cases, display of almost no problem can be acquired when the angle is between 2 degrees and 20 degrees, inclusive. The angle formed between the alignment azimuths 25, 27 and the extending direction of the strip electrode 9 can be designed as appropriate depending on the shape and the size of the pixel.

As an exemplary advantage according to the invention, the present invention makes it possible to acquire the FFS mode liquid crystal display device of an extremely excellent viewing angle characteristics, with which it is possible to suppress the shift of the voltage-transmittance characteristics to the low-voltage side when viewed particularly from the oblique viewing angle of the azimuth of the initial alignment from the voltage-transmittance characteristics of the front view and with which the shift of the voltage-luminance as well as the coloration is small even when viewed obliquely from any direction.

Second Exemplary Embodiment

Figure 6:
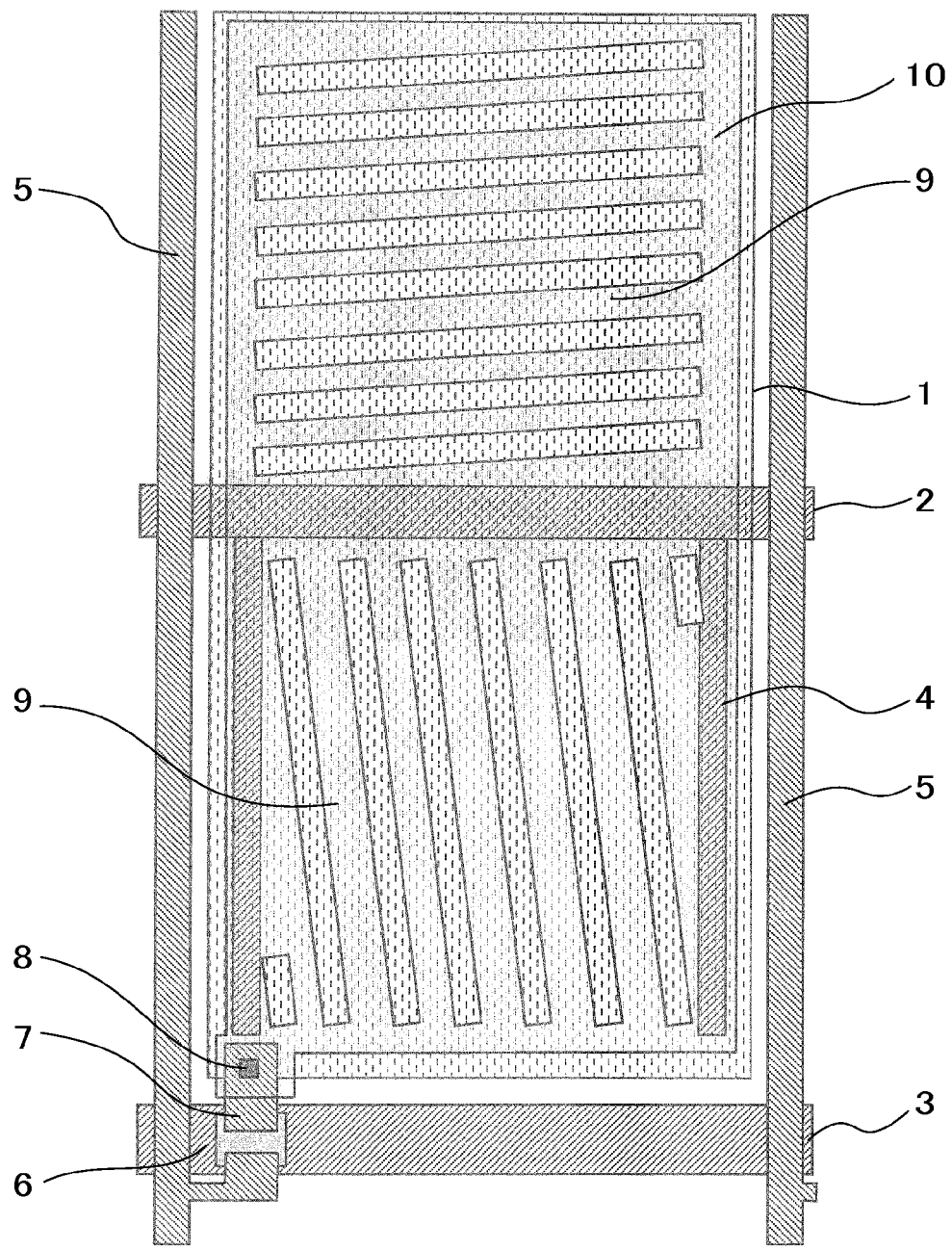
FIG. 6 is a plan view showing the structure of one pixel of a liquid crystal display device according to a second exemplary embodiment.
Figure 7:
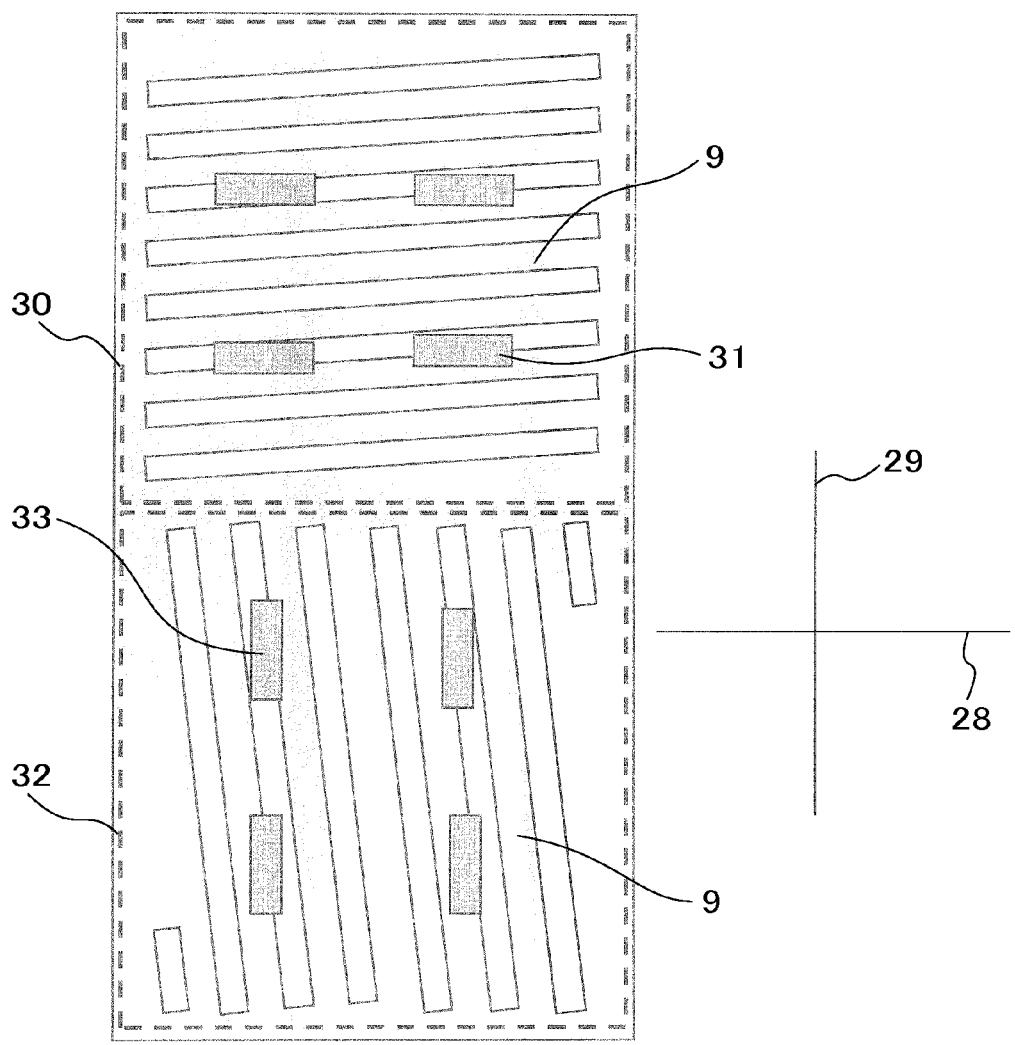
FIG. 7 is a plan view showing an alignment state of one pixel of the liquid crystal display device according to the second exemplary embodiment.

A second exemplary embodiment of the present invention will be described by mainly referring to FIG. 6 and FIG. 7 and also by using FIG. 2. FIG. 6 is a plan view showing the structure of one pixel of a liquid crystal display device according to the second exemplary embodiment of the present invention. FIG. 7 is a plan view showing the regions where the alignment directions are divided in a display region within the pixel. The sectional view thereof showing the structure of one pixel is the same as FIG. 2 of the first exemplary embodiment.

In the case of the second exemplary embodiment, the strip electrode 9 is extended in the direction rotated counterclockwise by 8 degrees from the horizontal direction (extending direction of the scanning line) in a region of an upper half part of a pixel, and the strip electrode 9 is extended in the direction orthogonal thereto in a region of a lower half part of the pixel. In the region 30 in the upper half part of FIG. 7 where the strip electrode 9 is extended in the direction rotated counterclockwise by 8 degrees from the horizontal direction (extending direction of the scanning line), the alignment azimuth 31 is set in the horizontal direction. At this time, the pretilt angle is set to 0 degree in both the TFT array substrate and the color filter substrate. This region 30 is defined as the region 1. Further, in the region 32 in the lower half part of FIG. 7 where the strip electrode 9 is extended in the direction rotated counterclockwise by 8 degrees from the longitudinal direction (direction orthogonal to the extending direction of the scanning line), the alignment azimuth 33 is set in the longitudinal direction. At this time, the pretilt angle is set to 0 degree in both the TFT array substrate and the color filter substrate. This region 32 is defined as the region 2.

Note that the angles are so set that the alignment direction 31 of the region 30 of the upper half part of FIG. 7 and the alignment azimuth 33 of the region 32 of the lower half part become orthogonal. Other than that, the manufacturing method, the sectional structure, and the like are to follow those of the first exemplary embodiment.

In this case, the region 1 and the region 2 compensate with each other as in the case of the first exemplary embodiment. Thus, the viewing angle characteristics becomes equivalent to that of FIG. 4B, and fine characteristics can be acquired.

As in the case of the first exemplary embodiment, the same alignment state as that of the region 1 is employed in the vicinity of the data line 5. In the case of the second exemplary embodiment, the electric field generated between the data line 5 and the pixel electrode 10 is of the lateral direction which matches the alignment azimuth of the region 1. Thus, there is no motion of the liquid crystal 12 in the vicinity of the data line 5 caused by the electric field. Therefore, the width of the black matrix 17 for shielding the part between the data line 5 and the pixel electrode 10 on the counter side can be made still smaller than the case of the first exemplary embodiment, so that the numerical aperture can be secured still wider.

In this case, the same alignment direction as that of the region 1 is to be also employed for the regions in the vicinity of the data lines 5 on both sides of the region 2. Thus, the light shielding layer 4 constituted with the first metal layer is disposed by connecting to the common electrode 1 in the part to be the boundary between the region 1 and the region 2.

Third Exemplary Embodiment

Figure 8:
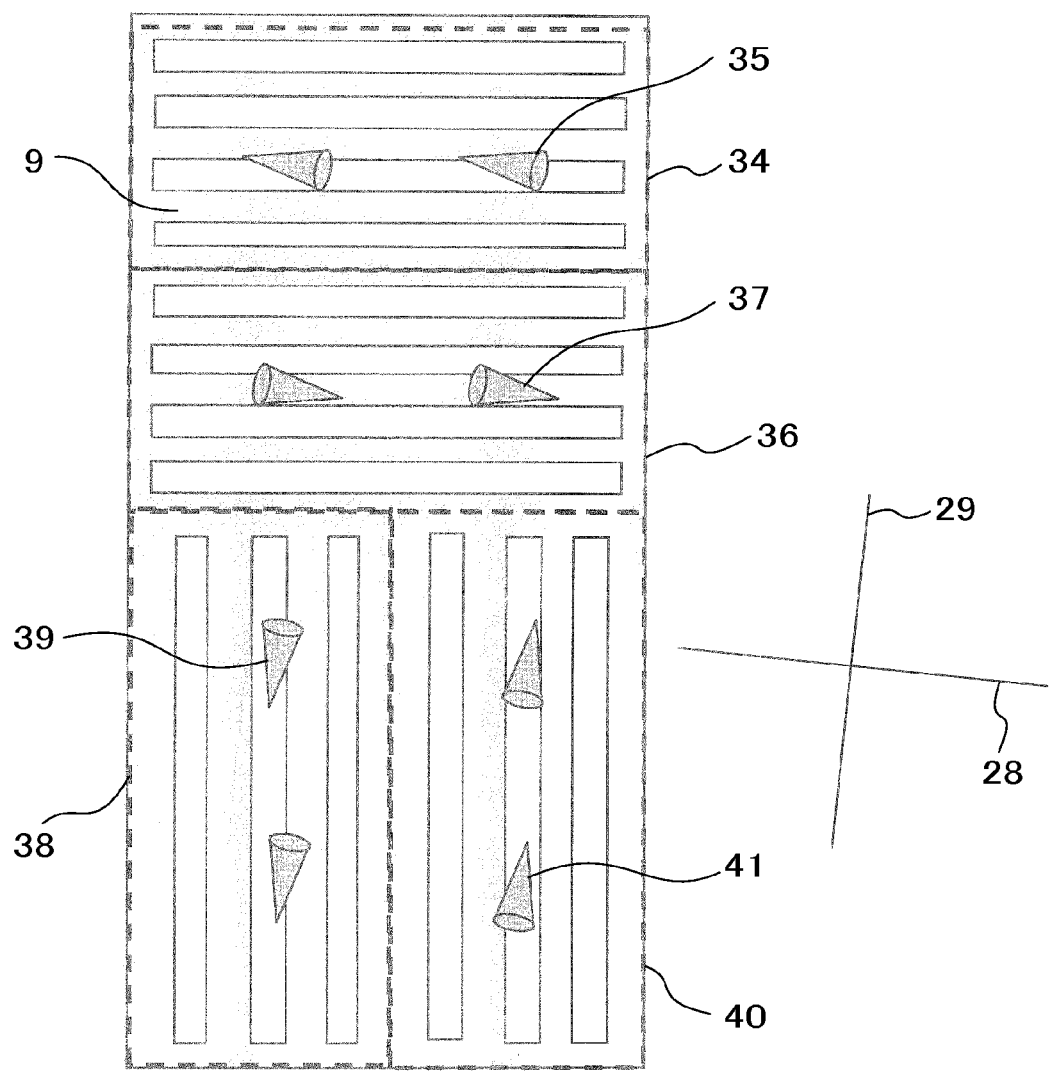
FIG. 8 is a plan view showing an alignment state of one pixel of a liquid crystal display device according to a third exemplary embodiment.

A third exemplary embodiment of the present invention will be described by mainly referring to FIG. 8 and also by using FIG. 1 as well as FIG. 2. FIG. 8 shows the regions where the alignment directions are divided into four in a display region within one pixel. The plan view and sectional view of the third exemplary embodiment are the same as FIG. 1 and FIG. 2, which are the plan view and the sectional view of one pixel according to the first exemplary embodiment. The alignment films 15 and 16 which can be aligned by irradiating light are formed in both an array TFT substrate and a color filter substrate fabricated in the same method as that of the first exemplary embodiment, and the photo-alignment processing is performed to form four regions 34, 36, 38, and 40, as shown in FIG. 8.

In the regions (34, 36) of the upper half part of FIG. 8 where the strip pixel electrode 9 is extended in the lateral direction, the alignment azimuths (35, 37) are set to have the angle of 8 degrees with respect to the extending direction of the strip pixel electrode 9. Each of the regions (34, 36) is further divided into two, and alignment processing is performed in the region 1 (34) of the upper half part so that the pretilt rises in the right direction of the drawing while alignment processing is performed in the region 2 (36) of the upper half part so that the pretilt rises in the left direction.

Further, in regions (38, 40) of the lower half part of FIG. 8 where the strip pixel electrode 9 is extended in the longitudinal direction, the alignment azimuths (39, 41) are set to have the angle of 8 degrees with respect to the extending direction of the strip pixel electrode 9. Each of the regions (38, 40) is further divided into two, and alignment processing is performed in the region 3 (38) of the left half part so that the pretilt faces in the upper direction of the drawing while alignment processing is performed in the region 4 (40) of the right half part so that the pretilt faces in the lower direction.

In FIG. 8, the facing directions of the directors are expressed with cones. It shows that the pretilt rises in the direction where the bottom face of the cone is observed. The alignment azimuth is defined as the direction of the center line of the cone. Note here that the angles are so set that the alignment azimuths 35, 37 of the regions 34, 36 of the upper half part and the alignment azimuths 39, 41 of the regions 38, 40 of the lower half part become orthogonal to each other. Further, absolute values of the pretilt angles of the liquid crystal layer of each of the regions 34, 36, 38, and 40 are all about 1 degree.

Furthermore, each of the areas of the regions from 1 to 4 (34, 36, 38, 40) is set to be almost equivalent. This makes it possible to easily perform compensation between the four regions 34, 36, 38, and 49 mutually, so that it is possible to acquire fine viewing angle characteristics with which fluctuation of the voltage-luminance characteristics and coloring depending on the viewing angles is small and the symmetry is fine.

Figure 34:
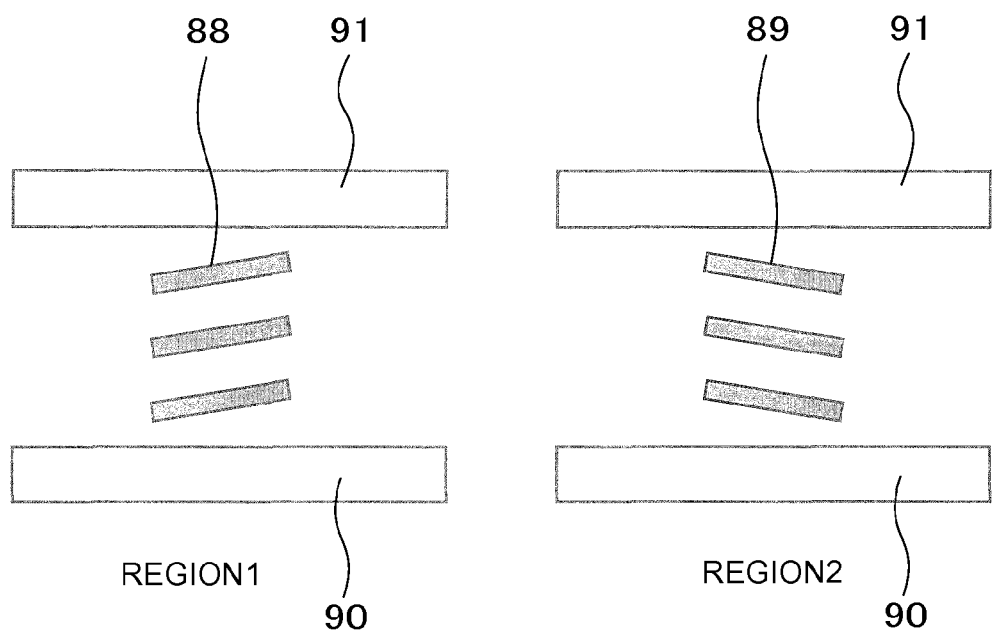
FIG. 34 is an example showing the direction of the liquid crystal in regions of different pretilt directions according to the third embodiment.

FIG. 34 to FIG. 37 show examples of the directions of the liquid crystal in the regions 1 and 2 of pretilt different directions according to the third exemplary embodiment. In FIG. 34 to FIG. 37, the direction of the pretilt of the liquid crystal in the region 1 is shown with a reference numeral 88 while the direction of the pretilt of the liquid crystal in the region 2 is shown with a reference numeral 89. In the case of the third exemplary embodiment, the rise direction of the liquid crystal is determined mostly by the pretilt directions 88, 89 of the liquid crystal on the TFT substrate 90 side where the fringe electric field is formed mainly. It is common to set the alignment azimuths of the liquid crystal to be the same in the region 1 and the region 2 and to set the pretilt directions 88, 89 to be in parallel to the alignment azimuth on the color filter substrate 91 side as the alignment state where the pretilt directions 88, 89 are opposite as shown in FIG. 34.

Figure 35:
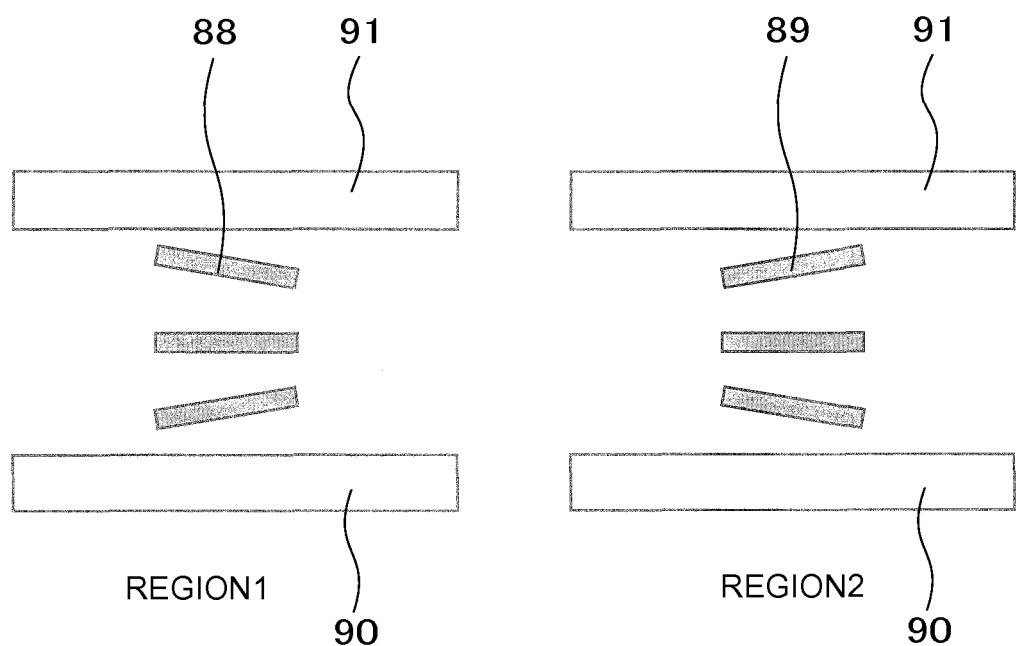
FIG. 35 is another example showing the direction of the liquid crystal in regions of different pretilt directions according to the third embodiment.
Figure 36:
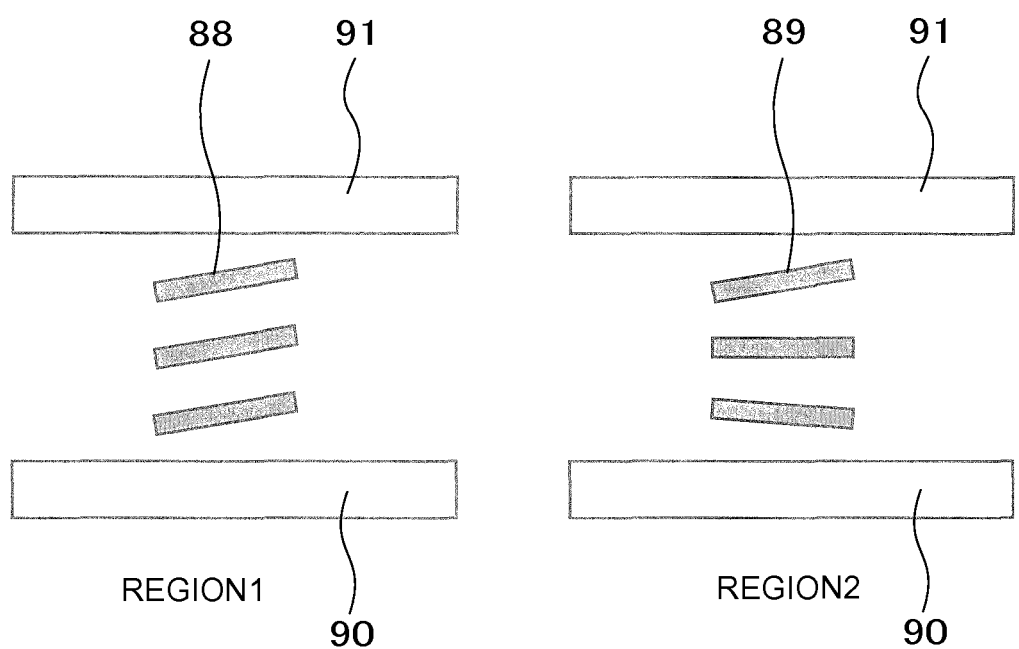
FIG. 36 is still another example showing the direction of the liquid crystal in regions of different pretilt directions according to the third embodiment.

As shown in FIG. 35, it is also possible to employ the so-called splay alignment state where the pretilt directions 88, 89 on the color filter substrate 91 side are set to be opposite from those on the TFT array substrate 90 side. As shown in FIG. 36, it is possible to have the pretilt angle only on the TFT array substrate 90 side and to set the pretilt angle on the color filter substrate 91 side to be 0 degree. In both cases of the FIGS. 34 to 35, the rise directions of the liquid crystal in the regions 1 and 2 are completely symmetric. Therefore, the compensation of the viewing angle characteristics in the both regions become extremely fine.

Figure 37:
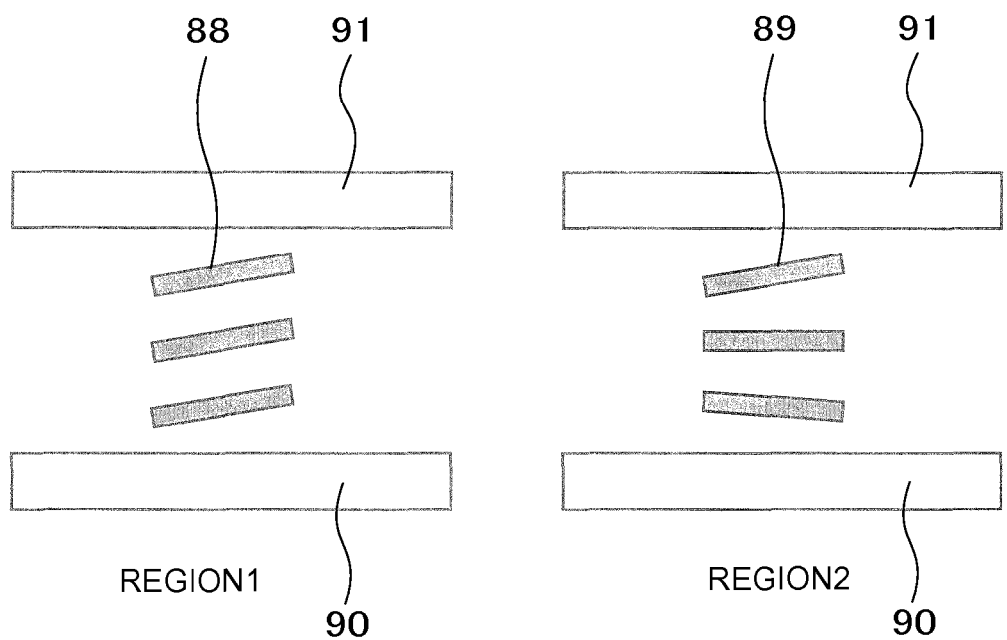
FIG. 37 is yet another example showing the direction of the liquid crystal in regions of different pretilt directions according to the third embodiment.

As shown in FIG. 37, it is also possible to set the pretilt directions 88, 89 of the liquid crystal to be opposite form each other between the region 1 and the region 2 on the TFT array substrate 90 side and to set to be the same between the region 1 and the region 2 on the color filter substrate 91 side. In this case, the dividing number of the alignment on the color filter substrate 91 side can be reduced to a half while the symmetry of the rise of the liquid crystal in the regions 1, 2 is slightly deteriorated. Therefore, there is such an advantage that the manufacturing steps can be simplified while achieving relatively fine viewing angle characteristics.

Further, a seal member is applied to the both substrates to be laminated, and a liquid crystal material 12 having a positive dielectric constant is inserted and sealed therein. Note that the physical property values of the liquid crystal material 12 are set as Δ∈=5.5, Δn=0.100, and the height of the columnar spacer is controlled so that the liquid crystal layer thickness becomes 4.0 µm.

Further, the polarization plates 22 and 23 are laminated on the outer side of the glass substrates on both sides in such a manner that the polarization axes are orthogonal to each other. Note here that a direction of the absorption axis 28 of the incident-side polarization plate 22 on the TFT array substrate side is set to be the same with the alignment directions 35, 37 of the region 1 (34) and the region 2 (36). Through loading a backlight and a driving circuit to the liquid crystal display panel fabricated in the manner described above, the active matrix type liquid crystal display device according to the third exemplary embodiment is completed.

When an electric field is applied between the strip electrode 9 and the plan common electrode 1 in the liquid crystal display device acquired in the manner described above, the liquid crystal rotates clockwise in all the regions 1 to 4 (34, 36, 38, 40). Rise in the right side direction of the screen is dominant in the region 1 (34), rise in the left side direction of the screen is dominant in the region 2 (36), rise in the lower side direction of the screen is dominant in the region 3 (38), and rise in the upper side direction of the screen is dominant in the region 4 (40).

The alignment azimuths of the regions 1, 2 (34, 36) and the regions 3, 4 (38, 40) are orthogonal to each other. Thus, as shown by using FIG. 22A to FIG. 24B when describing the viewing angle characteristics, the voltage-luminance properties from the oblique viewing angles compensate with each other.

Further, the dominant rise directions in the region 1 and the region 2 are set in the right side direction and the left side direction, so that the both regions are averaged. Thus, there is no great change generated in the voltage-luminance characteristics in one direction, and the change can be suppressed. Further, the dominant rise directions in the region 3 and the region 4 are set in the upper side direction and the lower side direction, so that the both regions are averaged as well. Therefore, there is no great change generated in the voltage-luminance characteristics in one direction, and the change can be suppressed.

Figure 9A:
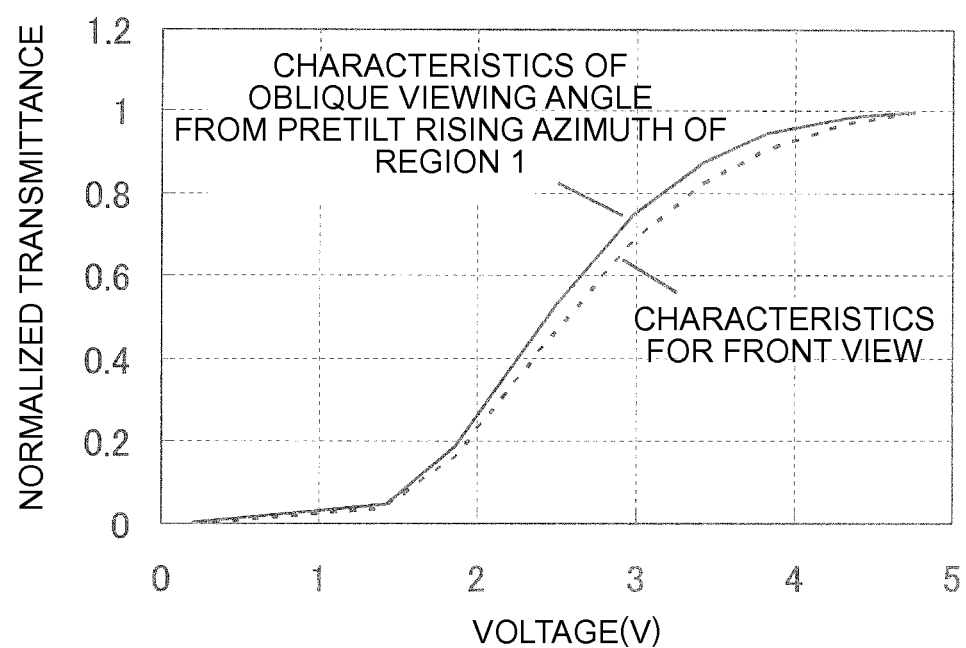
FIGS. 9A and 9B show charts of improvements of the viewing angle characteristics according to the third exemplary embodiments.
Figure 9B:
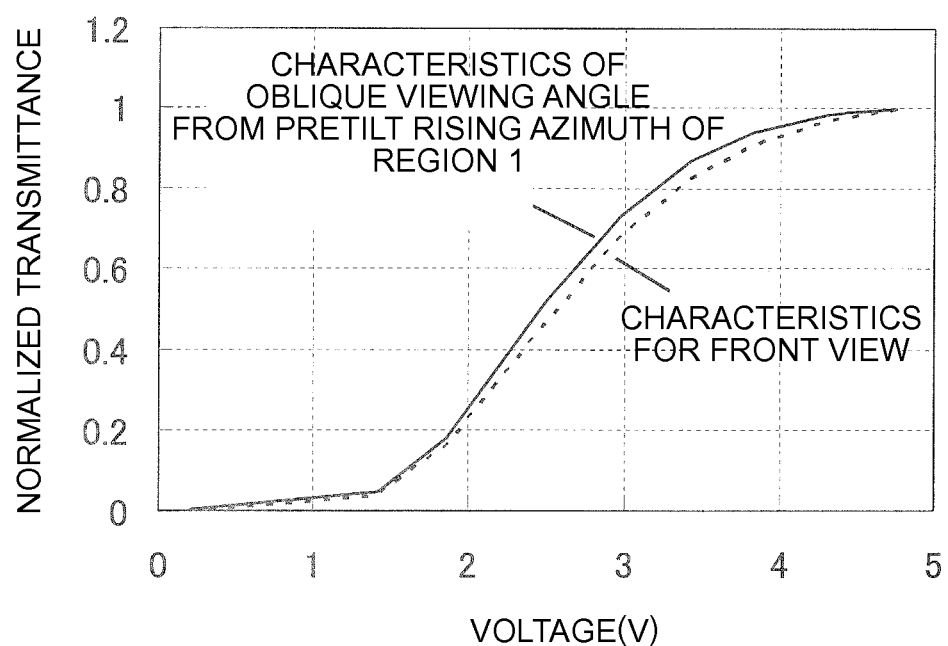

FIG. 9A shows the voltage-transmittance characteristics of a case viewed from the viewing angle of 60-degree polar angle from the azimuth of the rise of the pretilt in the region 1 when the region 1 and the region 2 have the same pretilt as that of the region 1 of the third exemplary embodiment and the region 3 and the region 4 have the same pretilt as that of the region 3 of the third exemplary embodiment. Further, FIG. 9B shows the voltage-transmittance characteristics in a case viewed from the same viewing angle when a pixel is divided into four regions including the pretilt as in the case of the third exemplary embodiment.

As shown in FIG. 9A, when 3V is applied in the state where the pixel is divided into two only by the azimuth directions, about 10% is increased in the normalized transmittance with respect to the characteristics of the front view when viewed from the viewing angle direction described above. In the meantime, as shown in FIG. 9B, increase in the transmittance can be suppressed to about 5% for the same voltage and the same viewing angle when the pixel is divided into four as in the case of the third exemplary embodiment. As described, the viewing angle characteristics can be made still finer through dividing the pixel into four and by also dividing the direction of the pretilt in addition to the alignment azimuths.

Further, as shown in FIG. 8, the boundary between the region 1 and the region 2 having different pretilt and the boundary between the region 3 and the region 4 are set to be in the center of the strip pixel electrode 9. FIG. 10 shows the sectional view of the vicinity of the strip pixel electrode 9.

As shown in FIG. 10, the electric field 42 to rise towards the upper right from the center works on the right side, and the electric field 42 to rise towards the upper left from the center works on the left side. When the boundary between the regions of different pretilt is set to be the vicinity of the center of the electrode 9 and the direction 43 towards which the pretilt rises is set towards the boundary, it comes to have the pretilt opposite from the direction 43 towards which the liquid crystal 12 is to be risen by the electric field. Thus, rise of the liquid crystal 12 is suppressed, so that the alignment between the regions of different alignment can be stabilized and uniformity of display can be improved.

Further, since the alignment directions of the region 2 and the regions 3, 4 are orthogonal, there is a part in the boundary thereof where the alignment azimuth changes by 90 degrees. In this part, the liquid crystal directors face towards the azimuth different from the polarization axis of the polarization plate at the time of black display in particular. This may cause light leakage, so that it is desirable to shield the light. In this case, light is shielded by disposing the common signal wiring 2 constituted with the first metal layer in that region. Thereby, it is possible to shield only the required region with high precision, so that light can be shielded sufficiently without deteriorating the aperture ratio. Further, the potential of the nontransparent metal layer is equivalent to that of the common electrode, so that fine display can be acquired without giving an electric disturbance.

In the above-described case, light leakage is suppressed by disposing the nontransparent metal layer of the potential equivalent to that of the common electrode on the TFT array substrate side. However, the same effects can also be acquired by making the potential of the nontransparent metal layer be equivalent to the potential of the pixel. Further, it is also possible to shield the light in the boundary part between the region 2, the region 3, and the region 4 by providing a black matrix on the counter substrate side.

Figure 11:
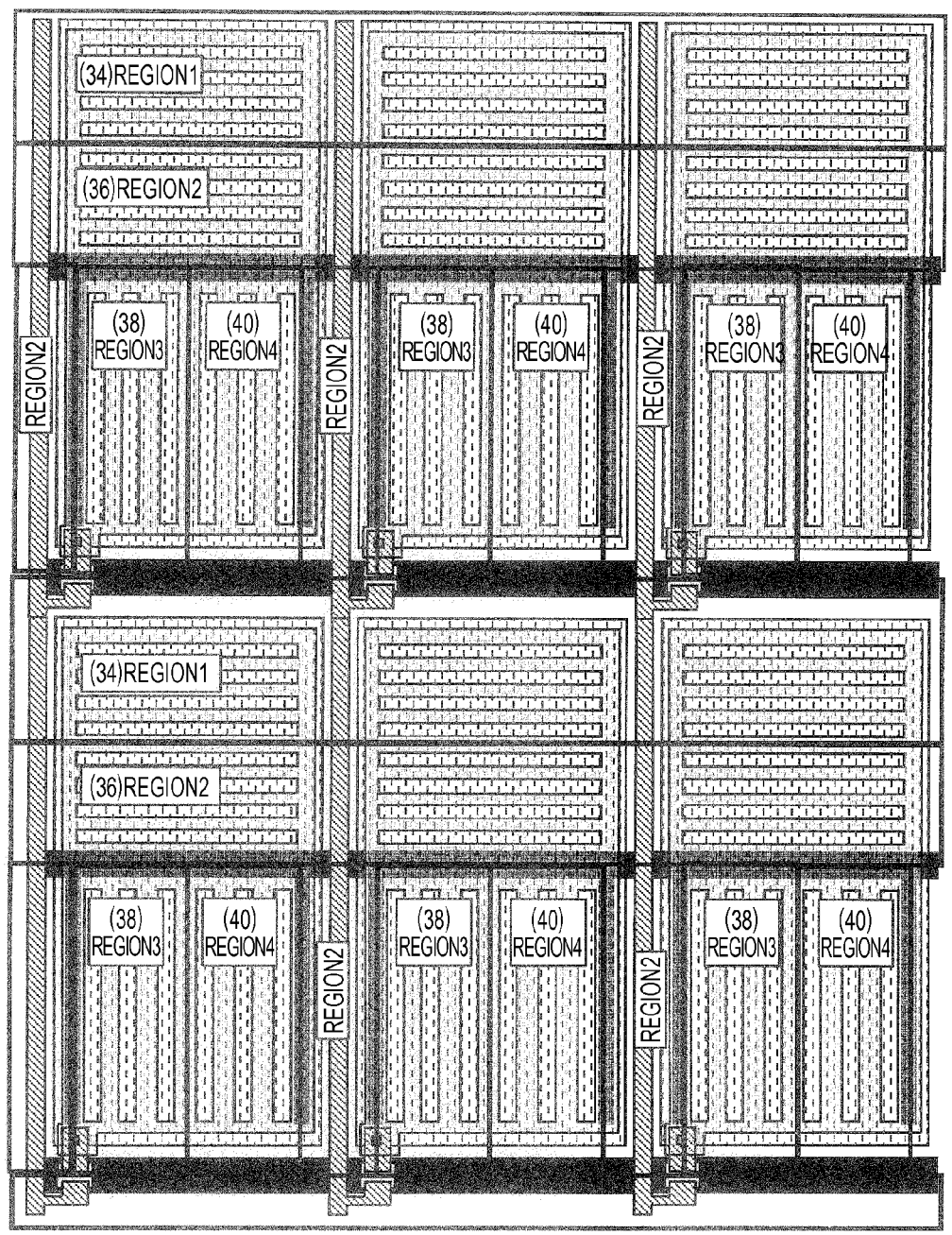
FIG. 11 is a plan view showing the state of division of the alignment over a plurality of pixels according to the third exemplary embodiment.

Further, FIG. 11 shows a plan view of the expanded region to the part between the neighboring pixels. As shown in FIG. 11, in the vicinity of the data line 5, the both sides of the region 1 of the upper half part of the pixel are set to be in the same alignment state as that of the region 1, and the both sides of the region 2 thereof are set to be in the same alignment state as that of the region 2. Both sides of the regions 3 and 4 of the lower half part of the pixel are set to be in the same alignment state as that of the region 2.

With this, on the data line 5, motion of the liquid crystal 12 can be made small by the electric field between the data line 5 and the pixel electrode 10 generated in the lateral direction of the drawing through setting the alignment to the direction close to the azimuth orthogonal to the data line 5 among the different alignment azimuths. Thus, it is possible to reduce the width of the black matrix 17 that shields the part between the data line 5 and the pixel electrode 10 on the counter side, so that a wide aperture ratio can be secured.

In this case, the same alignment azimuth as that of the region 2 is employed for the regions in the vicinity of the data line on both sides of the regions 3 and 4. Thus, the light shielding layer 4 constituted with the first metal layer is disposed in the part to be the boundary between the region 3 and the region 4 by connecting to the common electrode 1.

It is difficult to divide the light irradiating region completely with a line when performing dividing alignment by irradiation of light. Thus, light is irradiated by having an overlapped part of about 2 to 3 μm between the regions so that there is no region where the light is not irradiated within the pixel, i.e., no region where alignment is not done. Thereby, the part with incomplete alignment is not generated within the pixel, so that a fine four-divided alignment can be acquired.

Fourth Exemplary Embodiment

Figure 12:
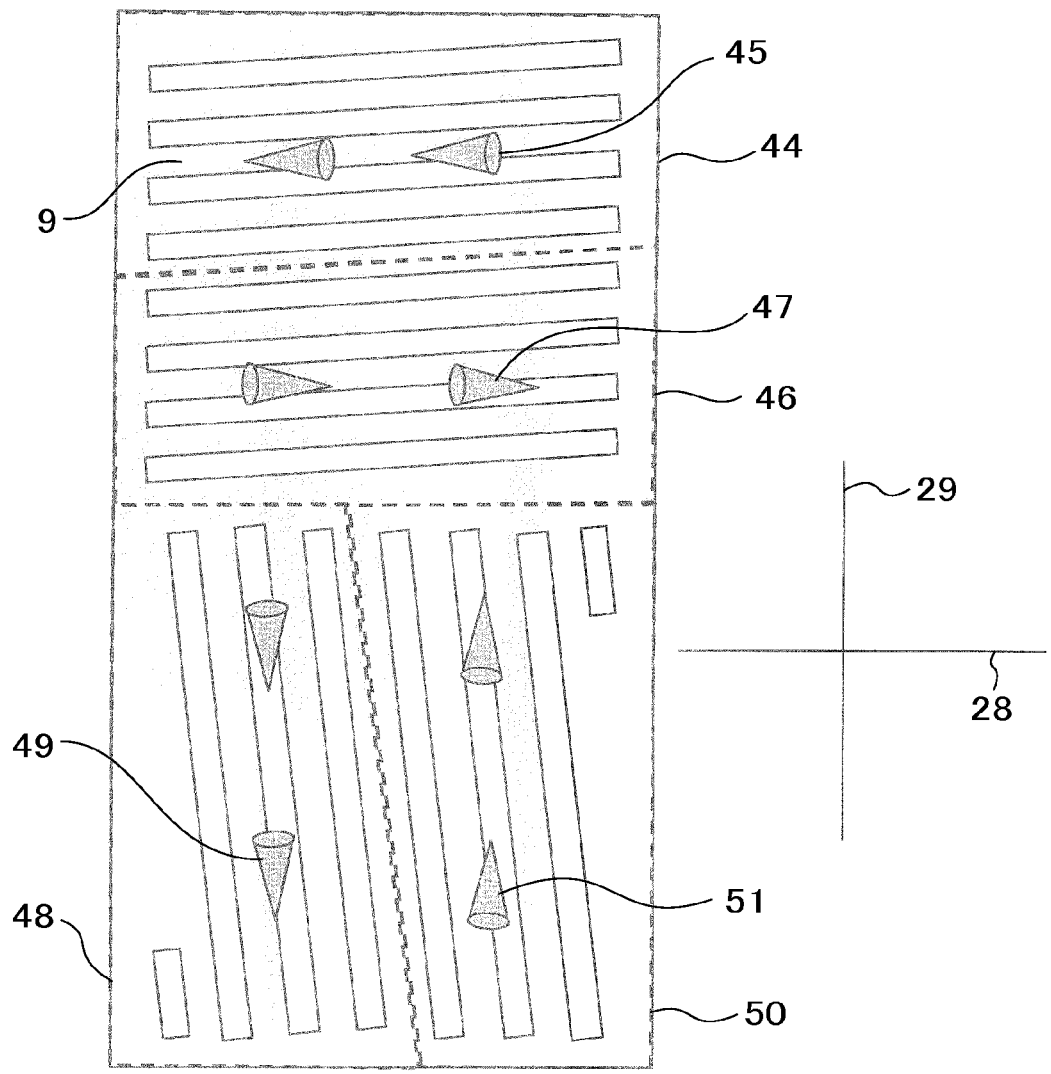
FIG. 12 is a plan view showing an alignment state of one pixel of a liquid crystal display device according to a fourth exemplary embodiment.

As a fourth exemplary embodiment of the present invention, shown is a case where the facing directions of pretilt are set as two directions for the same alignment azimuth of a pixel structure that is equivalent to the pixel plan view of the second exemplary embodiment, as in the case of the third exemplary embodiment. FIG. 12 shows the regions where the alignment directions are divided in a display region within the pixel. The fourth exemplary embodiment will be described by mainly referring to FIG. 12 and also by using FIG. 2 and FIG. 6.

In the case of the fourth exemplary embodiment, the strip electrode 9 is extended in the direction rotated counterclockwise by 8 degrees from the horizontal direction (extending direction of the scanning line) in the regions (44, 46) of an upper half part of a pixel, and the strip electrode 9 is extended in the direction orthogonal thereto in the regions (48, 50) of a lower half part of the pixel.

In the regions (44, 46) in the upper half part of FIG. 12 where the strip electrode 9 is extended in the direction rotated counterclockwise by 8 degrees from the horizontal direction (extending direction of the scanning line), the alignment azimuths 45 and 47 are set in the horizontal direction. Each of the regions (44, 46) is further divided into two, and alignment processing is performed in the region 1 (44) of the upper half part in the direction towards which the pretilt rises in the right direction of the drawing while alignment processing is performed in the region 2 (46) of the lower half part in the direction towards which the pretilt rises in the left direction. Further, in the regions (48, 50) in the lower half part of FIG. 12 where the strip electrode 9 is extended in the direction rotated counterclockwise by 8 degrees from the longitudinal direction (direction orthogonal to the extending direction of the scanning line), the alignment azimuths 49 and 51 are set in the longitudinal direction. Each of the regions (48, 50) is further divided into two, and alignment processing is performed in the region 3 (48) of the left half part in the direction so that the pretilt faces in the upper direction while alignment processing is performed in the region 4 (50) of the right half part so that the pretilt faces in the lower direction.

Note here that the angles are so set that the alignment azimuths 45, 47 of the regions 44, 46 of the upper half part of FIG. 12 and the alignment azimuths 49, 51 of the regions 48, 50 of the lower half part become orthogonal to each other. Further, absolute values of the pretilt angles of the liquid crystal layer of each of the regions 44, 46, 48, and 50 are all about 1 degree. Other than that, the manufacturing method, the structure, and the like are to follow those of the first exemplary embodiment.

In this case, the four regions 44, 46, 48, and 50 compensate with each other as in the case of the third exemplary embodiment. Thus, the viewing angle characteristics becomes equivalent to that of FIG. 9B, so that a fine property can be acquired.

As in the case of the third exemplary embodiment, the both sides of the region 1 (44) in the upper half part of the pixel in the vicinity of the data line 5 are set to be in the same alignment state as that of the region 1 (44), and the both sides of the region 2 (46) are set to be in the same alignment state as that of the region 2 (46). The both sides of the regions 3, 4 (48, 50) in the lower half part of the pixel are set to be in the same alignment state as that of the region 2 (46). As in the case of the fourth exemplary embodiment, the electric field between the data line 5 and the pixel electrode 10 is generated in the lateral direction which matches the alignment azimuths of the region 1 and the region 2. Thus, there is no motion of the liquid crystal 12 in the vicinity of the data line 5 caused by the electric field. Therefore, the width of the black matrix 17 for shielding the part between the data line 5 and the pixel electrode 10 on the counter side can be made still smaller than the case of the third exemplary embodiment, so that the aperture ratio can be secured still wider.

In this case, the same alignment direction as that of the region 2 is to be employed for the regions in the vicinity of the data lines 5 on both sides of the regions 3 and 4. Thus, the light shielding layer 4 constituted with the first metal layer is disposed by connecting to the common electrode 1 in the part to be the boundary therebetween.

Fifth Exemplary Embodiment

Figure 13:
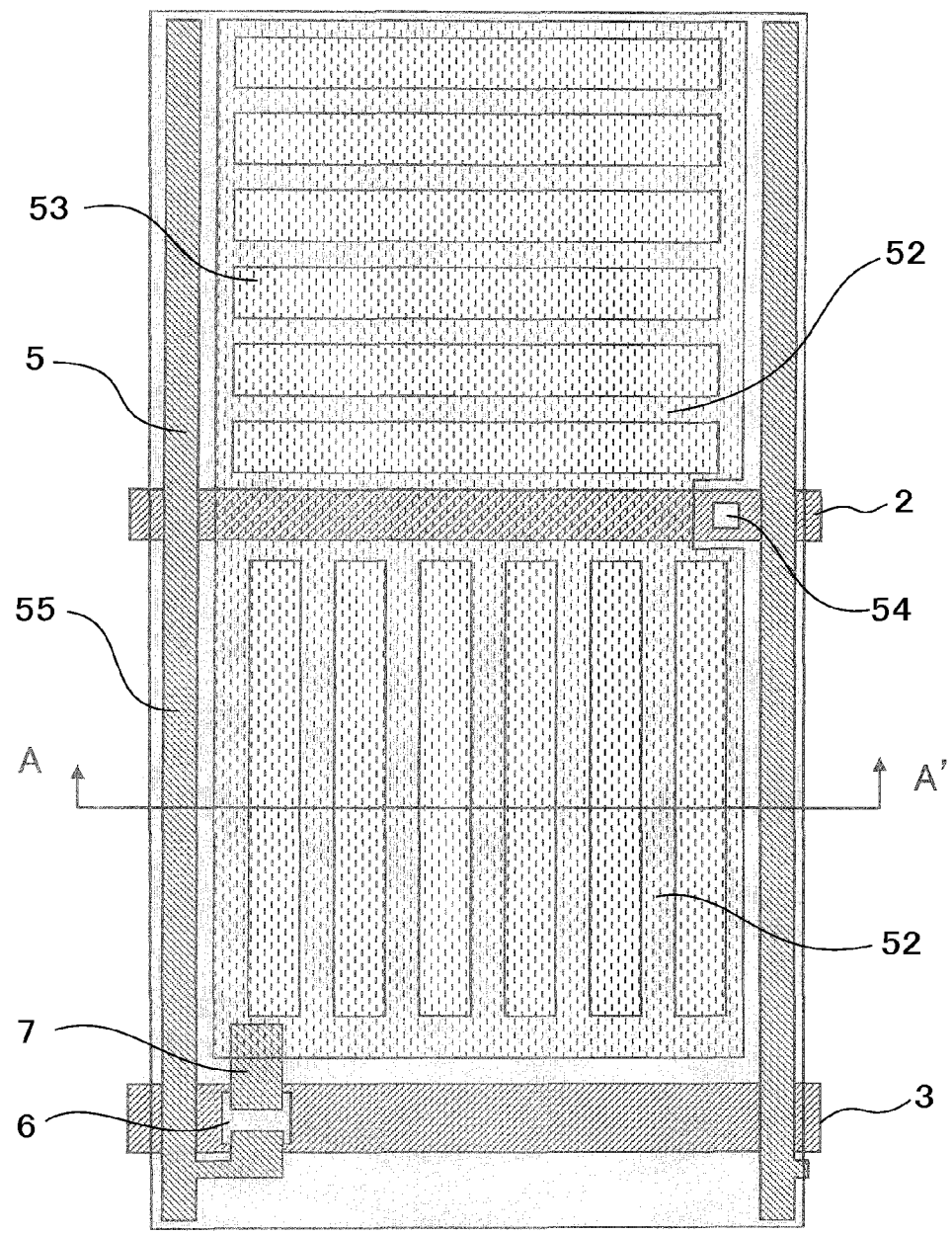
FIG. 13 is a plan view showing the structure of one pixel of a liquid crystal display device according to a fifth exemplary embodiment.
Figure 14:
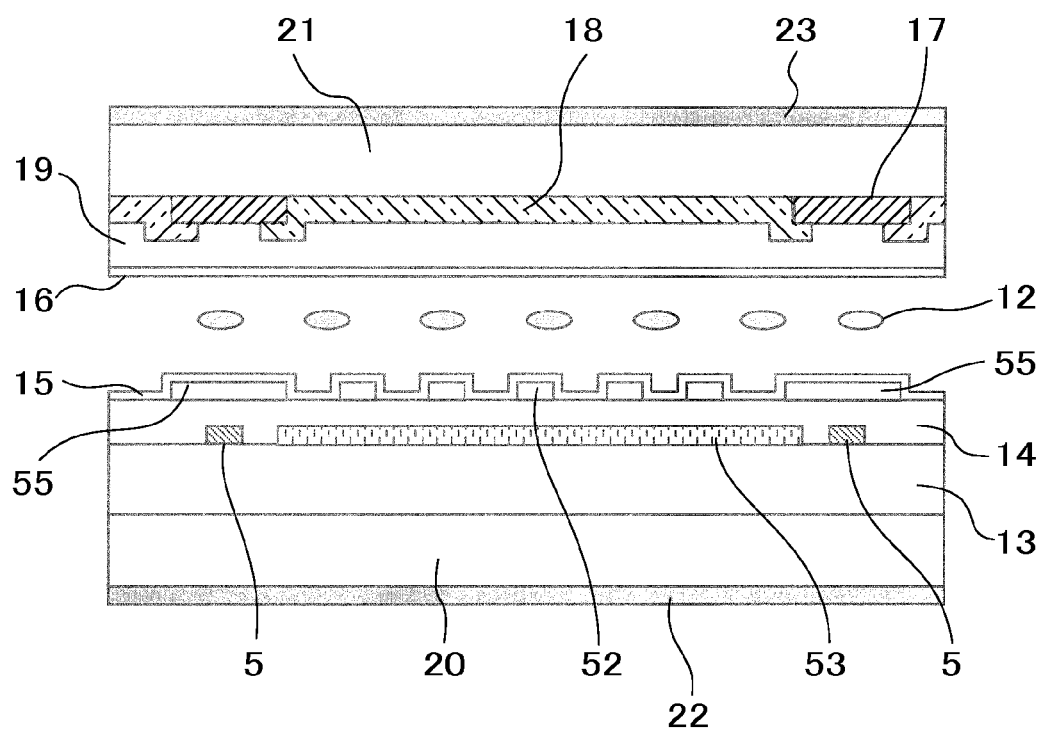
FIG. 14 is a sectional view taken along A-A' of FIG. 13.
Figure 15:
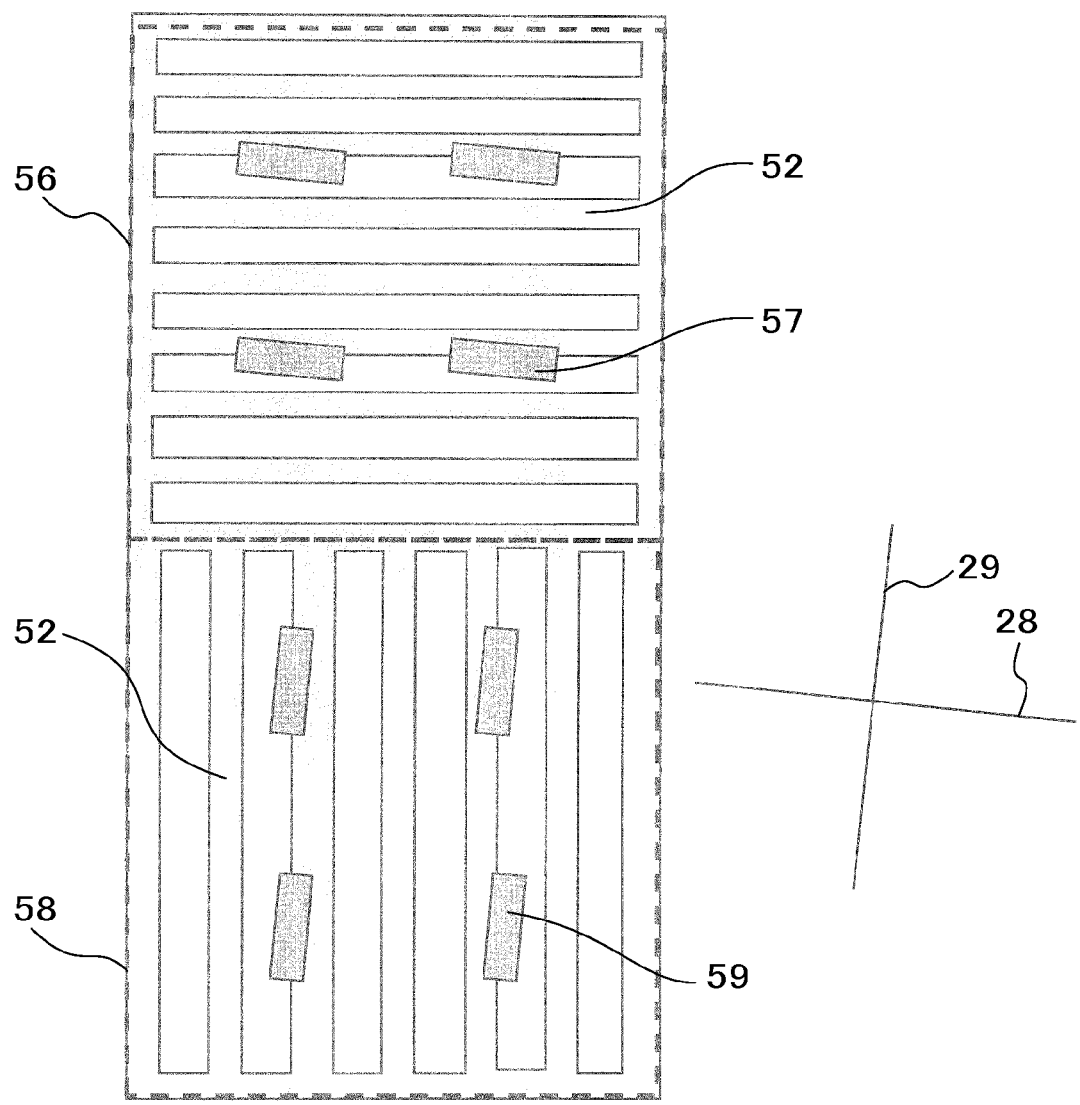
FIG. 15 is a plan view showing an alignment state of one pixel of the liquid crystal display device according to the fifth exemplary embodiment.
Figure 16:
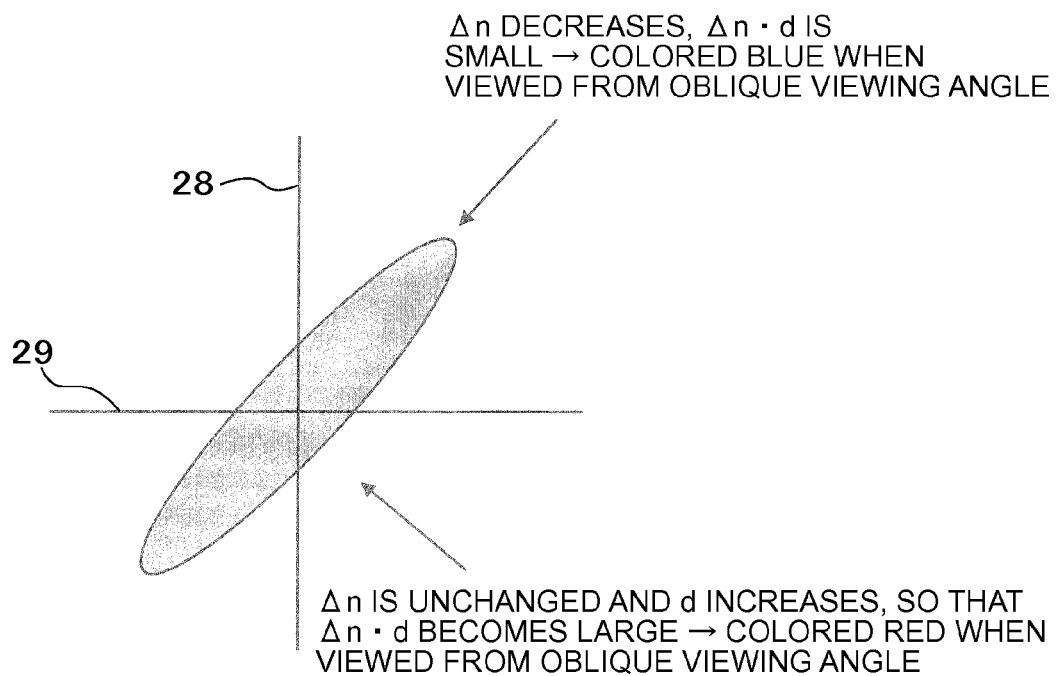
FIG. 16 is a chart for describing an issue of the viewing angle characteristics of a lateral electric field mode according to the related technique.
Figure 17A:
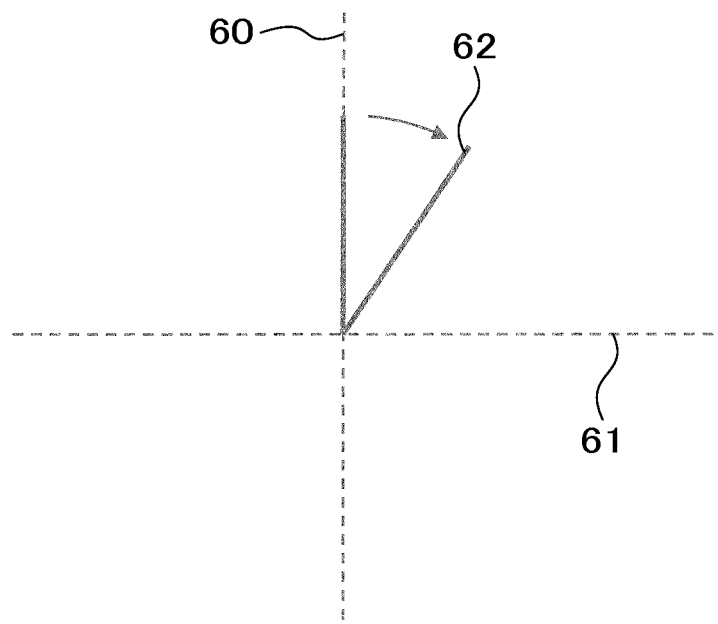
FIGS. 17A, 17B and 17C show charts for describing another issue of the viewing angle characteristics of a lateral electric field mode according to the related technique.
Figure 17B:
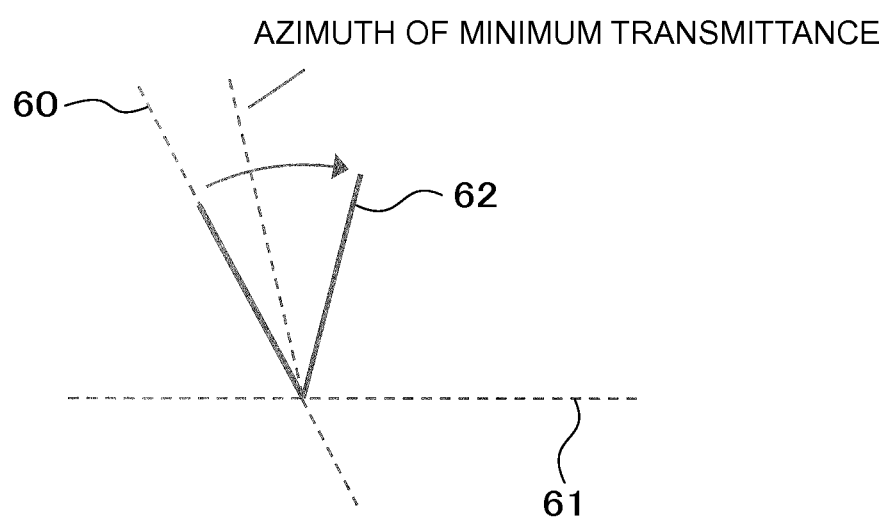
Figure 17C:
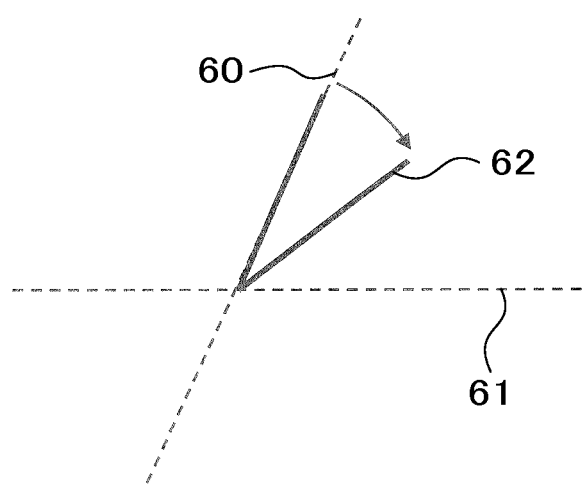

A fifth exemplary embodiment of the present invention will be described by referring to FIGS. 13, 14, and 15. FIG. 13 is a plan view showing the structure of one pixel of a liquid crystal display device according to the fifth exemplary embodiment. FIG. 14 is a sectional view taken along A-A' of FIG. 13. Further, FIG. 15 is a plan view showing the regions where the alignment directions are divided into two in the display region within a pixel.

The fifth exemplary embodiment shown in FIG. 13 will be described in details hereinafter by following the fabricating procedure. First, Cr of 250 nm as a first metal layer is deposited on a glass substrate as the first transparent insulating plate 20, and patterns of the scanning line 3 and the common signal wiring 2 are formed from the Cr film.

Then, SiNx of 400 nm as the gate insulating film 13, a-Si:H of 200 nm as the thin film semiconductor layer 6, and n-a-Si:H of 50 nm are stacked, and the thin film semiconductor layer 6 is patterned in such a manner that only a TFT part provided as a switching element of the pixel remains. Further, Cr of 250 nm as a second metal layer is deposited, and patterns of the data line 2, the source-drain electrode of the TFT, and the pixel electrode part 7 constituted with the second metal layer are formed from the Cr film.

Then, n-a-Si of the TFT part is removed by having the source-drain electrode of the TFT as a mask. Further, ITO of 40 nm as a second transparent electrode is formed thereon. A pattern of the plan pixel electrode 53 is formed from the ITO film, and the pixel electrode 53 is connected to the pixel electrode part 7 constituted with the second metal layer.

Then, SiNx of 600 nm as the protection insulating film 14 is formed, and the through hole 54 for connecting the common electrode 52 to the common signal wiring 2 is formed in the protection insulating film 14. Further, ITO of 40 nm as a third transparent electrode is formed thereon, and a pattern of the common electrode 52 is formed from the ITO film. The common electrode 52 is in a form in which the pattern of the strip electrodes are connected at the both ends. The width of the strip electrode 9 is set to 3 μm, and the width of the slit between the strip electrodes is set to 6 μm.

In the pattern, the strip electrode 9 is extended in the horizontal direction (direction in parallel to the scanning line) in the upper half part of the pixel while it is extended in the perpendicular direction (direction perpendicular to the scanning line) in the lower half part, and the both are set to be orthogonal to each other. Further, the common electrode 55 for shielding the bus line is provided to the common electrode 52 by covering the data line 5 and the scanning line 3. Thereby, influences of the potential of the bus line at the time of drive can be shielded, and a still wider numerical aperture can be acquired.

Through the above-described method, the TFT array is formed. Further, the black matrix 17 is formed on a glass substrate as the second transparent insulating substrate 21 by using a resin black. The color layer 18 of RGB is formed thereon in a prescribed pattern, the overcoat 19 is formed thereon, and a columnar spacer (not shown) is formed thereon further to fabricate a color filter substrate.

The alignment films which can be aligned by light irradiation are formed both on the TFT array substrate and the color filter substrate fabricated in the manner described above, and photo-alignment processing is performed to form the two regions 56 and 58 shown in FIG. 15. In the region 56 where the strip common electrode 52 is extended in the lateral direction shown in the upper half part of FIG. 15, the alignment azimuth 57 is set to have an angle of 8 degrees with respect to the extending direction of the strip. The pretilt angles are set to be 0 degree in both the TFT array substrate and the color filter substrate. This region 56 is defined as the region 1.

Meanwhile, in the region 58 where the strip electrode 52 is extended in the longitudinal direction shown in the lower half part of FIG. 15, the alignment azimuth 59 is set to have an angle of 8 degrees with respect to the extending direction of the strip. The pretilt angles are set to be 0 degree in both the TFT array substrate and the color filter substrate. This region 58 is defined as the region 2.

Note here that the alignment azimuth 57 of the region 56 of the upper half part of FIG. 15 and the alignment azimuth 59 of the region 58 of the lower half part are set to be orthogonal. Further, the sizes of the areas of the region 1 (56) and the region 2 (58) are set to be almost equivalent. This makes it possible to easily perform compensation between the two regions 56 and 58 mutually, so that it is possible to acquire fine viewing angle characteristics with which fluctuation of the voltage-luminance characteristics and coloring depending on the viewing angles is small and the symmetry is fine.

Further, a seal member is applied to the both substrates to be laminated, and the liquid crystal material 12 having a positive dielectric constant is inserted and sealed therein. Note that the physical property values of the liquid crystal material are set as $\Delta \in = 5.5$, $\Delta n = 0.100$, and the height of the columnar spacer is controlled so that the liquid crystal layer thickness becomes 4.0 μm.

Further, the polarization plates 22 and 23 are laminated on the outer side of the glass substrates on both sides in such a manner that the polarization axes are orthogonal to each other. Note here that a direction of the absorption axis 28 of the incident-side polarization plate 22 on the TFT array substrate side is set to be the same with the initial alignment direction 57 of the region 1. Through loading a backlight and a driving circuit to the liquid crystal display panel fabricated in the manner described above, the active matrix type liquid crystal display device according to the fifth exemplary embodiment is completed.

In the liquid crystal display device acquired in the manner described above, the liquid crystal 12 rotates clockwise both in the region 1 and the region 2 when an electric field is applied between the pixel electrode 53 and the common electrode 52. The alignment azimuths 57 and 59 of the region 1 and the region 2 are orthogonal to each other. As shown by using FIG. 22A to FIG. 24B, shift of the voltage-transmittance characteristics when viewed from the oblique viewing angle of the azimuth of the absorption axis 28 of the incident-side polarization plate 22 is an issue with the region 1 or the region 2 alone. In the meantime, through disposing the both regions 1 and 2 to have a same-size area, the viewing angle characteristics thereof compensate with each other. Therefore, the shift of the voltage-transmittance can be remarkably suppressed.

FIG. 4A shows the voltage-transmittance characteristics in the region 1 alone and the region 2 alone when viewed from the viewing angle of the polar angle of 60 degree formed between the azimuth of the absorption axis of the incident-side polarization plate and a perpendicular of the substrate and the voltage-transmittance characteristics when viewed from the front view described above. In the front view, the voltage-transmittance characteristics of the region 1 and the voltage-transmittance characteristics of the region 2 are consistent with each other. However, when viewed from the oblique viewing angle, the voltage-transmittance characteristics of the region 1 is shifted towards the low-voltage side from the characteristics of the front viewing angle due to the theory described in FIG. 18B, and the voltage-transmittance characteristics of the region 2 is shifted towards the high-voltage side due to the same theory.

In the meantime, in the case of the fifth exemplary embodiment, the region 1 and the region 2 are formed to have almost a same-size area within one pixel. Thus, the both compensate with each other optically. Therefore, as shown in FIG. 4B, it is possible to suppress shift of the voltage-transmittance characteristics when viewed from the oblique viewing angle to be remarkably small. This makes it possible to acquire a liquid crystal display device of extremely excellent viewing angle characteristics with which the shift of the voltage-luminance characteristics as well as coloring is small even when viewed from the oblique viewing angles of all the azimuths.

Further, since the alignment directions of the region 1 and the region 2 are orthogonal, there is a part in the boundary thereof where the alignment azimuth changes by 90 degrees. In this part, the liquid crystal directors face towards the azimuth different from the polarization axis of the polarization plate at the time of black display. This may cause light leakage, so that it is desirable to shield the light. In this case, light is shielded by disposing the common signal wiring 2 constituted with the first metal layer in that region. Thereby, it is possible to shield only the required region with high precision, so that light can be shielded sufficiently without deteriorating the numerical aperture. Further, the potential of the nontransparent metal layer is equivalent to that of the common electrode, so that fine display can be acquired without giving an electric disturbance.

In the above-described case, light leakage is suppressed by disposing the nontransparent metal layer of the potential equivalent to that of the common electrode on the TFT array substrate side. However, the same effects can also be acquired by making the potential of the nontransparent metal layer be equivalent to the potential of the pixel. Further, it is also possible to shield the light in the boundary part between the region 1 and the region 2 by providing a black matrix on the counter substrate side.

With the fifth exemplary embodiment, the data line 5, the scanning line 3, and the part between the scanning line 3 and the common signal wiring 2 are shielded by the common electrode 55. Thus, it is not necessary to set the alignment azimuth to the direction close to the horizontal direction in the vicinity of the data line 5 unlike the case of the exemplary embodiments 1 to 4. Therefore, it is desirable to set the alignment direction on the wiring to be in the same state as that of the alignment azimuth of the adjacent display region. With this, there is no region where there is a change in the alignment between the alignment on the wiring and the alignment on the display unit. Thus, it is unnecessary to increase the light shielding region, and the aperture region can be secured still wider. That is, the both sides of the region 1 are set to be in the same alignment state as that of the region 1, and the both sides of the region 2 are set to be in the same alignment state as that of the region 2.

Sixth Exemplary Embodiment

Figure 30:
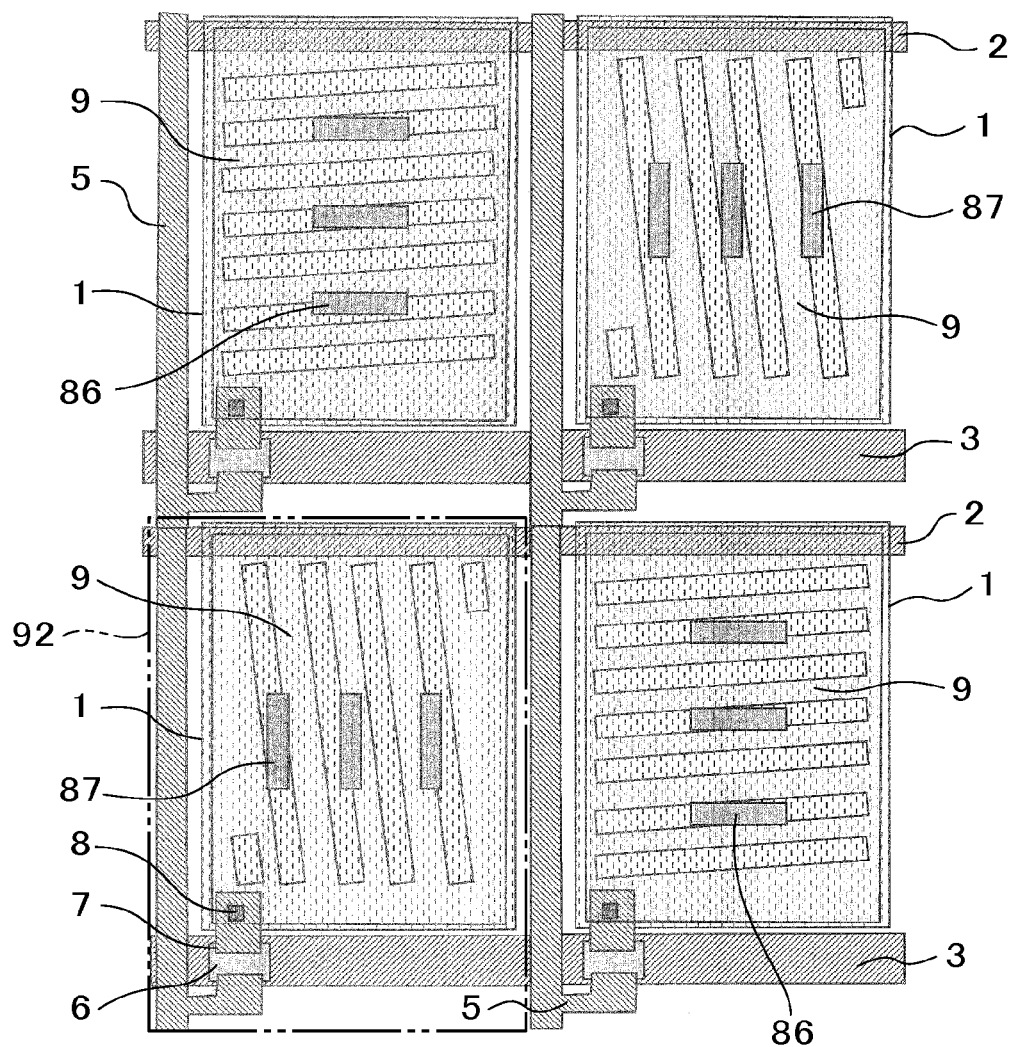
FIG. 30 is a plan view showing four neighboring pixels according to a sixth embodiment.

A sixth embodiment of the present invention will be described by referring to FIG. 30. FIG. 30 is a plan view showing the structure of four pixels neighboring to each other along the data line extending direction and the scanning line extending direction in a liquid crystal display device according to the sixth exemplary embodiment.

In FIG. 30, a reference numeral 92 is applied only to one of the pixels as the representative of the four pixels. In the explanations provided below, the extending direction of the scanning line 3 is referred to as the x direction, the extending direction of the data line 5 is referred to as the y direction, a pixel on a given coordinate is referred to as a pixel 92 (x, y), the n-th pixel from the pixel 92 (x, y) in the x direction is referred to as a pixel 92 (x+n, y), and the m-th pixel from the pixel 92 (x, y) in the y direction is referred to as a pixel 92 (x, y+m).

In the sixth exemplary embodiment, an alignment azimuth 86 or an alignment azimuth 87 of the liquid crystal within one pixel 92 is not divided. Between the neighboring pixels 92, i.e., between the pixel 92 (x, y) and the pixel 92 (x+1, y) as well as between the pixel 92 (x, y) and the pixel 92 (x, y+1), the alignment azimuths 86 and 87 are orthogonal to each other, the extending directions of the strip pixel electrodes 9 are orthogonal to each other, and the angles formed between the alignment azimuths 86, 87 and the extending direction of the strip pixel electrode 9 are the same. Further, the pretilt of the liquid crystal is set to be 0 degree.

Regarding the neighboring pixels 92, the interval and the width of the strip pixel electrodes 9 are designed appropriately in such a manner that the transmittance thereof when viewed from the front side becomes almost equivalent.

With this, the voltage-luminance characteristics show low-voltage side shift within one pixel 92 when viewed from the alignment azimuths 86 and 87. However, when the neighboring pixels 92 are combined, the voltage-luminance characteristics thereof from the oblique viewing angle compensate with each other. Therefore, fine viewing angle characteristics can be acquired. In a case where color layers (RGB) different for each pixel 92 are disposed along the x direction and display is provided by having three pixels 92 as a unit, the color layer of the pixel 92 (x, y) is the same as the color layer of the pixel 92 (x+3, y). Regarding the pixel 92 (x, y) and the pixel 92 (x+3, y), the alignment azimuths 86, 87 are orthogonal to each other and the extending directions of the strip pixel electrodes 9 are orthogonal to each other as well. Thus, the viewing angle characteristics thereof compensate with each other as well. Therefore, the viewing angle characteristics of the pixels 92 having the same color layer compensate with each other between the pixel 92 (x, y) and the pixel 92 (x, y+1) and between the pixel 92 (x, y) and the pixel 92 (x+3, As described, through setting the alignment azimuth 86 or the alignment azimuth 87 within one pixel 92 as one direction, it becomes possible to deal with pixels of still higher precision.

Seventh Exemplary Embodiment

Figure 31:
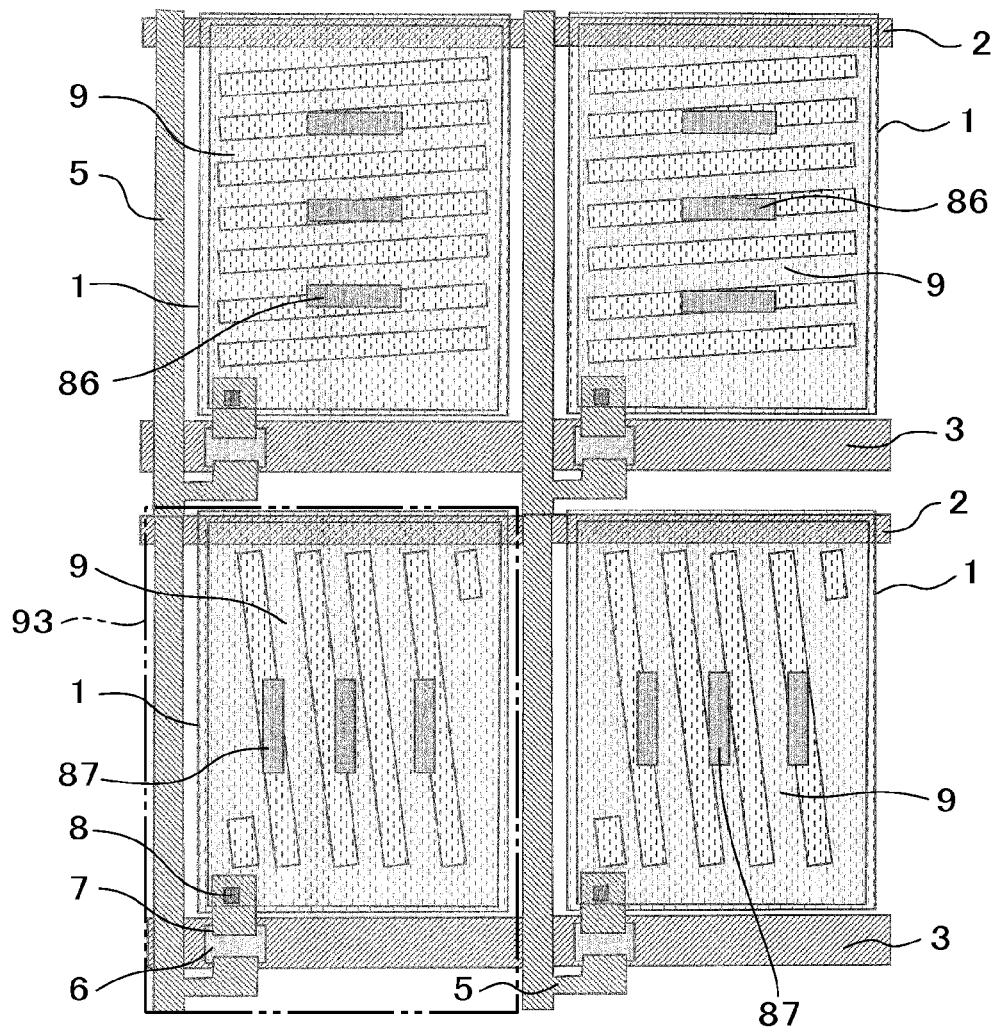
FIG. 31 is a plan view showing four neighboring pixels according to a seventh embodiment.

A seventh exemplary embodiment of the present invention will be described by referring to FIG. 31. FIG. 31 is a plan view showing the structure of four pixels neighboring to each other along the data line extending direction and the scanning line extending direction in a liquid crystal display device according to the seventh exemplary embodiment.

In FIG. 31, a reference numeral 93 is applied only to one of the pixels as the representative of the four pixels. In the explanations provided below, the extending direction of the scanning line 3 is referred to as the x direction, the extending direction of the data line 5 is referred to as the y direction, a pixel on a given coordinate is referred to as a pixel 93 (x, y), the n-th pixel from the pixel 93 (x, y) in the x direction is referred to as a pixel 93 (x+n, y), and the m-th pixel from the pixel 93 (x, y) in the y direction is referred to as a pixel 93 (x, y+m).

As in the case of the sixth exemplary embodiment, the alignment azimuth 86 or the alignment azimuth 87 is not divided within one pixel 93 in the seventh exemplary embodiment, and the alignment azimuths 86, 87 are orthogonal to each other between the pixel 93 (x, y) and the pixel 93 (x, y+1). In the sixth exemplary embodiment, the alignment azimuths 86 and 87 are orthogonal to each other also between the pixel 92 (x, y) and the pixel 92 (x+1, y). However, in the seventh exemplary embodiment, the alignment azimuths 86 and 87 are set to be the same between the pixel 93 (x, y) and the pixel 93 (x+1, y).

Accordingly, the directions of the strip pixel electrodes 9 are set to be orthogonal to each other between the pixel 93 (x, y) and the pixel 93 (x, y+1) and set to be the same between the pixel 93 (x, y) and the pixel 93 (x+1, y). The angles formed between the alignment azimuths 86, 87 and the extending direction of the strip pixel electrodes 9 are set to be the same between the neighboring pixels 93. Further, the pretilt of the liquid crystal is set to be 0 degree. Regarding the neighboring pixels 93, the interval and the width of the strip pixel electrodes 9 are designed appropriately in such a manner that the transmittance thereof when viewed from the front side becomes almost equivalent.

With this, the voltage-luminance characteristics show low-voltage side shift within one pixel 93 when viewed from the alignment azimuths 86 and 87. However, when the neighboring pixels 93 are combined, the voltage-luminance characteristics thereof from the oblique viewing angle compensate with each other. Therefore, fine viewing angle characteristics can be acquired. In this case, all the pixels 93 in the x direction can be arranged in the same alignment azimuth 86 or alignment azimuth 87, so that alignment processing can be performed efficiently.

Eighth Exemplary Embodiment

Figure 32:
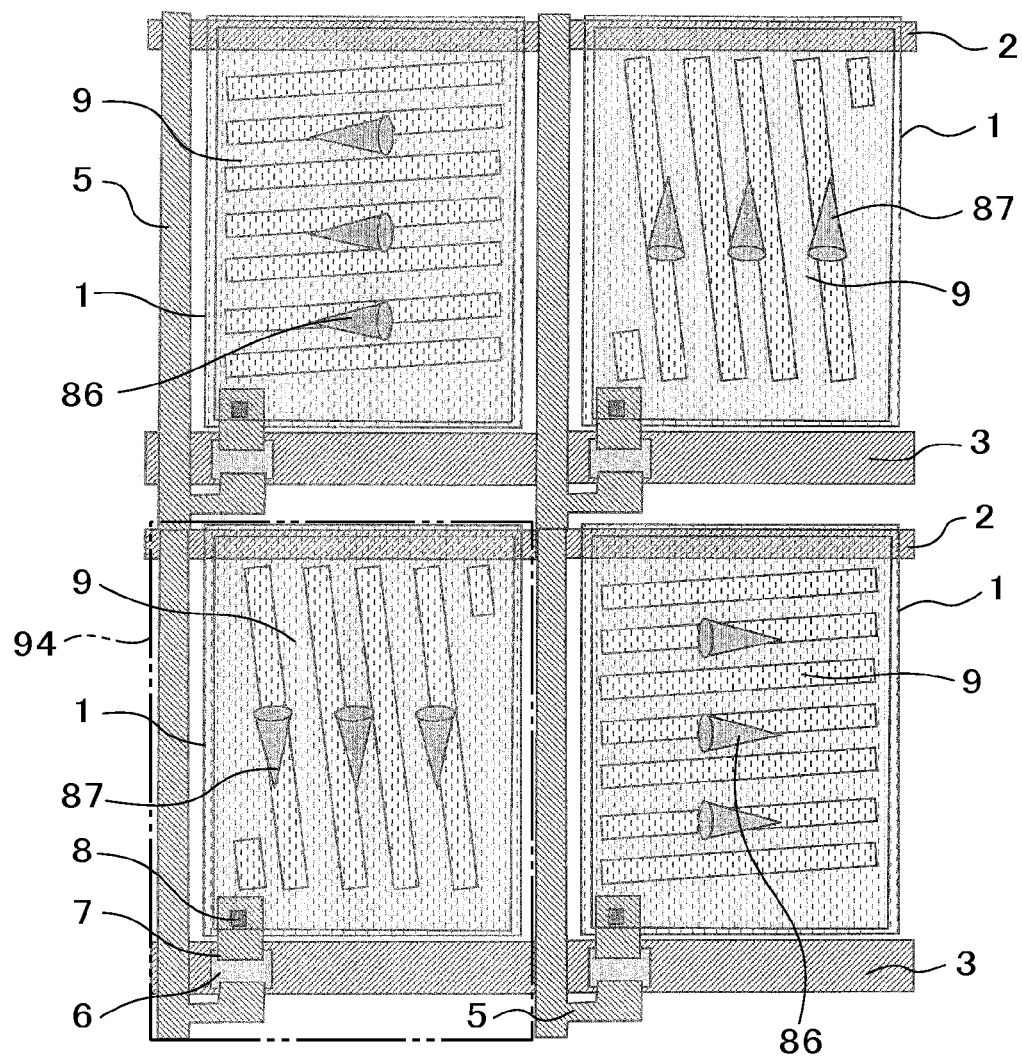
FIG. 32 is a plan view showing four neighboring pixels according to an eighth embodiment.

An eighth exemplary embodiment of the present invention will be described by referring to FIG. 32. FIG. 32 is a plan view showing the structure of four pixels neighboring to each other along the data line extending direction and the scanning line extending direction in a liquid crystal display device according to the eighth exemplary embodiment.

In FIG. 32, a reference numeral 94 is applied only to one of the pixels as the representative of the four pixels. In the explanations provided below, the extending direction of the scanning line 3 is referred to as the x direction, the extending direction of the data line 5 is referred to as the y direction, a pixel on a given coordinate is referred to as a pixel 94 (x, y), the n-th pixel from the pixel 94 (x, y) in the x direction is referred to as a pixel 94 (x+n, y), and the m-th pixel from the pixel 94 (x, y) in the y direction is referred to as a pixel 94 (x, y+m).

As in the case of the sixth exemplary embodiment, the alignment azimuth 86 or the alignment azimuth 87 is not divided within one pixel 94 in the eighth exemplary embodiment. Between the neighboring pixels 94, the alignment azimuths 86, 87 are orthogonal to each other, the extending directions of the strip pixel electrodes 9 are orthogonal to each other, and the angles formed between the alignment azimuths 86, 87 and the extending direction of the strip pixel electrodes 9 are the same.

Further, in the eighth exemplary embodiment, the directions of the pretilt are set to be 1 degree and to be opposite from each other between the pixels 94 neighboring to each other in the oblique direction having the same alignment azimuths 86, 87, i.e., between the pixel 94 (x, y) and the pixel 94 (x+1, y+1) as well as between the pixel 94 (x+1, y) and the pixel 94 (x, y+1). Between the neighboring pixels 94, the interval and the width of the strip pixel electrodes 9 are designed appropriately in such a manner that the transmittance thereof when viewed from the front side becomes almost equivalent.

With this, the voltage-luminance characteristics show low-voltage side shift within one pixel 94 when viewed from the alignment azimuths 86 and 87. However, when the neighboring pixels 94 are combined, the voltage-luminance characteristics thereof from the oblique viewing angle compensate with each other. Therefore, fine viewing angle characteristics can be acquired. In a case where different color layers (RGB) for each pixel 94 are disposed along the x direction and display is provided by having three pixels 94 as a unit, the color layer of the pixel 94 (x, y) is the same as the color layer of the pixel 94 (x+3, y). Regarding the pixel 94 (x, y) and the pixel 94 (x+3, y), the alignment azimuths 86, 87 are orthogonal to each other and the extending directions of the strip pixel electrodes 9 are orthogonal to each other as well. With this layout, the pixel 94 (x, y), the pixel 94 (x, y+1), the pixel 94 (x+3, y), and the pixel 94 (x+3, y+1) are four kinds of pixels 94 constituted with a combination of the two kinds of alignment azimuths 86, 87 orthogonal to each other and the two kinds of pretilt reversed from each other. Therefore, the viewing angle characteristics compensate with each other between the pixels 94 further, so that still finer viewing angle characteristics can be acquired.

As described, through forming the neighboring four pixels 94 of the same color layers with the four kinds of pixels 94 constituted with the two kinds of alignment azimuths 86, 87 and the two kinds of pretilt directions, fine viewing angle characteristics can be acquired.

Ninth Exemplary Embodiment

Figure 33:
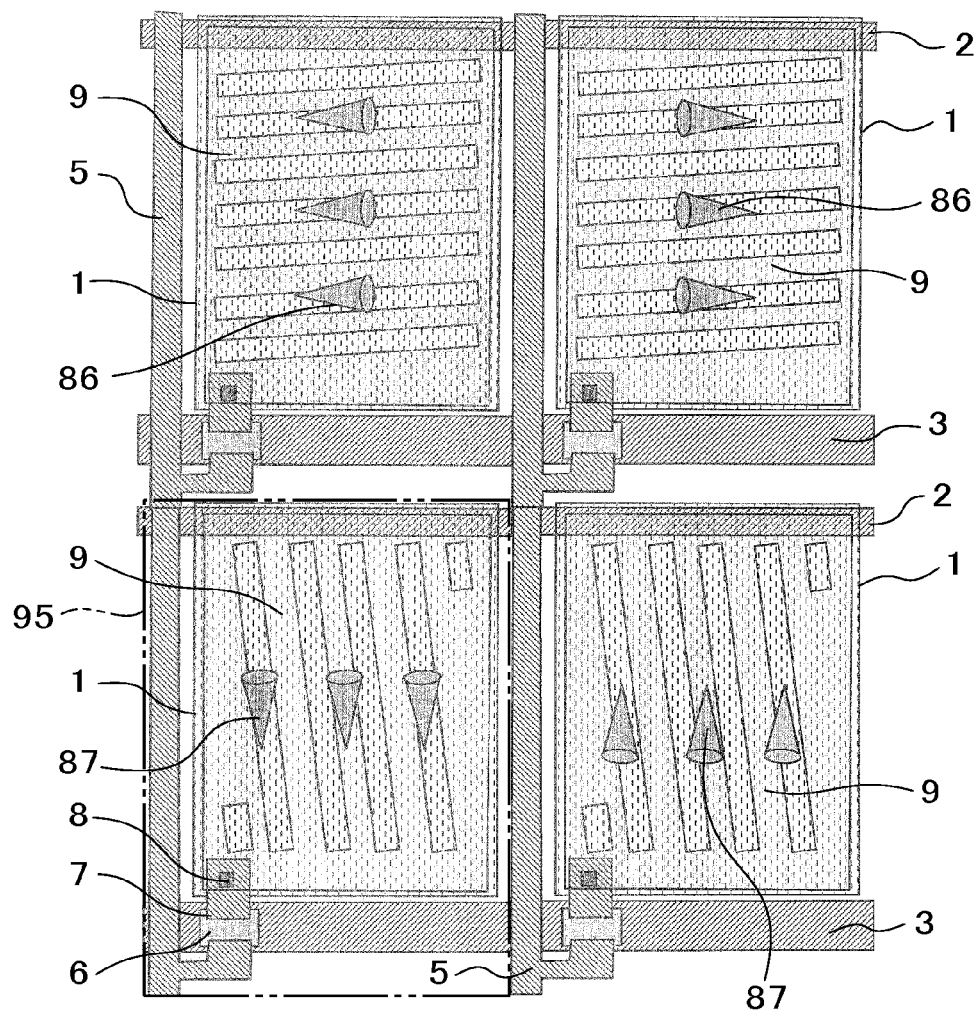
FIG. 33 is a plan view showing four neighboring pixels according to a ninth embodiment.

A ninth exemplary embodiment of the present invention will be described by referring to FIG. 33. FIG. 33 is a plan view showing the structure of four pixels neighboring to each other along the data line extending direction and the scanning line extending direction in a liquid crystal display device according to the ninth exemplary embodiment.

In FIG. 33, a reference numeral 95 is applied only to one of the pixels as the representative of the four pixels. In the explanations provided below, the extending direction of the scanning line 3 is referred to as the x direction, the extending direction of the data line 5 is referred to as the y direction, a pixel on a given coordinate is referred to as a pixel 95 (x, y), the n-th pixel from the pixel 95 (x, y) in the x direction is referred to as a pixel 95 (x+n, y), and the m-th pixel from the pixel 95 (x, y) in the y direction is referred to as a pixel 95 (x, y+m).

As in the case of the seventh exemplary embodiment, the alignment azimuth 86 or the alignment azimuth 87 is not divided within one pixel 95 in the ninth exemplary embodiment, and the alignment azimuths 86, 87 are orthogonal to each other between the pixel 95 (x, y) and the pixel 95 (x, y+1). Further, the extending directions of the strip pixel electrodes 9 are arranged to be orthogonal to each other between the pixel 95 (x, y) and the pixel 95 (x, y+1). The angles formed between the alignment azimuths 86, 87 and the extending direction of the strip pixel electrodes 9 are set to be the same.

Further, in the ninth exemplary embodiment, the directions of the pretilt are set to be 1 degree and to be opposite from each other between the pixel 95 (x, y) and the pixel 95 (x+1, y) neighboring to each other in the x direction having the same alignment azimuth 87 as well as between the pixel 95 (x, y+1) and the pixel 95 (x+1, y+1) neighboring to each other in the x direction having the same alignment azimuth 86. Between the neighboring pixels 95, the interval and the width of the strip pixel electrodes 9 are designed appropriately in such a manner that the transmittance thereof when viewed from the front side becomes almost equivalent.

With this, the voltage-luminance characteristics show low-voltage side shift within one pixel 95 when viewed from the alignment azimuths 86 and 87. However, when the neighboring pixels 95 are combined, the voltage-luminance characteristics thereof from the oblique viewing angle compensate with each other. Therefore, fine viewing angle characteristics can be acquired.

In a case where color layers (RGB) different for each pixel 95 are disposed along the x direction and display is provided by having three pixels 95 as a unit, the color layer of the pixel 95 (x, y) is the same as the color layer of the pixel 95 (x+3, y). Regarding the pixel 95 (x, y) and the pixel 95 (x+3, y), the alignment azimuths 87 are the same and the directions of the pretilt of the liquid crystal are opposite from each other. With this layout, the pixel 95 (x, y), the pixel 95 (x, y+1), the pixel 95 (x+3, y), and the pixel 95 (x+3, y+1) are four kinds of pixels 95 constituted with a combination of the two kinds of alignment azimuths 86, 87 orthogonal to each other and the two kinds of pretilt reversed from each other. Therefore, the viewing angle characteristics compensate with each other between the pixels 95 further, so that still finer viewing angle characteristics can be acquired.

As described, through forming the neighboring four pixels 95 of the same color layers with the four kinds of pixels 95 constituted with the two kinds of alignment azimuths 86, 87 and the two kinds of pretilt directions, fine viewing angle characteristics can be acquired. Moreover, all the pixels 95 in the x direction can be provided in the same alignment azimuth 86 or alignment azimuth 87, so that alignment processing can be performed efficiently.

Tenth Exemplary Embodiment

Figure 38:
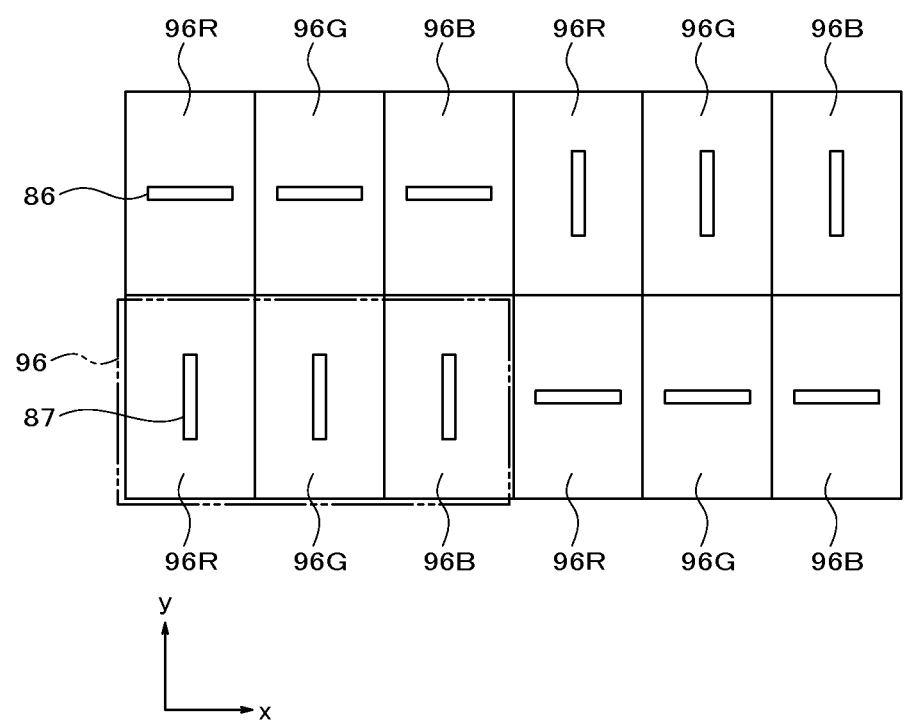
FIG. 38 is a plan view showing twelve neighboring pixels according to a tenth embodiment.

A tenth exemplary embodiment of the present invention will be described by referring to FIG. 38. FIG. 38 shows the initial alignment direction of the liquid crystal in twelve pixels neighboring to each other along the data line extending direction and the scanning line extending direction in a liquid crystal display device according to the tenth exemplary embodiment.

In FIG. 38, three pixels 96R, 96G, and 96B neighboring to each other in the x direction constitute one unit 96 for display. A numeral reference 96 is applied only to a single unit by representing the four pieces of one unit. In the explanations provided below, the extending direction of the scanning line 3 is referred to as the x direction, the extending direction of the data line 5 is referred to as the y direction, one unit on a given coordinate is referred to as one unit 96 (x, y), the n-th unit from the one unit 96 (x, y) in the x direction is referred to as one unit 96 (x+n, y), and the m-th unit from the one unit 96 (x, y) in the y direction is referred to as one unit 96 (x, y+m).

The units 96 (x, y), 96 (x+1, y), 96 (x, y+1), and 96 (x+1, y+1) of the tenth exemplary embodiment correspond to the pixels 92 (x, y), 92 (x+1, y), 92 (x, y+1), and 92 (x+1, y+1) shown in FIG. 30, respectively. The pixels 96R, 96 and 96B are provided with a color filter of respective color layers of R (red), G (green), and B (blue). The structure of the inside of the pixels 96R, 96G, and 96B are the same as that of the pixel 92 shown in FIG. 30, so that the illustration thereof is omitted.

In the tenth exemplary embodiment, the alignment azimuth 86 or the alignment azimuth 87 of the liquid crystal within the one unit 96 is not divided. Between the one unit 96 (x, y) and the one unit 96 (x+1, y) as well as between the one unit 96 (x, y) and the one unit 96 (x, y+1), the alignment azimuths 86 and 87 are orthogonal to each other, the extending directions of the strip pixel electrodes are orthogonal to each other, and the angles formed between the alignment azimuths 86, 87 and the extending direction of the strip pixel electrodes are the same. Further, the pretilt of the liquid crystal is set to be 0 degree. Regarding the neighboring units 96, the interval and the width of the strip pixel electrodes are designed appropriately in such a manner that the transmittance thereof when viewed from the front side becomes almost equivalent. With this, the voltage-luminance characteristics show low-voltage side shift within the one unit 96 when viewed from the alignment azimuths 86 and 87. However, when the neighboring units 96 are combined, the voltage-luminance characteristics thereof from the oblique viewing angle compensate with each other. Therefore, fine viewing angle characteristics can be acquired. Further, in a case where a relatively high gradation is displayed only in a specific one unit 96 and black display is provided in the peripheral units 96, there is no compensation done between the neighboring units 96 when viewed obliquely from the alignment azimuths 86 and 87. Even in such case, it becomes hard to have coloration of the one unit 96 since the pixels 96R, 96G, and 96B constituting one unit 96 are facing the same azimuth 86 or 87 and make the same shift. While the case where the pixels 96R, 96G, and 96B are lined in the x direction is described above, the same effects can be acquired also in a case where the pixels 96R, 96G, and 96B are lined in the y direction by constituting the one unit 96 in the manner described above.

Eleventh Exemplary Embodiment

Figure 39:
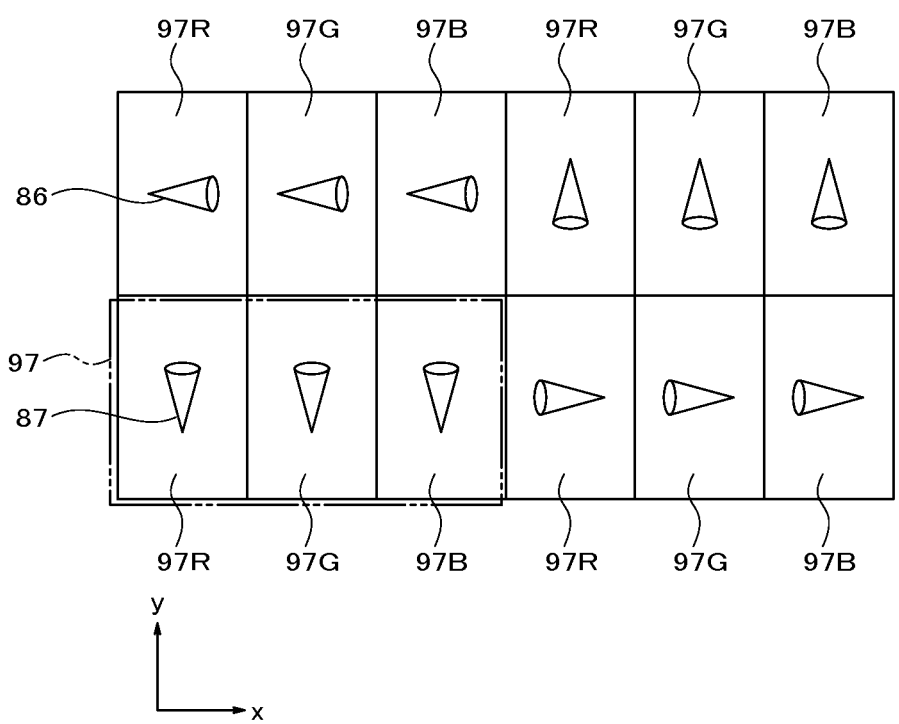
FIG. 39 is a plan view showing twelve neighboring pixels according to an eleventh embodiment.

An eleventh exemplary embodiment of the present invention will be described by referring to FIG. 39. FIG. 39 shows the initial alignment direction of the liquid crystal in twelve pixels neighboring to each other along the data line extending direction and the scanning line extending direction in a liquid crystal display device according to the eleventh exemplary embodiment. In FIG. 39, three pixels 97R, 97G, and 97B neighboring to each other in the x direction constitute one unit 97 for display. A numeral reference 97 is applied only to a single unit by representing the four pieces of one unit. In the explanations provided below, the extending direction of the scanning line 3 is referred to as the x direction, the extending direction of the data line 5 is referred to as the y direction, one unit on a given coordinate is referred to as one unit 97 (x, y), the n-th unit from the one unit 97 (x, y) in the x direction is referred to as one unit 97 (x+n, y), and the m-th unit from the one unit 97 (x, y) in the y direction is referred to as one unit 97 (x, y+m).

The units 97 (x, y), 97 (x+1, y), 97 (x, y+1), and 97 (x+1, y+1) of the eleventh exemplary embodiment correspond to the pixels 94 (x, y), 94 (x+1, y), 94 (x, y+1), and 94 (x+1, y+1) shown in FIG. 32, respectively. The pixels 96R, 96G, and 96B are provided with a color filter of respective color layers of R (red), G (green), and B (blue). The structure of the inside of the pixels 97R, 97G, and 97B are the same as that of the pixel 94 shown in FIG. 32, so that the illustration thereof is omitted.

As in the case of the tenth exemplary embodiment, the alignment azimuth 86 or the alignment azimuth 87 is not divided within one unit 97 in the eleventh exemplary embodiment. Between the neighboring units 97, the alignment azimuths 86, 87 are orthogonal to each other, the extending directions of the strip pixel electrodes are orthogonal to each other, and the angles formed between the alignment azimuths 86, 87 and the extending direction of the strip pixel electrodes are the same.

Further, in the eleventh exemplary embodiment, the directions of the pretilt are set to be 1 degree and to be opposite from each other between the units 97 neighboring to each other in the oblique direction having the same alignment azimuths 86, 87, i.e., between the one unit 97 (x, y) and the one unit 97 (x+1, y+1) as well as between the one unit 97 (x+1, y) and the one unit 97 (x, y+1). Between the neighboring units 97, the interval and the width of the strip pixel electrodes 9 are designed appropriately in such a manner that the transmittance thereof when viewed from the front side becomes almost equivalent.

With this, the voltage-luminance characteristics show low-voltage side shift within one unit 97 when viewed from the alignment azimuths 86 and 87. However, when the neighboring units 97 are combined, the voltage-luminance characteristics thereof from the oblique viewing angle compensate with each other. Therefore, fine viewing angle characteristics can be acquired. With this layout, the one unit 97 (x, y), the one unit 97 (x, y+1), the one unit 97 (x+1, y), and the one unit 97 (x+1, y+1) are four kinds of units 97 constituted with a combination of the two kinds of alignment azimuths 86, 87 orthogonal to each other and the two kinds of pretilt reversed from each other. Therefore, the viewing angle characteristics compensate with each other between the units 97, so that still finer viewing angle characteristics can be acquired.

Further, in a case where a relatively high gradation is displayed only in a specific one unit 97 and black display is provided in the peripheral units 97, there is no compensation done between the neighboring units 97 when viewed obliquely from the alignment azimuths 86 and 87. Even in such case, it becomes hard to have coloration of the one unit 97 since the pixels 97R, 97G, and 97B constituting one unit 97 are facing the same azimuth 86 or 87 and make the same shift. While the case where the pixels 97R, 97G, and 97B are lined in the x direction is described above, the same effects can be acquired also in a case where the pixels 97R, 97G, and 97B are lined in the y direction by constituting the one unit 97 in the manner described above.

While the present invention has been described by referring to the specific exemplary embodiments shown in the accompanying drawings, the present invention is not limited only to each of the exemplary embodiments shown in the drawings. Any changes and modifications occurred to those skilled in the art can be applied to the structures and the details of the present invention. Further, it is to be noted that the present invention includes combinations of a part of or the entire part of each of the exemplary embodiments combined mutually in an appropriate manner.

While a part of or the entire part of the exemplary embodiments can be summarized as in following Supplementary Notes, the present invention is not necessarily limited to those structures.

(Supplementary Note 1)

A lateral electric field liquid crystal display device which includes: a substrate; a plan electrode formed in a plan form on the substrate; a strip electrode or strip electrodes formed in a strip form on the plan electrode via an insulating film; and a liquid crystal aligned substantially in parallel to the substrate, and the liquid crystal display device controls a display by rotating the liquid crystal within a plane substantially in parallel to the substrate by an electric field between the plan electrode and the strip electrode, wherein:
- each pixel constituting the display is divided into a first region and a second region;
- an extending direction of the strip electrode of the first region and an extending direction of the strip electrode of the second region are orthogonal;
- an alignment azimuth of the liquid crystal of the first region and an alignment azimuth of the liquid crystal of the second region are orthogonal; and
- an angle formed between the extending direction of the strip electrode in the first region and the alignment azimuth of the liquid crystal and an angle formed between the extending direction of the strip electrode in the second region and the alignment azimuth of the liquid crystal are same.

(Supplementary Note 2)

The lateral electric field liquid crystal display device as depicted in Supplementary Note 1, wherein the first region and the second region are formed to have almost a same-size area.

(Supplementary Note 3)

The lateral electric field liquid crystal display device as depicted in Supplementary Note 1 or 2, wherein a pretilt angle of the liquid crystal is substantially 0 degree, and voltage-transmittance properties when viewed from oblique viewing angles which are in 180 degree different azimuths are almost equivalent.

(Supplementary Note 4)

The lateral electric field liquid crystal display device as depicted in Supplementary Note 1 or 2, wherein:
- the liquid crystal has the pretilt angle larger than 0 degree;
- the first region includes a third region and a fourth region whose pretilt angles face opposite directions from each other; and
- the second region includes a fifth region and a sixth region whose pretilt angles face opposite directions from each other.

(Supplementary Note 5)

The lateral electric field liquid crystal display device as depicted in Supplementary Note 4, wherein:
- the third region and the fourth region are formed to have almost a same-size area; and
- the fifth region and the sixth region are formed to have almost a same-size area.

(Supplementary Note 6)

The lateral electric field liquid crystal display device as depicted in Supplementary Note 4 or 5, wherein a boundary between the third region and the fourth region and a boundary between the fifth region and the sixth region are formed along the strip electrode, respectively.

(Supplementary Note 7)

The lateral electric field liquid crystal display device as depicted in any one of Supplementary Notes 1 to 6, wherein a light shielding layer is provided at least either in the substrate or a counter substrate thereof in the boundary between the first region and the second region.

(Supplementary Note 8)

The lateral electric field liquid crystal display device as depicted in Supplementary Note 7, wherein the light shielding layer exists on the substrate, and the light shielding layer is formed with a nontransparent metal layer having a potential equivalent to that of the plan electrode or the strip electrode.

(Supplementary Note 9)

A method for manufacturing the lateral electric field liquid crystal display device as depicted in any one of Supplementary Notes 1 to 8, wherein alignment processing of the liquid crystal is performed by photo-alignment.

(Supplementary Note 11)

A liquid crystal display device which includes a transparent electrode formed in a plan form and a strip electrode disposed thereon via an insulating film, and controls display by rotating the liquid crystal aligned substantially in parallel to a substrate within a plane that is substantially in parallel to the substrate by an electric field between the both electrodes, wherein:
- each pixel constituting the display is divided into two regions; the extending directions of the strip electrode in each of the regions are set to be orthogonal so that the directions of the lateral electric fields formed in each of the regions become orthogonal to each other; the alignment azimuths of the liquid crystal of each of the regions are orthogonal; and the angles formed between the extending directions of the strip electrode and the alignment azimuth of the liquid crystal are the same.

(Supplementary Note 12)

The lateral electric field liquid crystal display device as depicted in Supplementary Note 11, wherein the two regions having orthogonal alignment azimuths are formed to have almost a same-size area.

(Supplementary Note 13)

The lateral electric field liquid crystal display device as depicted in Supplementary Note 11 or 12, wherein:
- a pretilt angle of the liquid crystal is substantially 0 degree; and
- voltage-transmittance properties when viewed from oblique viewing angles which are in 180 degree different azimuths are almost equivalent.

(Supplementary Note 14)

The lateral electric field liquid crystal display device as depicted in Supplementary Note 11 or 12, wherein:
- the liquid crystal has the pretilt angle larger than 0 degree; and
- two regions having pretilt of opposite facing directions from each other exist in the two regions of orthogonal alignment azimuths.

(Supplementary Note 15)

The lateral electric field liquid crystal display device as depicted in Supplementary Note 14, wherein the two regions having pretilt of opposite facing directions from each other existing in each of the regions of the two alignment azimuths are formed to have substantially a same-size area.

(Supplementary Note 16)

The lateral electric field liquid crystal display device as depicted in Supplementary Note 14 or 15, wherein a boundary between the two regions having pretilt of opposite facing directions from each other existing in each of the regions of the two alignment azimuths is formed along the strip transparent electrode.

(Supplementary Note 17)

The lateral electric field liquid crystal display device as depicted in any one of Supplementary Notes 11 to 16, wherein at least one of the substrates includes a light shielding layer in the boundary between the regions whose alignment azimuths are orthogonal to each other.

(Supplementary Note 18)

The lateral electric field liquid crystal display device as depicted in Supplementary Note 17, wherein:

the light shielding layer for shielding the boundary between the regions having the alignment azimuths orthogonal to each other exists on the substrate where the electrode for forming the lateral electric field; and the light shielding layer is formed with a nontransparent metal layer having a potential equivalent to that of the common electrode or the pixel electrode.

(Supplementary Note 19)

A method for manufacturing the lateral electric field liquid crystal display device as depicted in any one of Supplementary Notes 11 to 18, wherein alignment processing of the liquid crystal is performed by photo-alignment.

(Supplementary Note 20)

A lateral electric field liquid crystal display device which includes: a substrate; a plan electrode formed in a plan form on the substrate; a strip electrode or strip electrodes formed in a strip form on the plan electrode via an insulating film; and a liquid crystal aligned substantially in parallel to the substrate, and the liquid crystal display device controls a display by rotating the liquid crystal within a plane substantially in parallel to the substrate by an electric field between the plan electrode and the strip electrode, wherein:

a plurality of pixels constituting the display are arranged in matrix in x direction and y direction;

within one of the pixels, an alignment azimuth of the liquid crystal is one direction and an extending direction of the strip electrode is one direction; and between the pixels neighboring to each other at least in one of the x direction and the y direction, extending directions of the strip electrodes are orthogonal to each other, alignment azimuths of the liquid crystal are orthogonal to each other, and angles formed between the extending direction of the strip electrode and the alignment azimuth of the liquid crystal are same.

(Supplementary Note 21)

A lateral electric field liquid crystal display device which includes: a substrate; a plan electrode formed in a plan form on the substrate; a strip electrode or strip electrodes formed in a strip form on the plan electrode via an insulating film; and a liquid crystal aligned substantially in parallel to the substrate, and the liquid crystal display device controls a display by rotating the liquid crystal within a plane substantially in parallel to the substrate by an electric field between the plan electrode and the strip electrode, wherein:

a plurality of pixels constituting the display are arranged in matrix in x direction and y direction;

the plurality of pixels neighboring to each other in the x direction or the y direction showing different colors constitute one unit for the display;

within the one unit, an alignment azimuth of the liquid crystal is one direction and an extending direction of the strip electrode is one direction; and between the units neighboring to each other at least in one of the x direction and the y direction, extending directions of the strip electrodes are orthogonal to each other, the alignment azimuths of the liquid crystal are orthogonal to each other, and angles formed between the extending direction of the strip electrode and the alignment azimuth of the liquid crystal are same.

(Supplementary Note 22)

The lateral electric field liquid crystal display device as depicted in Supplementary Note 10 or 11, wherein a pretilt angle of the liquid crystal is substantially 0 degree, and voltage-transmittance properties when viewed from oblique viewing angles which are in 180 degree different azimuths are almost equivalent.

(Supplementary Note 23)

The lateral electric field liquid crystal display device as depicted in Supplementary Note 10 or 11, wherein:

the liquid crystal has a pretilt angle larger than 0 degree; and four of the pixels having the same color layer neighboring to each other in the x direction and the y direction are four kinds of pixels constituted with a combination of two kinds of the liquid crystal alignment azimuths orthogonal to each other and two kinds of the liquid crystal pretilt directions reversed from each other.

The present invention can be utilized for IPS active matrix type liquid crystal display device and arbitrary apparatuses which use the liquid crystal display device as a display device.

What is claimed is:

1. A lateral electric field liquid crystal display device, comprising: a substrate; a planar electrode formed in a planar form on the substrate; strip electrodes formed in a strip form on the planar electrode via an insulating film; and a liquid crystal aligned substantially in parallel to the substrate, the liquid crystal display device controlling a display by rotating the liquid crystal within a plane substantially in parallel to the substrate by an electric field between the planar electrode and the strip electrodes, wherein:

each pixel constituting the display is divided into a first region and a second region;

an extending direction of a strip electrode of the first region and an extending direction of a strip electrode of the second region are orthogonal;

an alignment azimuth of the liquid crystal of the first region at a time when an electric field is not applied and an alignment azimuth of the liquid crystal of the second region at the time when the electric field is not applied are orthogonal;

an angle formed between the extending direction of the strip electrode in the first region and the alignment azimuth of the liquid crystal at the time when the electric field is not applied and an angle formed between the extending direction of the strip electrode in the second region and the alignment azimuth of the liquid crystal at the time when the electric field is not applied are the same;

the alignment azimuth of the liquid crystal of the first region at the time when the electric field is not applied is perpendicular to a data line and the alignment azimuth of the liquid crystal of the second region at the time when the electric field is not applied is parallel to the data line; and the strip electrodes extend in oblique directions with respect to the data line.

2. The lateral electric field liquid crystal display device as claimed in claim 1, wherein the alignment azimuth of the liquid crystal on the data line at the time when the electric field is not applied matches the alignment azimuth of the liquid crystal of the first region at the time when the electric field is not applied.

3. The lateral electric field liquid crystal display device as claimed in claim 1, wherein
a light shielding layer extending in parallel to the data line is disposed in the second region.

4. The lateral electric field liquid crystal display device as claimed in claim 3, wherein
the light shielding layer exists on the substrate, and the light shielding layer is formed with a nontransparent metal layer having a potential equivalent to that of the planar electrode or the strip electrodes.

5. A method for manufacturing the lateral electric field liquid crystal display device as claimed in claim 1, wherein
alignment processing of the liquid crystal is performed by photo-alignment.

6. A lateral electric field liquid crystal display device, comprising: a substrate; a planar electrode formed in a planar form on the substrate; strip electrodes formed in a strip form on the planar electrode via an insulating film; and a liquid crystal aligned substantially in parallel to the substrate, the liquid crystal display device controlling a display by rotating the liquid crystal within a plane substantially in parallel to the substrate by an electric field between the planar electrode and the strip electrodes, wherein:
a plurality of pixels constituting the display are arranged in matrix along x and y directions;
within one of the pixels, an alignment azimuth of the liquid crystal at a time when an electric field is not applied is one direction and an extending direction of the strip electrodes is another direction;
between the pixels neighboring to each other at least in one of the x direction and the y direction, extending directions of the strip electrodes are orthogonal to each other, alignment azimuths of the liquid crystal at the time when the electric field is not applied are orthogonal to each other, and angles formed between the extending direction of the strip electrodes and the alignment azimuth of the liquid crystal at the time when the electric field is not applied are the same;
between the pixels neighboring to each other at least in one of the x direction and the y direction, the alignment azimuth of the liquid crystal of one of the pixels at the time when the electric field is not applied is perpendicular to a data line and the alignment azimuth of the liquid crystal of another one of the pixels at the time when the electric field is not applied is parallel to the data line; and
the strip electrodes extend in oblique directions with respect to the data line.

7. The lateral electric field liquid crystal display device as claimed in claim 6, wherein
a pretilt angle of the liquid crystal is substantially 0 degrees, and voltage-transmittance characteristics when viewed from oblique viewing angles having azimuths different by 180 degrees are substantially equivalent.

8. A lateral electric field liquid crystal display device, comprising: a substrate; a planar electrode formed in a planar form on the substrate; strip electrodes formed in a strip form on the planar electrode via an insulating film; and a liquid crystal aligned substantially in parallel to the substrate, the liquid crystal display device controlling a display by rotating the liquid crystal within a plane substantially in parallel to the substrate by an electric field between the planar electrode and the strip electrodes, wherein:
a plurality of pixels constituting the display are arranged in matrix along x and y directions;
a plurality of pixels neighboring to each other in the x direction or the y direction showing different colors constitute one unit for the display;
within the one unit, an alignment azimuth of the liquid crystal at a time when an electric field is not applied is one direction and an extending direction of the strip electrodes is another direction;
between the units neighboring to each other at least in one of the x direction and the y direction, extending directions of the strip electrodes are orthogonal to each other, the alignment azimuths of the liquid crystal at the time when the electric field is not applied are orthogonal to each other, and angles formed between the extending direction of the strip electrodes and the alignment azimuth of the liquid crystal at the time when the electric field is not applied are the same;
between the units neighboring to each other at least in one of the x direction and the y direction, the alignment azimuth of the liquid crystal of one of the units at the time when the electric field is not applied is perpendicular to a data line and the alignment azimuth of the liquid crystal of another one of the units at the time when the electric field is not applied is parallel to the data line; and
the strip electrodes extend in oblique directions with respect to the data line.

9. The lateral electric field liquid crystal display device as claimed in claim 8, wherein
a pretilt angle of the liquid crystal is substantially 0 degrees, and voltage-transmittance characteristics when viewed from oblique viewing angles having azimuths different by 180 degrees are substantially equivalent.

* * * * *